United States Patent
Chalmers et al.

(10) Patent No.: US 12,294,812 B2
(45) Date of Patent: May 6, 2025

(54) ENVIRONMENT FOR REMOTE COMMUNICATION

(71) Applicant: Apple Inc., Cupertino, CA (US)

(72) Inventors: Devin W. Chalmers, Oakland, CA (US); Jae Hwang Lee, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/643,818

(22) Filed: Apr. 23, 2024

(65) Prior Publication Data

US 2024/0275922 A1     Aug. 15, 2024

Related U.S. Application Data

(63) Continuation of application No. 18/231,437, filed on Aug. 8, 2023, now Pat. No. 12,003,890, which is a
(Continued)

(51) Int. Cl.
*H04N 7/15*     (2006.01)
*G06T 19/00*     (2011.01)
(Continued)

(52) U.S. Cl.
CPC ........... *H04N 7/157* (2013.01); *G06T 19/006* (2013.01); *H04L 12/1813* (2013.01); *H04L 65/403* (2013.01)

(58) Field of Classification Search
CPC .............................. H04N 7/157; H04L 65/403
See application file for complete search history.

(56) References Cited

U.S. PATENT DOCUMENTS 8,866,849 B1   10/2014   Cho et al.
8,994,721 B2   3/2015   Matsuda
(Continued)

FOREIGN PATENT DOCUMENTS

CN     102473068 A     5/2012
CN     103765366 A     4/2014
(Continued)

OTHER PUBLICATIONS

Applicant-Initiated Interview Summary received for U.S. Appl. No. 16/552,549, mailed on Jan. 26, 2022, 4 pages.
(Continued)

*Primary Examiner* — Amal S Zenati
(74) *Attorney, Agent, or Firm* — DLA Piper LLP (US)

(57) ABSTRACT

An electronic device is described. In some embodiments, the electronic device includes instructions for: while presenting an extended reality environment, receiving, by the first electronic device, a request to present a virtual representation of a remote participant of a communication session, where the first electronic device is connected to the communication session; obtaining a capability of the remote participant of the communication session; and in response to receiving the request to present the virtual representation of the remote participant of the communication session, presenting the virtual representation of the remote participant of the communication session based on the obtained capability of the remote participant of the communication session.

31 Claims, 26 Drawing Sheets

Related U.S. Application Data continuation of application No. 17/397,726, filed on Aug. 9, 2021, now Pat. No. 11,800,059, which is a continuation of application No. PCT/US2020/052886, filed on Sep. 25, 2020.

(60) Provisional application No. 63/081,260, filed on Sep. 21, 2020, provisional application No. 62/965,559, filed on Jan. 24, 2020, provisional application No. 62/907,195, filed on Sep. 27, 2019.

(51) Int. Cl.
*H04L 12/18* (2006.01)
*H04L 65/403* (2022.01)

(56) References Cited

U.S. PATENT DOCUMENTS

| | | | |
|---|---|---|---|
| 9,411,412 | B1 | 8/2016 | Jain et al. |
| 9,459,692 | B1 | 10/2016 | Li |
| 9,665,249 | B1 | 5/2017 | Ding et al. |
| 9,696,549 | B2 | 7/2017 | Bean et al. |
| 9,880,729 | B2 | 1/2018 | Rakshit |
| 10,204,592 | B1 | 2/2019 | Trim et al. |
| 10,270,983 | B1 | 4/2019 | Van Os et al. |
| 10,403,043 | B2 | 9/2019 | Kaufman et al. |
| 11,366,514 | B2 | 6/2022 | Burns |
| 2001/0044858 | A1 | 11/2001 | Rekimoto |
| 2005/0245302 | A1 | 11/2005 | Bathiche et al. |
| 2012/0084259 | A1* | 4/2012 | Welingkar ............ G06F 21/88 707/E17.007 |
| 2012/0124509 | A1 | 5/2012 | Matsuda et al. |
| 2012/0249741 | A1 | 10/2012 | Maciocci et al. |
| 2013/0007672 | A1 | 1/2013 | Taubman |
| 2014/0047392 | A1 | 2/2014 | Kim et al. |
| 2014/0132629 | A1 | 5/2014 | Pandey et al. |
| 2014/0225919 | A1 | 8/2014 | Kaino et al. |
| 2014/0282220 | A1 | 9/2014 | Wantland et al. |
| 2014/0375680 | A1 | 12/2014 | Ackerman et al. |
| 2015/0009132 | A1 | 1/2015 | Kuriya et al. |
| 2015/0022444 | A1 | 1/2015 | Ooi |
| 2015/0193018 | A1 | 7/2015 | Venable et al. |
| 2015/0199005 | A1 | 7/2015 | Haddon |
| 2015/0213650 | A1* | 7/2015 | Barzuza ............ H04L 67/131 348/14.07 |
| 2015/0215351 | A1 | 7/2015 | Barzuza et al. |
| 2015/0215581 | A1 | 7/2015 | Barzuza et al. |
| 2015/0235267 | A1 | 8/2015 | Steube et al. |
| 2015/0277699 | A1 | 10/2015 | Algreatly |
| 2015/0302867 | A1 | 10/2015 | Tomlin et al. |
| 2016/0026242 | A1 | 1/2016 | Burns et al. |
| 2016/0027216 | A1 | 1/2016 | Da Veiga et al. |
| 2016/0066295 | A1 | 3/2016 | Han et al. |
| 2016/0077337 | A1 | 3/2016 | Raffle et al. |
| 2016/0148433 | A1 | 5/2016 | Petrovskaya et al. |
| 2016/0163063 | A1 | 6/2016 | Ashman |
| 2016/0217614 | A1 | 7/2016 | Kraver et al. |
| 2016/0253842 | A1 | 9/2016 | Shapira et al. |
| 2016/0284129 | A1 | 9/2016 | Nishizawa et al. |
| 2016/0308920 | A1 | 10/2016 | Brunsch et al. |
| 2017/0053443 | A1 | 2/2017 | Diament et al. |
| 2017/0060514 | A1 | 3/2017 | Kaufthal |
| 2017/0061696 | A1 | 3/2017 | Li et al. |
| 2017/0083993 | A1 | 3/2017 | Kurzman et al. |
| 2017/0092235 | A1 | 3/2017 | Osman et al. |
| 2017/0123489 | A1 | 5/2017 | Guenter |
| 2017/0123491 | A1 | 5/2017 | Hansen et al. |
| 2017/0139474 | A1 | 5/2017 | Rochford et al. |
| 2017/0185148 | A1 | 6/2017 | Kondo |
| 2017/0203213 | A1 | 7/2017 | Stafford |
| 2017/0232335 | A1 | 8/2017 | Williams et al. |
| 2017/0256096 | A1 | 9/2017 | Faaborg et al. |
| 2017/0263056 | A1 | 9/2017 | Leppanen et al. |
| 2017/0287225 | A1 | 10/2017 | Powderly et al. |
| 2017/0344127 | A1 | 11/2017 | Hu et al. |
| 2018/0046352 | A1 | 2/2018 | Johnson et al. |
| 2018/0095607 | A1 | 4/2018 | Proctor |
| 2018/0129459 | A1 | 5/2018 | Sylvan et al. |
| 2018/0165830 | A1 | 6/2018 | Danieau et al. |
| 2018/0173404 | A1 | 6/2018 | Smith |
| 2018/0275753 | A1 | 9/2018 | Publicover et al. |
| 2018/0286126 | A1 | 10/2018 | Schwarz et al. |
| 2018/0293041 | A1 | 10/2018 | Harviainen |
| 2018/0350119 | A1 | 12/2018 | Kocharlakota et al. |
| 2019/0107721 | A1 | 4/2019 | Scott et al. |
| 2019/0196710 | A1 | 6/2019 | Jiang et al. |
| 2019/0197262 | A1 | 6/2019 | Jiang et al. |
| 2019/0197994 | A1 | 6/2019 | Kunitomo et al. |
| 2019/0227763 | A1 | 7/2019 | Kaufthal |
| 2019/0272138 | A1 | 9/2019 | Krauss et al. |
| 2020/0020162 | A1 | 1/2020 | Jones et al. |
| 2020/0089313 | A1 | 3/2020 | Himane |
| 2020/0103962 | A1 | 4/2020 | Burns |
| 2020/0193938 | A1 | 6/2020 | Estruch Tena et al. |
| 2020/0219469 | A1 | 7/2020 | Mittal et al. |
| 2020/0293177 | A1 | 9/2020 | Iglesias |
| 2021/0084259 | A1 | 3/2021 | Kies et al. |
| 2021/0342044 | A1 | 11/2021 | Xu |
| 2021/0366440 | A1 | 11/2021 | Burns et al. |
| 2021/0368136 | A1 | 11/2021 | Chalmers et al. |
| 2022/0011860 | A1 | 1/2022 | Cappello et al. |
| 2022/0044481 | A1 | 2/2022 | Tzeng et al. |
| 2022/0327190 | A1 | 10/2022 | Yan et al. |
| 2023/0008291 | A1 | 1/2023 | Burns |
| 2023/0298281 | A1 | 9/2023 | Pease et al. |
| 2023/0334793 | A1 | 10/2023 | Burns et al. |
| 2023/0388453 | A1 | 11/2023 | Chalmers et al. |
| 2024/0112649 | A1 | 4/2024 | Burns et al. |
| 2024/0272708 | A1 | 8/2024 | Burns |

FOREIGN PATENT DOCUMENTS

| | | |
|---|---|---|
| CN | 104081319 A | 10/2014 |
| CN | 104115100 A | 10/2014 |
| CN | 105431763 A | 3/2016 |
| CN | 106716302 A | 5/2017 |
| CN | 107004303 A | 8/2017 |
| CN | 107340853 A | 11/2017 |
| CN | 107534656 A | 1/2018 |
| CN | 107924299 A | 4/2018 |
| CN | 108136258 A | 6/2018 |
| CN | 108139803 A | 6/2018 |
| EP | 3039555 A1 | 7/2016 |
| JP | 2013-161247 A | 8/2013 |
| JP | 2015-143976 A | 8/2015 |
| WO | 03/058518 A2 | 7/2003 |
| WO | 2014/113408 A1 | 7/2014 |
| WO | 2015/140106 A1 | 9/2015 |
| WO | 2016/014872 A1 | 1/2016 |
| WO | 2016/073986 A1 | 5/2016 |
| WO | 2017/021902 A1 | 2/2017 |
| WO | 2017/171943 A1 | 10/2017 |

OTHER PUBLICATIONS

Applicant-Initiated Interview Summary received for U.S. Appl. No. 16/552,549, mailed on Mar. 25, 2021, 3 pages.
Applicant-Initiated Interview Summary received for U.S. Appl. No. 16/552,549, mailed on Sep. 3, 2021, 4 pages.
Applicant-Initiated Interview Summary received for U.S. Appl. No. 17/845,863, mailed on May 31, 2023, 3 pages.
Applicant-Initiated Interview Summary received for U.S. Appl. No. 17/845,863, mailed on Nov. 21, 2023, 4 pages.
Applicant-Initiated Interview Summary received for U.S. Appl. No. 17/845,863, mailed on Sep. 22, 2023, 4 pages.
Corrected Notice of Allowance received for U.S. Appl. No. 16/552,549, mailed on Mar. 3, 2022, 6 pages.
Corrected Notice of Allowance received for U.S. Appl. No. 16/552,549, mailed on Mar. 31, 2022, 3 pages.
Corrected Notice of Allowance received for U.S. Appl. No. 16/651,249, mailed on Feb. 18, 2021, 2 pages.

(56) References Cited

OTHER PUBLICATIONS

Corrected Notice of Allowance received for U.S. Appl. No. 17/397,726, mailed on May 4, 2023, 2 pages.
Decision to Grant received for European Patent Application No. 20775103.3, mailed on Sep. 21, 2023, 2 pages.
Dedual et al., "Creating hybrid user interfaces with a 2D multi-touch tabletop and a 3D see-through head-worn display", IEEE International Symposium on Mixed and Augmented Reality 2011 Science and Technology Proceedings, Oct. 26-29, 2011, 2 pages.
Extended European Search Report received for European Patent Application No. 23198001.2, mailed on Dec. 4, 2023, 10 pages.
Fares et al., "Can we beat the mouse with MAGIC?", CHI 2013: Changing Perspectives, Apr. 27-May 2, 2013, pp. 1387-1390.
Final Office Action received for U.S. Appl. No. 16/552,549, mailed on Dec. 3, 2021, 16 pages.
Final Office Action received for U.S. Appl. No. 17/845,863, mailed on Aug. 22, 2023, 35 pages.
Fitzmaurice et al., "Bricks: Laying the Foundations for Graspable User Interfaces", May 7-11, 1995, pp. 442-449.
Intention to Grant received for European Patent Application No. 20775103.3, mailed on May 9, 2023, 9 pages.
International Preliminary Report on Patentability received for PCT Patent Application No. PCT/US2018/052748, mailed on Apr. 9, 2020, 11 pages.
International Preliminary Report on Patentability received for PCT Patent Application No. PCT/US2020/048845, mailed on Apr. 7, 2022, 14 pages.
International Preliminary Report on Patentability received for PCT Patent Application No. PCT/US2020/052886, mailed on Apr. 7, 2022, 15 pages.
International Preliminary Report on Patentability received for PCT Patent Application No. PCT/US2021/037683, mailed on Jan. 5, 2023, 14 pages.
International Search Report and Written Opinion received for PCT Patent Application No. PCT/US2018/052748, mailed on Dec. 14, 2018, 12 pages.
International Search Report and Written Opinion received for PCT Patent Application No. PCT/US2020/048845, mailed on Feb. 1, 2021, 20 pages.
International Search Report and Written Opinion received for PCT Patent Application No. PCT/US2020/052886, mailed on Feb. 1, 2021, 22 pages.
International Search Report and Written Opinion received for PCT Patent Application No. PCT/US2021/037683, mailed on Dec. 10, 2021, 19 pages.
Invitation to Pay Additional Fees received for PCT Patent Application No. PCT/US2020/048845, mailed on Dec. 4, 2020, 13 pages.
Invitation to Pay Additional Fees received for PCT Patent Application No. PCT/US2020/052886, mailed on Dec. 9, 2020, 15 pages.
Invitation to Pay Additional Fees received for PCT Patent Application No. PCT/US2021/037683, mailed on Oct. 19, 2021, 11 pages.
Jalaliniya et al., "MAGIC Pointing for Eyewear Computers", ISWC '15, Online Available at: http://dx.doi.org/10.1145/2802083.2802094, Sep. 7-11, 2015, pp. 155-158.
Office Action received for U.S. Appl. No. 16/552,549, mailed on Jun. 29, 2021, 15 pages.
Office Action received for U.S. Appl. No. 16/552,549, mailed on Nov. 12, 2020, 15 pages.
Office Action received for U.S. Appl. No. 17/397,726, mailed on May 12, 2022, 9 pages.
Office Action received for U.S. Appl. No. 17/397,734, mailed on Apr. 14, 2022, 31 pages.
Office Action received for U.S. Appl. No. 17/845,863, mailed on Apr. 11, 2023, 34 pages.
Office Action received for U.S. Appl. No. 17/845,863, mailed on Oct. 24, 2023, 17 pages.
Notice of Allowance received for Chinese Patent Application No. 201880063519.0, mailed on Feb. 14, 2023, 2 pages.
Notice of Allowance received for Chinese Patent Application No. 201910868273.0, mailed on Feb. 8, 2022, 4 pages.
Notice of Allowance received for Chinese Patent Application No. 202080026912.X, mailed on Mar. 7, 2023, 2 pages.
Notice of Allowance received for U.S. Appl. No. 16/552,549, mailed on Feb. 24, 2022, 10 pages.
Notice of Allowance received for U.S. Appl. No. 16/651,249, mailed on Jan. 27, 2021, 11 pages.
Notice of Allowance received for U.S. Appl. No. 17/397,726, mailed on Feb. 15, 2023, 6 pages.
Notice of Allowance received for U.S. Appl. No. 17/397,726, mailed on Jun. 12, 2023, 6 pages.
Notice of Allowance received for U.S. Appl. No. 17/397,734, mailed on Sep. 19, 2022, 7 pages.
Notice of Allowance received for U.S. Appl. No. 18/099,862, mailed on Sep. 15, 2023, 15 pages.
Notice of Allowance received for U.S. Appl. No. 18/231,437, mailed on Feb. 29, 2024, 10 pages.
Office Action received for Chinese Patent Application No. 201880063519.0, mailed on Dec. 15, 2022, 11 pages.
Office Action received for Chinese Patent Application No. 201910868273.0, mailed on Sep. 24, 2021, 24 pages.
Office Action received for Chinese Patent Application No. 202080026912.X, mailed on Nov. 8, 2022, 9 pages.
Piekarski et al., "Integrating Virtual and Augmented Realities in an Outdoor Application", IEEE, Feb. 1999, 10 pages.
Regenbrecht et al., "A tangible AR desktop environment", Computers & Graphics, vol. 25, No. 5, Oct. 2001, pp. 755-763.
Shaer et al., "Tangible User Interfaces: Past, Present, and Future Directions", Foundations and Trends? in Human-Computer Interaction, vol. 3, No. 1-2, 2009, pp. 1-137.
Supplemental Notice of Allowance received for U.S. Appl. No. 18/099,862, mailed on Dec. 20, 2023, 4 pages,.
Supplemental Notice of Allowance received for U.S. Appl. No. 18/099,862, mailed on Nov. 13, 2023, 2 pages.
The Dynamic Desktop (in the office of the future . . . )—YouTube, Online Available at: https://www.youtube.com/watch?v=m9IZfnRrM4Y, Aug. 20, 2014, 2014, 1 page.
Zhai et al., "Manual and Gaze Input Cascaded (MAGIC) Pointing", ACM CHI, May 15-20, 1999, pp. 246-253.
Zinchenko et al., "Virtual Reality Control of a Robotic Camera Holder for Minimally Invasive Surgery", 2017 11th Asian Control Conference (ASCC) Gold Coast Convention Centre, Australia, Dec. 17-20, 2017, 6 pages.
Corrected Notice of Allowance received for U.S. Appl. No. 18/068,711, mailed on Nov. 1, 2024, 3 pages.
Notice of Allowance received for U.S. Appl. No. 18/068,711, mailed on Oct. 23, 2024, 6 pages.
Non-Final Office Action received for U.S. Appl. No. 18/068,711, mailed on Jun. 4, 2024, 17 pages.
Non-Final Office Action received for U.S. Appl. No. 18/540,480, mailed on Aug. 1, 2024, 42 pages.
Notice of Allowance received for Chinese Patent Application No. 202080027017.X, mailed on Jul. 16, 2024, 2 pages (1 page of English Translation and 1 page of Official Copy).
Final Office Action received for U.S. Appl. No. 18/540,480, mailed on Sep. 18, 2024, 48 pages.
Applicant-Initiated Interview Summary received for U.S. Appl. No. 18/068,711, mailed on Aug. 26, 2024, 4 pages.
Applicant-Initiated Interview Summary received for U.S. Appl. No. 18/540,480, mailed on Sep. 4, 2024, 4 pages.
Notice of Allowance received for U.S. Appl. No. 17/845,863, mailed on Feb. 12, 2024, 10 pages.
Office Action received for Chinese Patent Application No. 202080027017.X, mailed on Mar. 8, 2024, 21 pages (4 pages of English Translation and 17 pages of Official Copy).
Applicant-Initiated Interview Summary received for U.S. Appl. No. 18/540,480, mailed on Nov. 18, 2024, 4 pages.
Notice of Allowance received for U.S. Appl. No. 18/540,480, mailed on Dec. 10, 2024, 7 pages.

(56) References Cited

OTHER PUBLICATIONS

Non-Final Office Action received for U.S. Appl. No. 18/630,765, mailed on Jan. 30, 2025, 16 pages.

\* cited by examiner

500 ↘

┌─────────────────────────────────────────────────────────────────────┐
| 502 |
| Present a virtual representation of a remote participant of a communication session such that |
| the virtual representation appears to be located at a first location in a physical environment, |
| where the first location is different from a a second location in the physical environment at |
| which a second electronic device in the physical environment is located. |
└─────────────────────────────────────────────────────────────────────┘
                                     ↓
┌─────────────────────────────────────────────────────────────────────┐
| 504 |
| Detect the second electronic device at a third location in the physical environment different |
| from the second location in the physical environment. |
└─────────────────────────────────────────────────────────────────────┘
                                     ↓
┌─────────────────────────────────────────────────────────────────────┐
| 506 |
| Present the virtual representation of the remote participant such that the virtual |
| representation of the remote participant appears to be located at a fourth location in the |
| physical environment different from the first location and the third location. |
└─────────────────────────────────────────────────────────────────────┘

FIG. 5

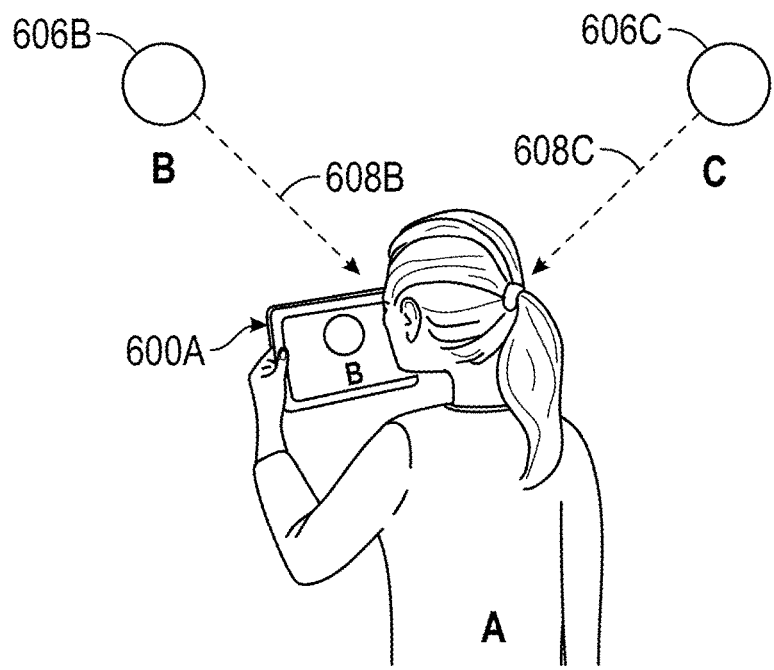
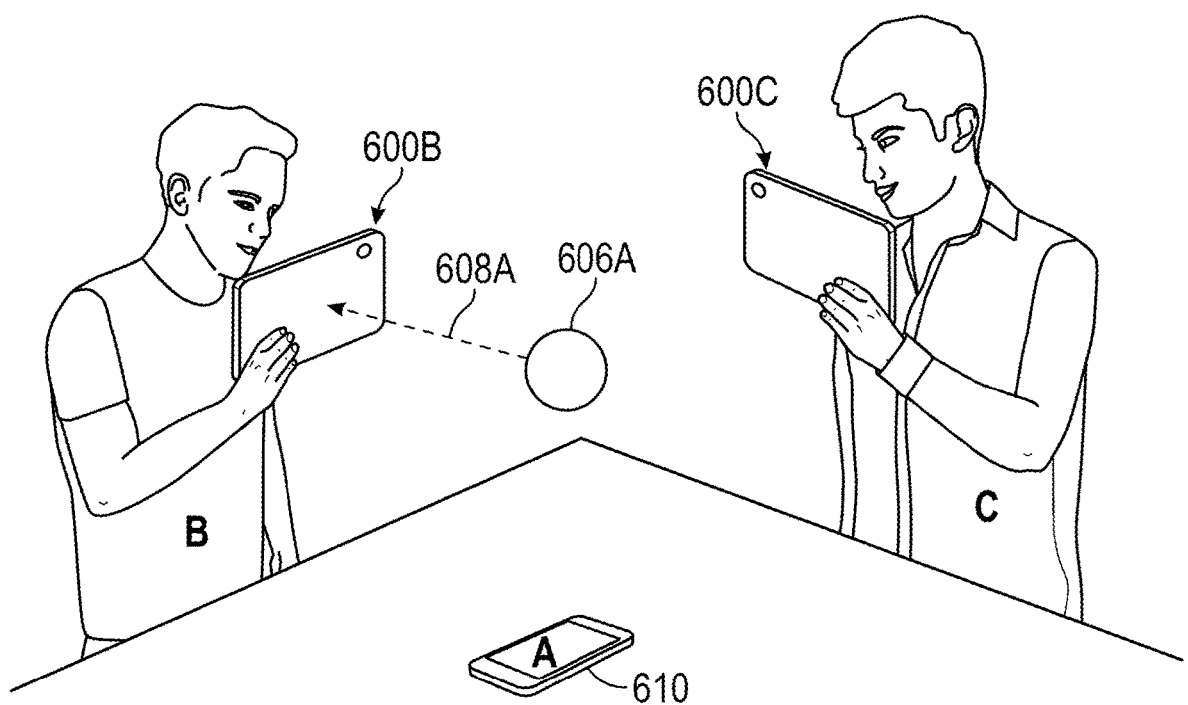
FIG. 6A

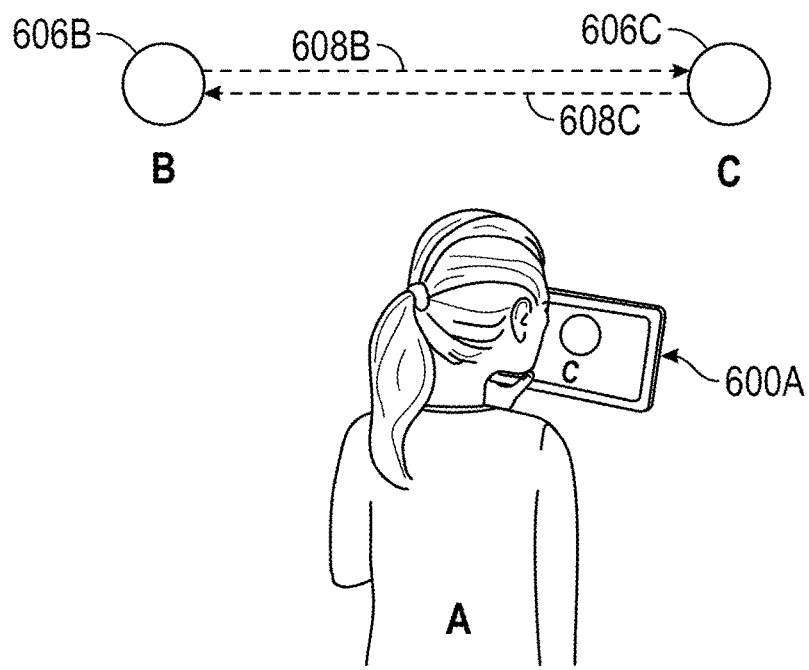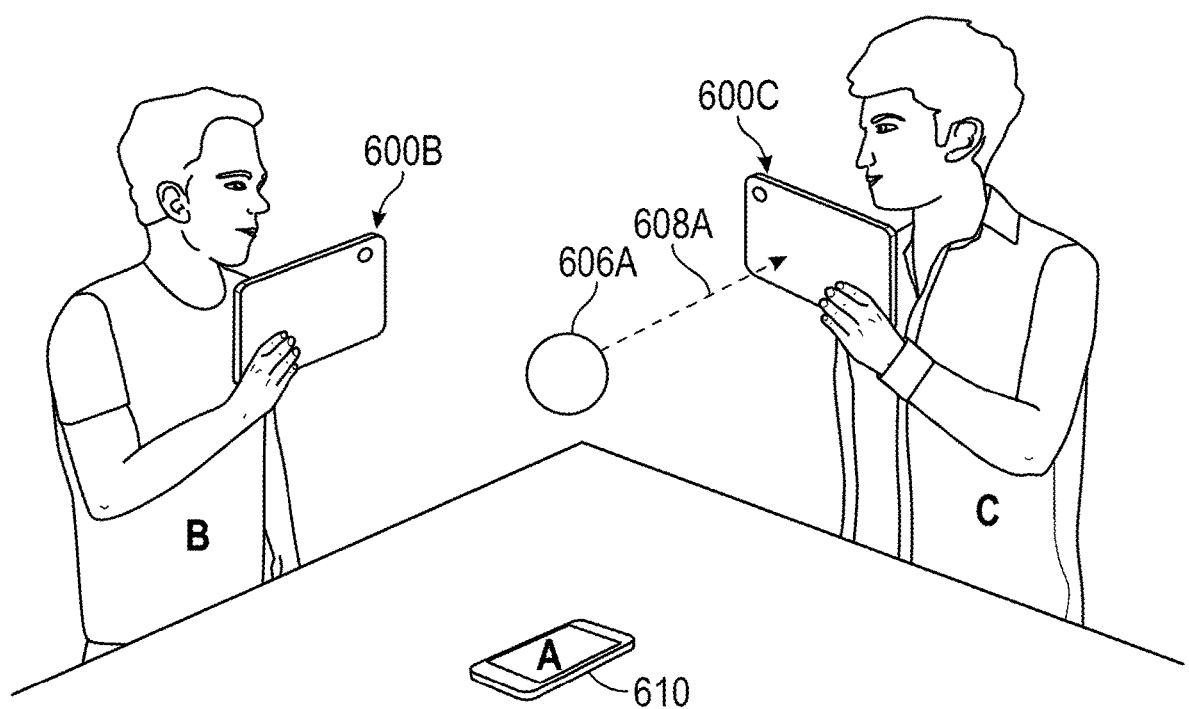
FIG. 6B

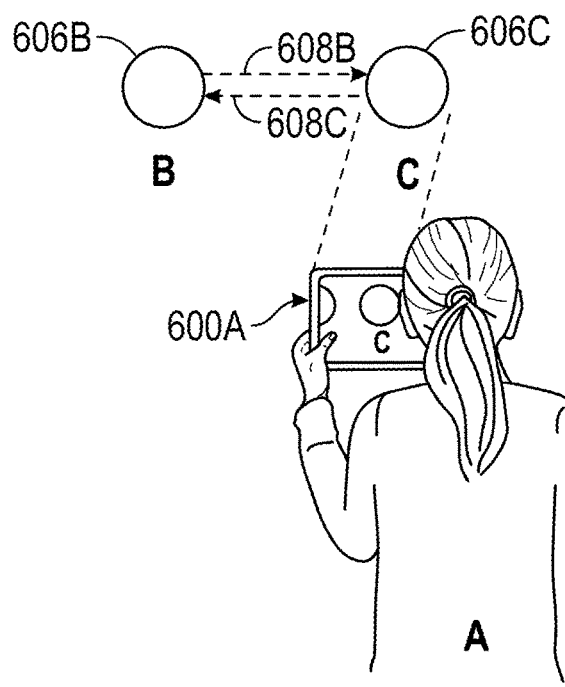
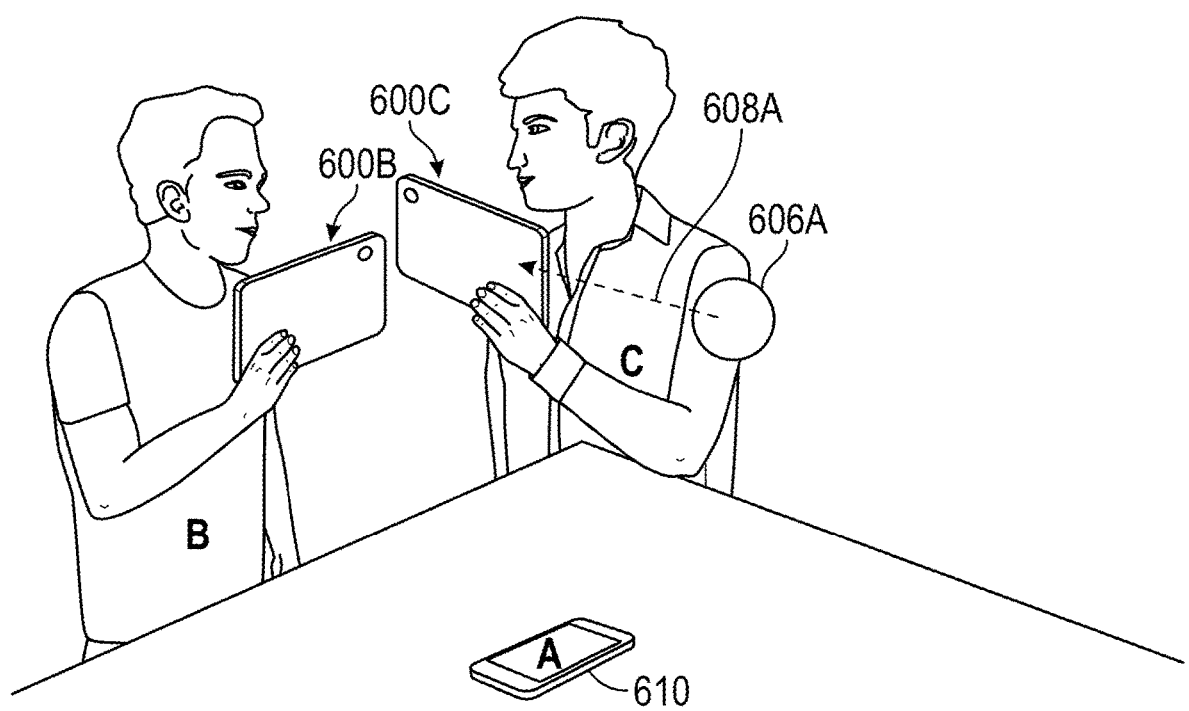
FIG. 6C

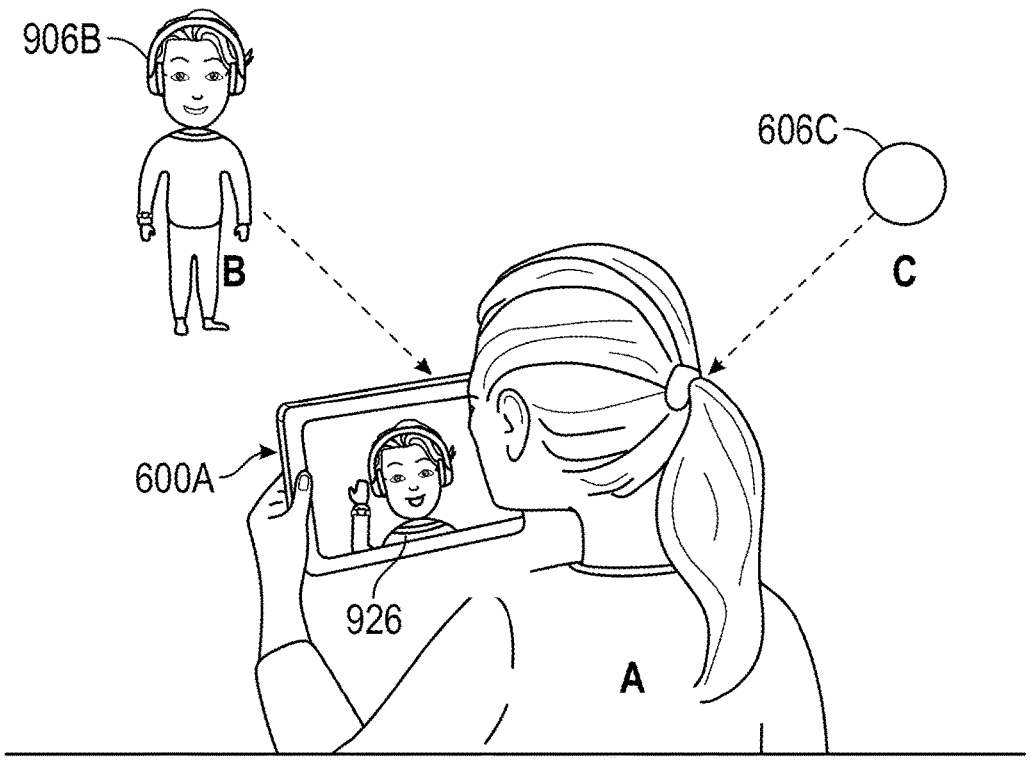
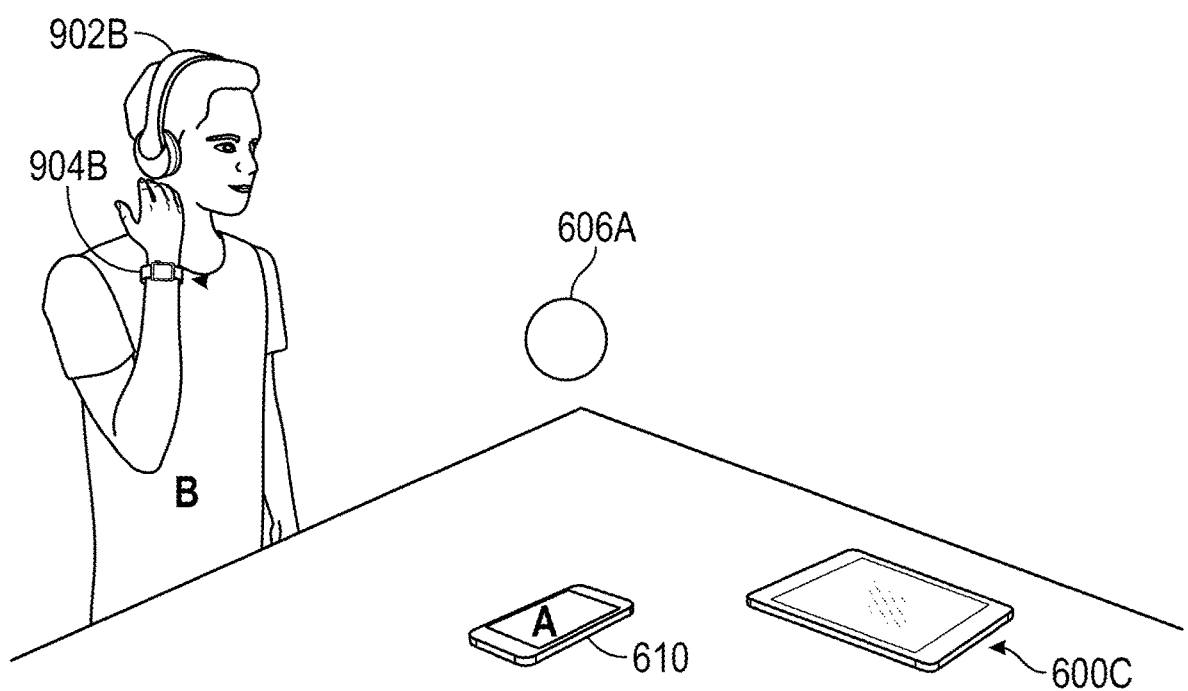
FIG. 8D

ENVIRONMENT FOR REMOTE COMMUNICATION

CROSS-REFERENCE TO RELATED APPLICATIONS

This application is a continuation of U.S. patent application Ser. No. 18/231,437, entitled "ENVIRONMENT FOR REMOTE COMMUNICATION," filed Aug. 8, 2023, which is a continuation of U.S. application Ser. No. 17/397,726, entitled "ENVIRONMENT FOR REMOTE COMMUNICATION," filed Aug. 9, 2021 (now U.S. Pat. No. 11,800,059), which is a continuation of PCT Application No. PCT/US2020/052886, entitled "ENVIRONMENT FOR REMOTE COMMUNICATION," filed Sep. 25, 2020, which claims priority to: U.S. Provisional Patent Application Ser. No. 63/081,260, entitled "ENVIRONMENT FOR REMOTE COMMUNICATION," filed on Sep. 21, 2020; U.S. Provisional Patent Application Ser. No. 62/965,559, entitled "ENVIRONMENT FOR REMOTE COMMUNICATION," filed on Jan. 24, 2020; and U.S. Provisional Patent Application Ser. No. 62/907,195, entitled "COMPUTER-GENERATED REALITY ENVIRONMENT FOR REMOTE COMMUNICATION," filed on Sep. 27, 2019. The contents of each of the aforementioned applications are hereby incorporated by reference in their entireties.

BACKGROUND

1. Field

The present disclosure relates generally to communication systems, and more specifically to techniques for providing an environment associated with an electronic communication session, such as a conference call.

2. Description of Related Art

As the capability of electronic devices increases and their ability to output high-quality visual displays improves, applications are becoming more immersive. One such example is the increasing mainstream demand for extended reality applications.

BRIEF SUMMARY

The present disclosure describes techniques for presenting an extended reality environment associated with an electronic communication session. Such techniques optionally complement or replace other methods for providing a multiuser extended reality environment. Such techniques can improve the user experience, increase privacy and security, and enable extended reality interfaces (e.g., 3D interfaces) with advanced functionality.

For example, during a communication session, a virtual representation (e.g., avatar) of a remote participant is presented in an extended reality environment. The extended reality environment can be presented to one or more local participants, with the virtual representation providing a common focal point for the local participants to direct their attention to during the communication session. In some embodiments, the location of the virtual representation is determined at least in part using the location of an anchor device such that, e.g., the virtual representation appears to be located above the anchor device. In this way, the local participants can control where the virtual representation is located by placing the anchor device in a location that corresponds to where they want the virtual representation to be. This allows the local participants to position the anchor device so that the virtual representation is located in a convenient location. Also, in some embodiments, the location of the virtual representation is determined at least in part using the location of a device of a local participant. For example, the virtual representation can be displayed at the same height as a head-mounted device that presents the extended reality environment to the user so that the virtual representation is conveniently presented at eye level to the user. The virtual representation can be displayed at a different height if there are multiple local participants. For example, the virtual representation can be displayed at an average of the heights of all the devices used by the local participants, or at the height of the lowest device so that no user has to look up to see the virtual representation. As another example, the extended reality environment can be customized for each participant by having different devices present the virtual representation at different heights based on the heights of the respective devices.

In some embodiments, the virtual representation moves (e.g., changes location, rotates) when the anchor device is moved. Moving the virtual representation with the anchor device can allow a user to adjust the position of the virtual representation (e.g., to a more preferred location) by moving the anchor device. It also allows the virtual representation to be presented at a more desirable location based on where the anchor device is positioned and/or how the anchor device is being used. For example, when a camera application is activated on the anchor device during a communication session with a remote participant, or the anchor device is moved into a position for taking a photo to share with the remote participant, the virtual representation can be moved to a position over the shoulder of the user holding the anchor device to simulate the experience of the remote participant standing side-by-side with the user of the anchor device and looking over the user's shoulder to view a display on the anchor device.

In some embodiments, the virtual representation gestures in the direction of a participant of a communication session based on a request. The request can be based on a determination that a remote participant of the communication session is directing focus or attention to a participant that is local to the virtual representation. For example, if a remote participant is looking at a representation (e.g., video feed or avatar) of a local participant presented by the remote participant's device, the virtual representation can gesture in the direction of the local participant (or a device associated with the local participant) by moving or rotating to face the local participant (or a device associated with the local participant). In some embodiments, the virtual representation can gesture to remain directed toward the local participant as the local participant and/or the anchor device are moved. For example, when the local participant or the anchor device move, a gesture request is received and the virtual representation is moved and/or re-oriented to remain directed at the local participant.

In some embodiments, a method includes: while presenting an extended reality environment via a display device of a first electronic device, receiving, by the first electronic device, a request to present a virtual representation of a remote participant of a communication session, where the first electronic device is connected to the communication session; and in response to receiving the request to present the virtual representation of the remote participant: locating a second electronic device at a first location in a physical environment; and while the second electronic device is located at the first location in the physical environment, presenting, via the display device, the virtual representation of the remote participant such that the virtual representation appears to be located at a second location in the physical environment, where the second location is different from the first location, and where a first coordinate of the second location is determined using a first coordinate of the first location.

In some embodiments, a computer-readable storage medium stores one or more programs configured to be executed by one or more processors of a first electronic device, the one or more programs include instructions for: while presenting an extended reality environment via a display device of a first electronic device, receiving, by the first electronic device, a request to present a virtual representation of a remote participant of a communication session, where the first electronic device is connected to the communication session; and in response to receiving the request to present the virtual representation of the remote participant: locating a second electronic device at a first location in a physical environment; and while the second electronic device is located at the first location in the physical environment, presenting, via the display device, the virtual representation of the remote participant such that the virtual representation appears to be located at a second location in the physical environment, where the second location is different from the first location, and where a first coordinate of the second location is determined using a first coordinate of the first location.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

In some embodiments, a first electronic device, includes one or more processors, and memory storing one or more programs configured to be executed by the one or more processors, the one or more programs including instructions for: while presenting an extended reality environment via a display device of a first electronic device, receiving, by the first electronic device, a request to present a virtual representation of a remote participant of a communication session, where the first electronic device is connected to the communication session; and in response to receiving the request to present the virtual representation of the remote participant: locating a second electronic device at a first location in a physical environment; and while the second electronic device is located at the first location in the physical environment, presenting, via the display device, the virtual representation of the remote participant such that the virtual representation appears to be located at a second location in the physical environment, where the second location is different from the first location, and where a first coordinate of the second location is determined using a first coordinate of the first location.

In some embodiments, a first electronic device includes: means for, while presenting an extended reality environment via a display device of a first electronic device, receiving, by the first electronic device, a request to present a virtual representation of a remote participant of a communication session, where the first electronic device is connected to the communication session; and means for, in response to receiving the request to present the virtual representation of the remote participant: locating a second electronic device at a first location in a physical environment; and while the second electronic device is located at the first location in the physical environment, presenting, via the display device, the virtual representation of the remote participant such that the virtual representation appears to be located at a second location in the physical environment, where the second location is different from the first location, and where a first coordinate of the second location is determined using a first coordinate of the first location.

In some embodiments, a method includes: while presenting an extended reality environment via a display device of a first electronic device connected to a communication session, presenting, via the display device of the first electronic device, a virtual representation of a remote participant of the communication session such that the virtual representation appears to be located at a first location in a physical environment, where the first location is different from a second location in the physical environment at which a second electronic device in the physical environment is located; detecting, in the physical environment, the second electronic device at a third location in the physical environment different from the second location in the physical environment; and in response to detecting the second electronic device at the third location different from the second location, presenting, via the display device of the first electronic device, the virtual representation of the remote participant such that the virtual representation of the remote participant appears to be located at a fourth location in the physical environment different from the first location and the third location.

In some embodiments, a computer-readable storage medium stores one or more programs configured to be executed by one or more processors of a first electronic device, the one or more programs include instructions for: while presenting an extended reality environment via a display device of a first electronic device connected to a communication session, presenting, via the display device of the first electronic device, a virtual representation of a remote participant of the communication session such that the virtual representation appears to be located at a first location in a physical environment, where the first location is different from a second location in the physical environment at which a second electronic device in the physical environment is located; detecting, in the physical environment, the second electronic device at a third location in the physical environment different from the second location in the physical environment; and in response to detecting the second electronic device at the third location different from the second location, presenting, via the display device of the first electronic device, the virtual representation of the remote participant such that the virtual representation of the remote participant appears to be located at a fourth location in the physical environment different from the first location and the third location.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

In some embodiments, a first electronic device, includes one or more processors, and memory storing one or more programs configured to be executed by the one or more processors, the one or more programs including instructions for: while presenting an extended reality environment via a display device of a first electronic device connected to a communication session, presenting, via the display device of the first electronic device, a virtual representation of a remote participant of the communication session such that the virtual representation appears to be located at a first location in a physical environment, where the first location is different from a second location in the physical environment at which a second electronic device in the physical environment is located; detecting, in the physical environment, the second electronic device at a third location in the physical environment different from the second location in the physical environment; and in response to detecting the second electronic device at the third location different from the second location, presenting, via the display device of the first electronic device, the virtual representation of the remote participant such that the virtual representation of the remote participant appears to be located at a fourth location in the physical environment different from the first location and the third location.

In some embodiments, a first electronic device includes: means for, while presenting an extended reality environment via a display device of a first electronic device connected to a communication session, presenting, via the display device of the first electronic device, a virtual representation of a remote participant of the communication session such that the virtual representation appears to be located at a first location in a physical environment, where the first location is different from a second location in the physical environment at which a second electronic device in the physical environment is located; means for detecting, in the physical environment, the second electronic device at a third location in the physical environment different from the second location in the physical environment; and means responsive to detecting the second electronic device at the third location different from the second location for presenting, via the display device of the first electronic device, the virtual representation of the remote participant such that the virtual representation of the remote participant appears to be located at a fourth location in the physical environment different from the first location and the third location In some embodiments, a method includes: while presenting an extended reality environment via a display device of a first electronic device connected to a communication session, presenting, via the display device of the first electronic device, a virtual representation of a remote participant of the communication session, where the first electronic device is in a first orientation with a second electronic device in the physical environment, the first orientation including the first electronic device being located in a first direction from the second electronic device; while the second electronic device is in the first orientation with the first electronic device, receiving a first request to present the virtual representation of the remote participant gesturing towards the first electronic device; in response to receiving the first request to present the virtual representation of the remote participant gesturing towards the first electronic device, presenting the virtual representation of the remote participant gesturing in the first direction; after presenting the virtual representation of the remote participant gesturing in the first direction and while the second electronic device is in a second orientation with the first electronic device that is different from the first orientation, the second orientation including the first electronic device located in a second direction from the second electronic device that is different from the first direction from the second electronic device, receiving a second request to present the virtual representation of the remote participant gesturing towards the first electronic device; and in response to receiving the second request to present the virtual representation of the remote participant gesturing towards the first electronic device, presenting the virtual representation of the remote participant gesturing in the second direction.

In some embodiments, a computer-readable storage medium stores one or more programs configured to be executed by one or more processors of a first electronic device, the one or more programs include instructions for: while presenting an extended reality environment via a display device of a first electronic device connected to a communication session, presenting, via the display device of the first electronic device, a virtual representation of a remote participant of the communication session, where the first electronic device is in a first orientation with a second electronic device in the physical environment, the first orientation including the first electronic device being located in a first direction from the second electronic device; while the second electronic device is in the first orientation with the first electronic device, receiving a first request to present the virtual representation of the remote participant gesturing towards the first electronic device; in response to receiving the first request to present the virtual representation of the remote participant gesturing towards the first electronic device, presenting the virtual representation of the remote participant gesturing in the first direction; after presenting the virtual representation of the remote participant gesturing in the first direction and while the second electronic device is in a second orientation with the first electronic device that is different from the first orientation, the second orientation including the first electronic device located in a second direction from the second electronic device that is different from the first direction from the second electronic device, receiving a second request to present the virtual representation of the remote participant gesturing towards the first electronic device; and in response to receiving the second request to present the virtual representation of the remote participant gesturing towards the first electronic device, presenting the virtual representation of the remote participant gesturing in the second direction.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

In some embodiments, a first electronic device, includes one or more processors, and memory storing one or more programs configured to be executed by the one or more processors, the one or more programs including instructions for: while presenting an extended reality environment via a display device of a first electronic device connected to a communication session, presenting, via the display device of the first electronic device, a virtual representation of a remote participant of the communication session, where the first electronic device is in a first orientation with a second electronic device in the physical environment, the first orientation including the first electronic device being located in a first direction from the second electronic device; while the second electronic device is in the first orientation with the first electronic device, receiving a first request to present the virtual representation of the remote participant gesturing towards the first electronic device; in response to receiving the first request to present the virtual representation of the remote participant gesturing towards the first electronic device, presenting the virtual representation of the remote participant gesturing in the first direction; after presenting the virtual representation of the remote participant gesturing in the first direction and while the second electronic device is in a second orientation with the first electronic device that is different from the first orientation, the second orientation including the first electronic device located in a second direction from the second electronic device that is different from the first direction from the second electronic device, receiving a second request to present the virtual representation of the remote participant gesturing towards the first electronic device; and in response to receiving the second request to present the virtual representation of the remote participant gesturing towards the first electronic device, presenting the virtual representation of the remote participant gesturing in the second direction.

In some embodiments, a first electronic device includes: means for, while presenting an extended reality environment via a display device of a first electronic device connected to a communication session, presenting, via the display device of the first electronic device, a virtual representation of a remote participant of the communication session, where the first electronic device is in a first orientation with a second electronic device in the physical environment, the first orientation including the first electronic device being located in a first direction from the second electronic device; means for, while the second electronic device is in the first orientation with the first electronic device, receiving a first request to present the virtual representation of the remote participant gesturing towards the first electronic device; means responsive to receiving the first request to present the virtual representation of the remote participant gesturing towards the first electronic device for presenting the virtual representation of the remote participant gesturing in the first direction; means for, after presenting the virtual representation of the remote participant gesturing in the first direction and while the second electronic device is in a second orientation with the first electronic device that is different from the first orientation, the second orientation including the first electronic device located in a second direction from the second electronic device that is different from the first direction from the second electronic device, receiving a second request to present the virtual representation of the remote participant gesturing towards the first electronic device; and means responsive to receiving the second request to present the virtual representation of the remote participant gesturing towards the first electronic device for presenting the virtual representation of the remote participant gesturing in the second direction.

In some embodiments, a method includes: while presenting an extended reality environment via a display device of the first electronic device, receiving, by a first electronic device, a request to present a virtual representation of a remote participant of a communication session, wherein the first electronic device is connected to the communication session; obtaining a capability of the remote participant of the communication session; and in response to receiving the request to present the virtual representation of the remote participant of the communication session, presenting the virtual representation of the remote participant of the communication session based on the obtained capability of the remote participant of the communication session, including: in accordance with the obtained capability of the remote participant of the communication session including a first type of capability, presenting the virtual representation of the remote participant of the communication session with a first visual characteristic; and in accordance with the obtained capability of the remote participant of the communication session including a second type of capability different from the first type of capability, presenting the virtual representation of the remote participant of the communication session with a second visual characteristic different from the first visual characteristic.

In some embodiments, a computer-readable storage medium stores one or more programs configured to be executed by one or more processors of a first electronic device with a display device, the one or more programs include instructions for: while presenting an extended reality environment via a display device of the first electronic device, receiving, by the first electronic device, a request to present a virtual representation of a remote participant of a communication session, wherein the first electronic device is connected to the communication session; obtaining a capability of the remote participant of the communication session; and in response to receiving the request to present the virtual representation of the remote participant of the communication session, presenting the virtual representation of the remote participant of the communication session based on the obtained capability of the remote participant of the communication session, including: in accordance with the obtained capability of the remote participant of the communication session including a first type of capability, presenting the virtual representation of the remote participant of the communication session with a first visual characteristic; and in accordance with the obtained capability of the remote participant of the communication session including a second type of capability different from the first type of capability, presenting the virtual representation of the remote participant of the communication session with a second visual characteristic different from the first visual characteristic.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

In some embodiments, a first electronic device comprises: a display device; one or more processors, and memory storing one or more programs configured to be executed by the one or more processors, the one or more programs including instructions for: while presenting an extended reality environment via a display device of the first electronic device, receiving, by the first electronic device, a request to present a virtual representation of a remote participant of a communication session, wherein the first electronic device is connected to the communication session; obtaining a capability of the remote participant of the communication session; and in response to receiving the request to present the virtual representation of the remote participant of the communication session, presenting the virtual representation of the remote participant of the communication session based on the obtained capability of the remote participant of the communication session, including: in accordance with the obtained capability of the remote participant of the communication session including a first type of capability, presenting the virtual representation of the remote participant of the communication session with a first visual characteristic; and in accordance with the obtained capability of the remote participant of the communication session including a second type of capability different from the first type of capability, presenting the virtual representation of the remote participant of the communication session with a second visual characteristic different from the first visual characteristic.

In some embodiments, a first electronic device includes: a display device; one or more processors; memory; means, while presenting an extended reality environment via the display device of the first electronic device, for receiving, by the first electronic device, a request to present a virtual representation of a remote participant of a communication session, wherein the first electronic device is connected to the communication session; means for obtaining a capability of the remote participant of the communication session; and means responsive to, receiving the request to present the virtual representation of the remote participant of the communication session, for presenting the virtual representation of the remote participant of the communication session based on the obtained capability of the remote participant of the communication session, including: in accordance with the obtained capability of the remote participant of the communication session including a first type of capability, presenting the virtual representation of the remote participant of the communication session with a first visual characteristic; and in accordance with the obtained capability of the remote participant of the communication session including a second type of capability different from the first type of capability, presenting the virtual representation of the remote participant of the communication session with a second visual characteristic different from the first visual characteristic.

DESCRIPTION OF THE FIGURES

For a better understanding of the various described embodiments, reference should be made to the Detailed Description below, in conjunction with the following drawings in which like reference numerals refer to corresponding parts throughout the figures.

FIG. 5 depicts a flow chart of an exemplary process for presenting an extended reality environment, according to various embodiments.

FIGS. 6A-6G illustrate techniques for presenting an extended reality environment, according to various embodiments.

FIGS. 8A-8D illustrate techniques for presenting an extended reality environment, according to various embodiments.

DETAILED DESCRIPTION

Figure 1A:
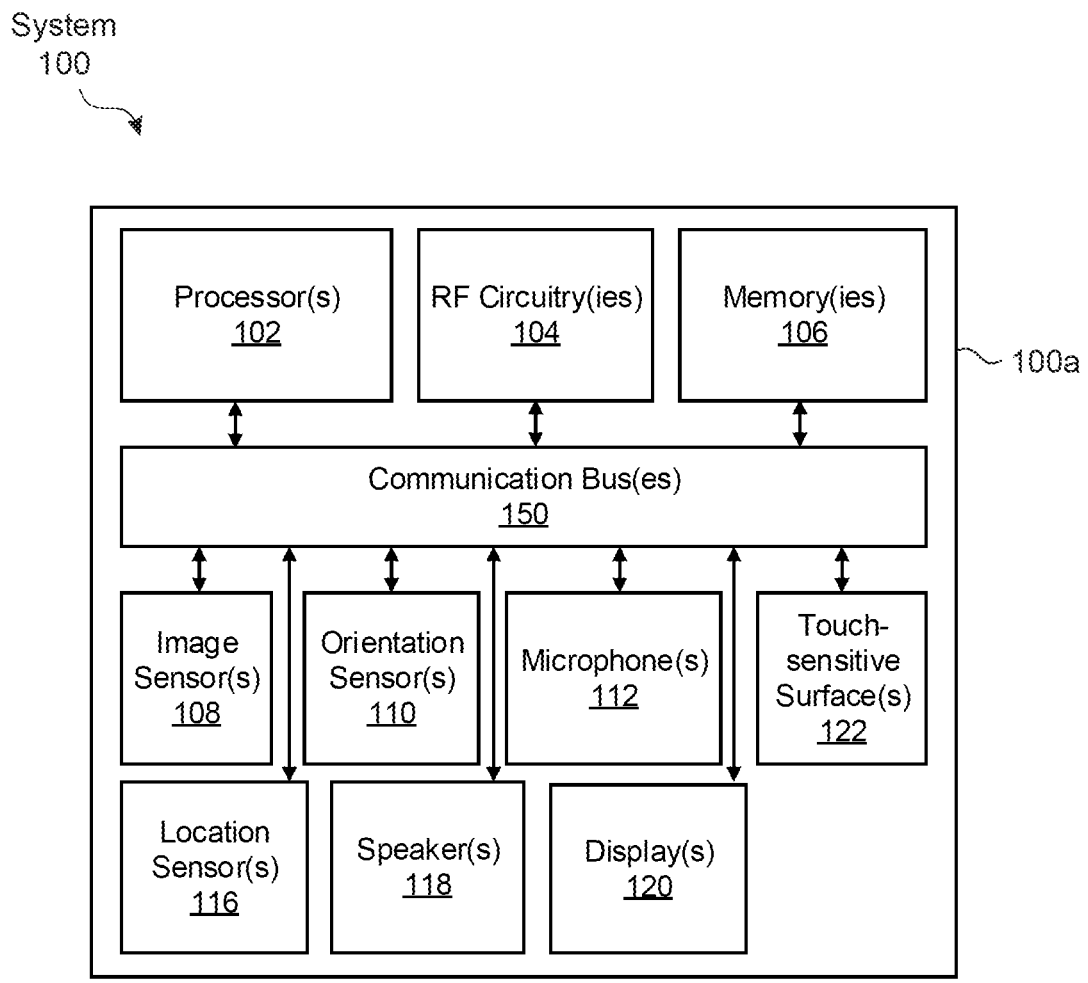
FIGS. 1A-1B depict exemplary systems for use in various extended reality technologies.

The following description sets forth exemplary methods, parameters, and the like. Such description is not intended as a limitation on the scope of the present disclosure but is instead provided as a description of exemplary embodiments.

Various examples of electronic systems and techniques for using such systems in relation to various extended reality technologies are described.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, an XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in an XR environment may be made in response to representations of physical motions (e.g., vocal commands).

A person may sense and/or interact with an XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality. A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the extended reality environment, and/or through a simulation of a subset of the person's physical movements within the extended reality environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, an MR environment is anywhere between, but not including, a wholly physical environment at one end and a VR environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of MR include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An AR environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or extended reality environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various XR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one example, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 1B:
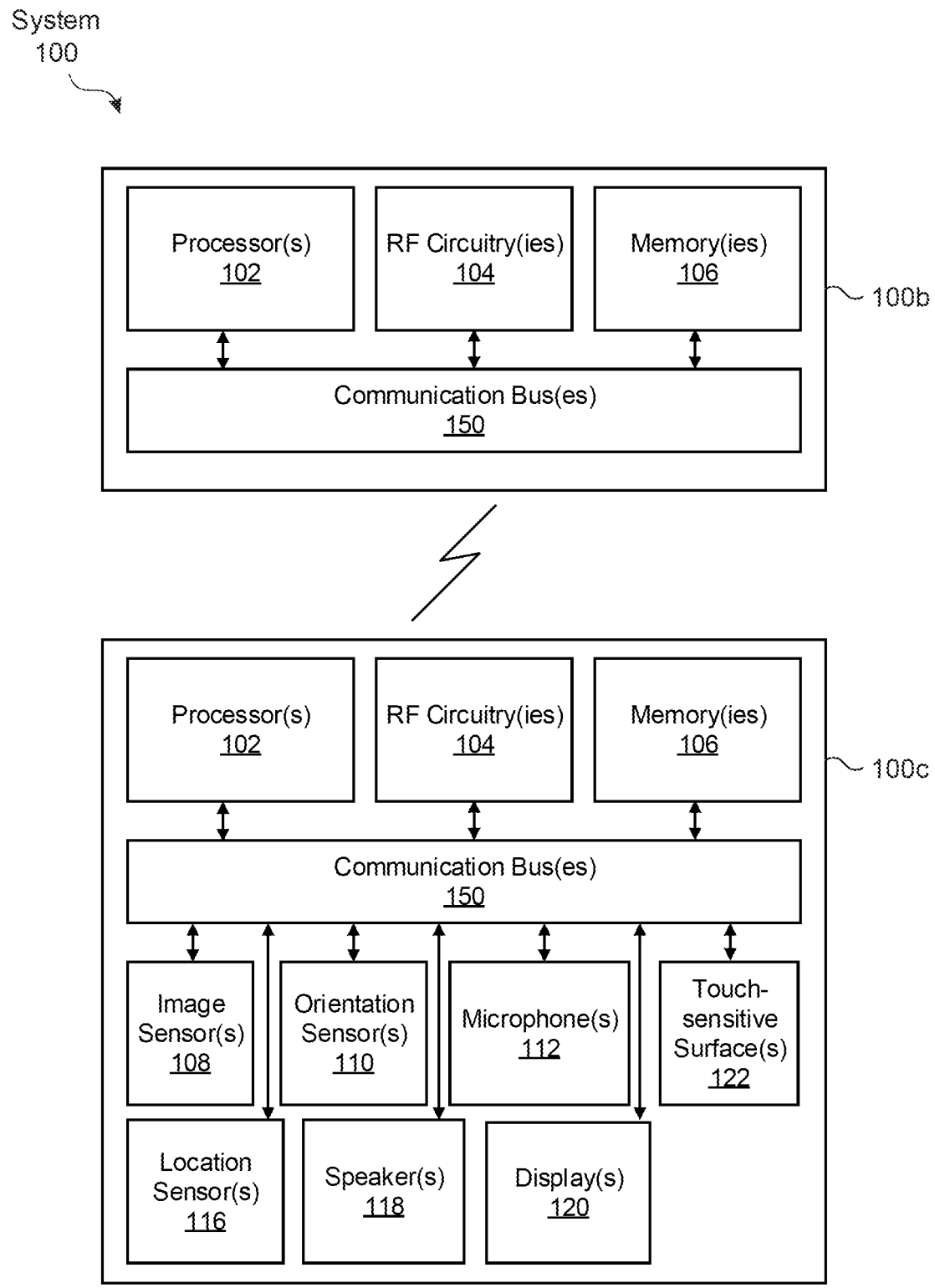

FIG. 1A and FIG. 1B depict exemplary system 100 for use in various XR technologies.

In some examples, as illustrated in FIG. 1A, system 100 includes device 100a. Device 100a includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100a.

In some examples, elements of system 100 are implemented in a base station device (e.g., a computing device, such as a remote server, mobile device, or laptop) and other elements of the system 100 are implemented in a head-mounted display (HMD) device designed to be worn by the user, where the HMD device is in communication with the base station device. In some examples, device 100a is implemented in a base station device or a HMD device.

As illustrated in FIG. 1B, in some examples, system 100 includes two (or more) devices in communication, such as through a wired connection or a wireless connection. First device 100b (e.g., a base station device) includes processor(s) 102, RF circuitry(ies) 104, and memory(ies) 106. These components optionally communicate over communication bus(es) 150 of device 100b. Second device 100c (e.g., a mobile phone, tablet, a head-mounted device, or the like) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100c.

In some examples, system 100 is a mobile device. In some examples, system 100 is a HMD device. In some examples, system 100 is a wearable HUD device.

System 100 includes processor(s) 102 and memory(ies) 106. Processor(s) 102 include one or more general processors, one or more graphics processors, and/or one or more digital signal processors. In some examples, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. In some examples, display(s) 120 include a first display (e.g., a left eye display panel) and a second display (e.g., a right eye display panel), each display for displaying images to a respective eye of the user. Corresponding images are simultaneously displayed on the first display and the second display. Optionally, the corresponding images include the same virtual objects and/or representations of the same physical objects from different viewpoints, resulting in a parallax effect that provides a user with the illusion of depth of the objects on the displays. In some examples, display(s) 120 include a single display. Corresponding images are simultaneously displayed on a first area and a second area of the single display for each eye of the user. Optionally, the corresponding images include the same virtual objects and/or representations of the same physical objects from different viewpoints, resulting in a parallax effect that provides a user with the illusion of depth of the objects on the single display.

In some examples, system 100 includes touch-sensitive surface(s) 122 for receiving user inputs, such as tap inputs and swipe inputs. In some examples, display(s) 120 and touch-sensitive surface(s) 122 form touch-sensitive display(s).

System 100 includes image sensor(s) 108. Image sensors(s) 108 optionally include one or more visible light image sensor, such as charged coupled device (CCD) sensors, and/or complementary metal-oxide-semiconductor (CMOS) sensors operable to obtain images of physical objects from the real environment. Image sensor(s) also optionally include one or more infrared (IR) sensor(s), such as a passive IR sensor or an active IR sensor, for detecting infrared light from the real environment. For example, an active IR sensor includes an IR emitter, such as an IR dot emitter, for emitting infrared light into the real environment. Image sensor(s) 108 also optionally include one or more event camera(s) configured to capture movement of physical objects in the real environment. Image sensor(s) 108 also optionally include one or more depth sensor(s) configured to detect the distance of physical objects from system 100. In some examples, system 100 uses CCD sensors, event cameras, and depth sensors in combination to detect the physical environment around system 100. In some examples, image sensor(s) 108 include a first image sensor and a second image sensor. The first image sensor and the second image sensor are optionally configured to capture images of physical objects in the real environment from two distinct perspectives. In some examples, system 100 uses image sensor(s) 108 to receive user inputs, such as hand gestures. In some examples, system 100 uses image sensor(s) 108 to detect the position and orientation of system 100 and/or display(s) 120 in the real environment. For example, system 100 uses image sensor(s) 108 to track the position and orientation of display(s) 120 relative to one or more fixed objects in the real environment.

In some examples, system 100 includes microphones(s) 112. System 100 uses microphone(s) 112 to detect sound from the user and/or the real environment of the user. In some examples, microphone(s) 112 includes an array of microphones (including a plurality of microphones) that optionally operate in tandem, such as to identify ambient noise or to locate the source of sound in space of the real environment.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical objects in the real environment. Orientation sensor(s) 110 optionally include one or more gyroscopes and/or one or more accelerometers.

With reference now to FIGS. 2A-2D, exemplary techniques for providing an XR environment for a communication session with a remote participant are described.

Figure 2A:
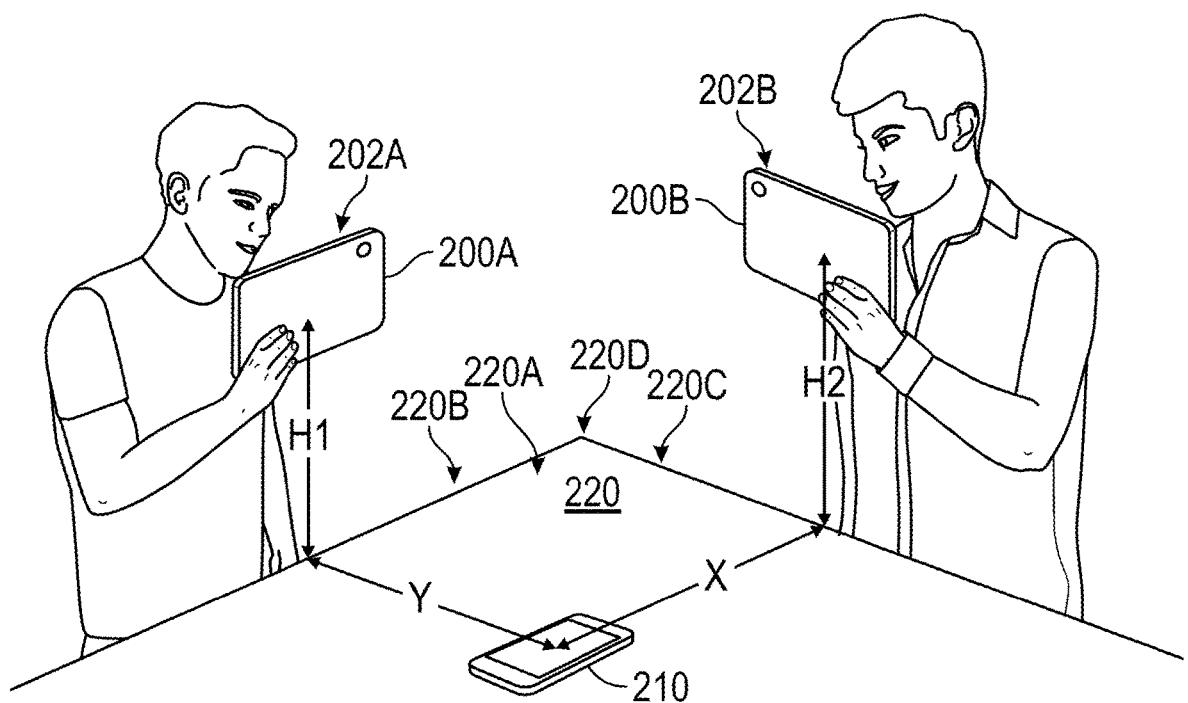
FIGS. 2A-2D illustrate techniques for presenting an extended reality environment, according to various embodiments.

FIG. 2A depicts a physical environment that includes device 200A (e.g., 100a or 100c), device 200B (e.g., 100a or 100c), device 210 (e.g., a smartphone, 100a, 100b, or 100c), and table 220. As depicted in FIG. 2A, device 200A and device 200B are tablets held by respective users. In some embodiments, device 200A and device 200B are mobile phones or head-mounted devices. Device 200A and device 200B can be different types of devices (e.g., device 200A can be a tablet and device 200B can be a head-mounted device). Device 200A and device 200B include respective displays 202A and 202B that present XR environments (e.g., display 202A is on the side of device 200A facing the user holding device 200A (as shown in FIGS. 4B-4C), and display 202B is on the side of device 200B facing the user holding device 200B, as depicted in FIG. 2A). Device 200A and device 200B can present respective perspectives of a common XR environment or respective XR environments that are different from each other in at least some respect (e.g., the XR environments share some common features but are customized for the particular user).

In some embodiments, device 210 is in communication with device 200A and/or device 200B. For reasons explained below, device 210 is referred to as an "anchor device." Table 220 is rectangular, with surface 220A (including edges 220B and 220C and corner 220D) establishing an arbitrary Cartesian frame of reference (with corner 220D as the origin) for explaining the features described with reference to FIGS. 2A-2D. Based on this frame of reference, anchor device 210 has a horizontal (x-y) location defined by coordinates X and Y, and a height (z-coordinate) of zero (e.g., anchor device 210 is lying flat on the surface of table 220); device 200A has a height H1; and device 200B has a height H2.

Figure 2B:
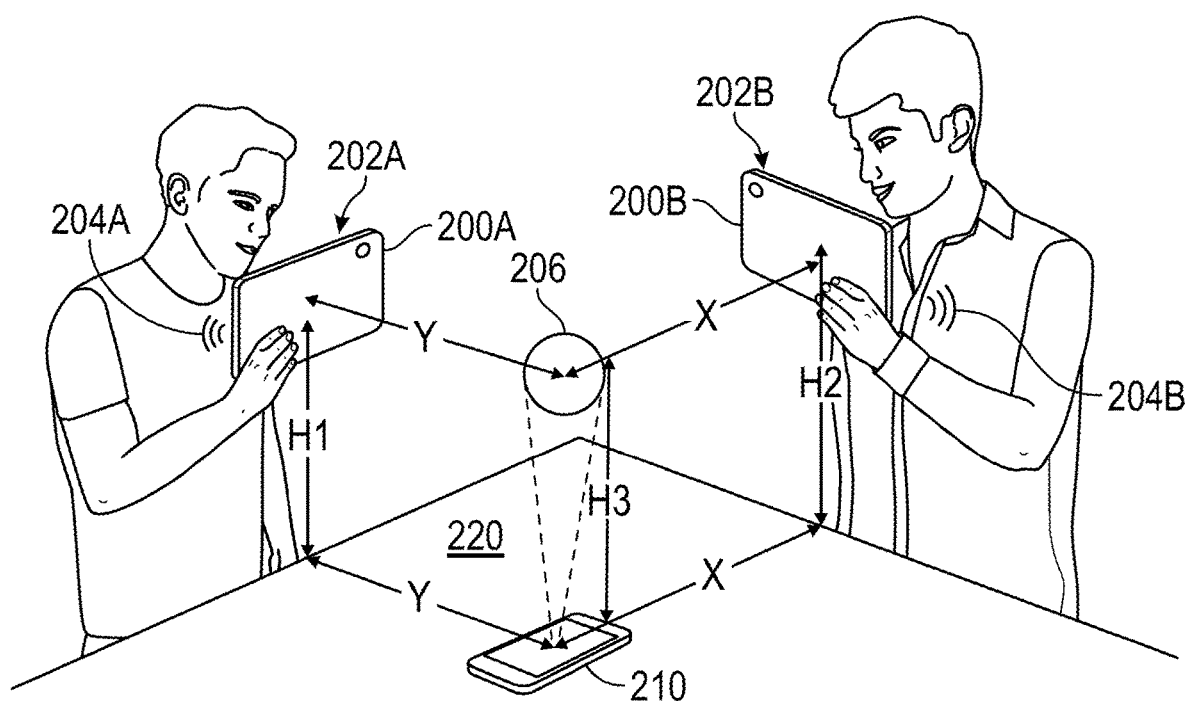

FIG. 2B depicts a perspective view of an XR environment presented by device 200A and/or device 200B when a communication session with a remote participant is initiated. Exemplary communication sessions include, but are not limited to, phone calls, conference calls, and video calls. In some embodiments, anchor device 210, device 200A, or device 200B initiates a communication session between device 200A, device 200B, and a remote participant (e.g., via a remote device). In some embodiments, device 200A, device 200B, and the remote participant can each join or decline to join the communication session. In some embodiments, device 200A and/or device 200B are connected to the communication session via a wired or wireless connection to anchor device 210. In some embodiments, device 200A and/or device 200B are connected directly to the communication session (e.g., via telecommunication or WiFi calling/video conferencing capability). In some embodiments, the remote participant can initiate (e.g., via a remote device) the communication session by, e.g., calling anchor device 210, device 200A, or device 200B.

When the communication session is initiated, device 200A and/or device 200B receive a request to present a virtual representation of the remote participant of the communication session. In response to receiving the request to present the virtual representation of the remote participant, device 200A and/or device 200B locates anchor device 210 (which is located at location (X,Y,0) in the physical environment) and presents virtual representation 206 of the remote participant (e.g., an avatar of the remote participant). For example, device 200A displays (via display 202A) the XR environment, including virtual representation 206, from the perspective of device 200A (e.g., based on the location and orientation of device 200A), and device 200B displays (via display 202B) the XR environment, including virtual representation 206, from the perspective of device 200B (e.g., based on the location and orientation of device 200B).

The location of virtual representation 206 is determined at least in part using the location of anchor device 210 (e.g., at least one coordinate of the location of virtual representation 206 is determined using at least one coordinate of the location of anchor device 210). In some embodiments, anchor device 210 is any object (anchor object) that can be located (e.g., by device 200A, 200B, GPS, computer vision, an image sensor, or an ultra-wideband technique) and used as an anchor point for determining the position of virtual representation 206. In the embodiment illustrated in FIG. 2B, the horizontal location (e.g., the location in the x-y plane of the frame of reference) of virtual representation 206 is determined using the horizontal location of anchor device 210 such that virtual representation 206 appears to be located above anchor device 210 (e.g., virtual representation 206 has the same x and y coordinates as anchor device 210, but a different height H3).

In some embodiments, the height at which virtual representation 206 is presented in the XR environment is determined independently from the location of anchor device 210. In the embodiment illustrated in FIG. 2B, virtual representation 206 is presented at the same height by both device 200A and device 200B, and specifically a height H3 that is between H1 and H2 (e.g., the average of H1 and H2, i.e., (H1+H2)/2). In some embodiments, both device 200A and device 200B present virtual representation 206 at the height of the lowest of device 200A and device 200B (e.g., H1). In some embodiments, both device 200A and 200B present virtual representation 206 at the height of the highest of device 200A and device 200B (e.g., H2). In some embodiments, device 200A and device 200B present virtual representation 206 at different heights (e.g., device 200A presents virtual representation 206 at the height of device 200A (H1), and device 200B presents virtual representation 206 at the height of device 200B (H2)). In some embodiments, virtual representation 206 is presented at a height other than those described above (e.g., a predetermined height, a predetermined height relative to a reference frame of the XR environment, or a predetermined height relative to anchor device 210). In some embodiments, virtual representation 206 is presented at a predetermined distance from anchor device 210.

In the embodiment illustrated in FIG. 2B, virtual representation 206 is a non-descript object (e.g., a sphere). The virtual representation of the remote participant can be other shapes (e.g., triangle, star, cube) and can have various visual characteristics (e.g., different colors, glowing effects, translucency, etc.). In some embodiments, virtual representation 206 includes an image (e.g., a two-dimensional or three-dimensional image) associated with the remote participant.

In the embodiment illustrated in FIG. 2B, device 200A and device 200B provide audio output (represented by waves 204A and 204B, respectively) of the communication session. In some embodiments, device 200A and/or device 200B provide 3D or spatial audio that provides the perception of virtual representation 206 as an audio source (e.g., a point audio source) in 3D space, such that the user perceives audio from the remote participant (via the communication session) as if it is coming from the virtual representation. In some embodiments, virtual representation 206 provides a visual indication when audio data is received from a remote participant or remote device. For example, virtual representation 206 can change color and/or size (e.g., fluctuate in color and/or size via an animation) to indicate that the remote participant is speaking.

Anchor device 210 can refrain from outputting audio of the communication session. In some embodiments, anchor device 210 refrains from outputting audio of the communication session in accordance with data indicating that all local participants of the communication session have audio output devices. For example, if device 200A and device 200B are connected to the communication session via anchor device 210, anchor device 210 can communicate audio data of the communication session to device 200A and device 200B, but does not output audio of the communication session. In some embodiments, as described below with reference to FIG. 2D, anchor device 210 can output audio of the communication session.

During the communication session, anchor device 210 can display a user interface with information regarding the communication session (e.g., duration of the communication session, name of the remote participant(s), video from the device(s) of the remote participant(s)) and/or one or more affordances (e.g., user interface elements (e.g., icons) with which a user can interact) for controlling the communication session (e.g., an end call button). In some embodiments, anchor device 210 can refrain from displaying a user interface with information and/or affordances for the communication session (e.g., to provide privacy for the local participants using device 200A and device 200B).

Figure 2C:
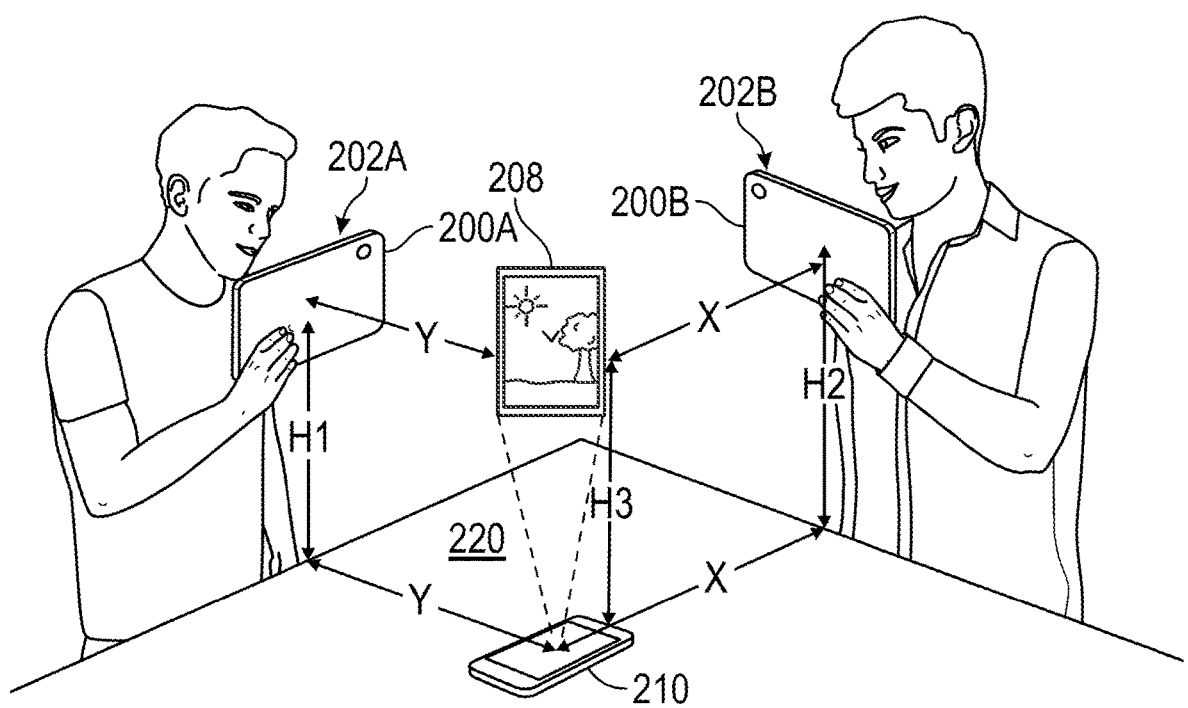

Turning to FIG. 2C, the XR environment is updated to include a virtual object representing media content. As shown in FIG. 2C, device 200A and device 200B cease presenting virtual representation 206 and present media content 208 in the location at which virtual representation 206 was presented. In some embodiments, media content 208 is a virtual object representing an image, video, or interactive media item (e.g., a game or sketch board). Media content 208 can be displayed in response to a participant in the communication session sharing the content via the communication session. In some embodiments, media content 208 is presented concurrently with virtual representation 206 (e.g., media content is located above, below, or to the side of virtual representation 206 in the XR environment).

Figure 2D:
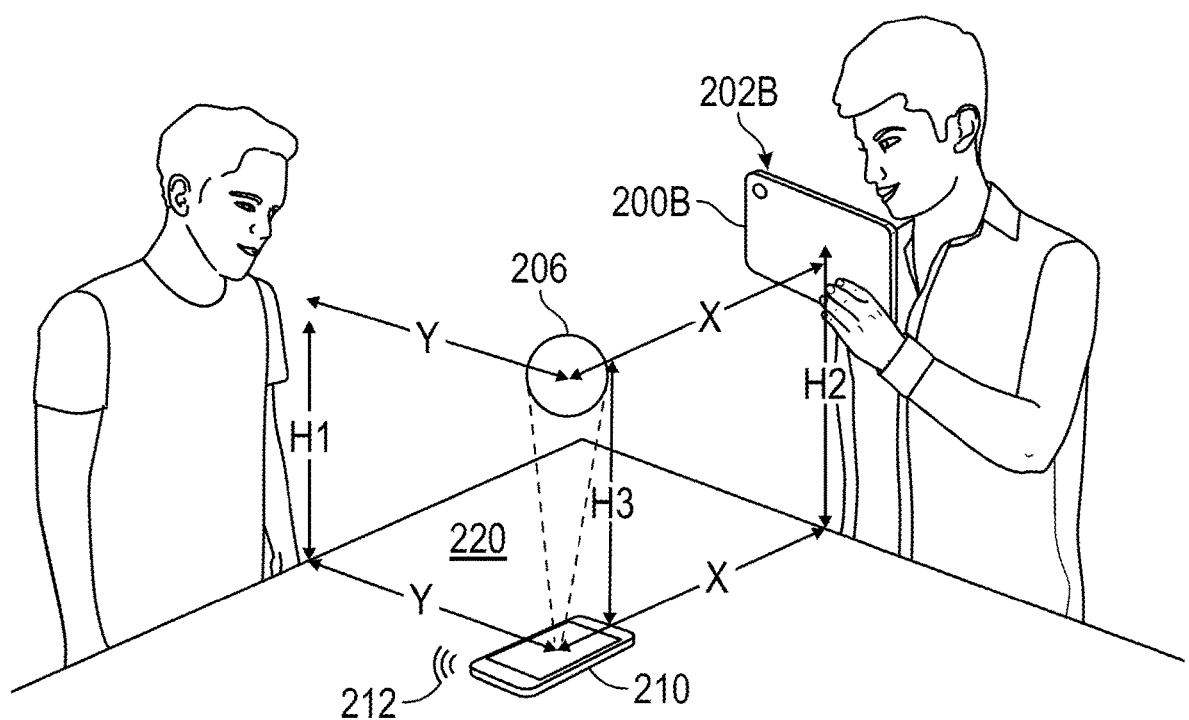

Turning to FIG. 2D, an embodiment is illustrated in which a participant of the communication session is not using a personal audio output device (e.g., device 200A). As mentioned above, anchor device 210 can output audio 212 of the communication session, so that participants of the communication session without a personal audio output device are provided with audio of the communication session. In some embodiments, anchor device 210 outputs audio 212 of the communication session in accordance with receiving information (e.g., via sensors or receiving data from another device) that there is a participant of the communication session in proximity of anchor device 210 that is not using a personal audio output device.

In some embodiments, data is sent to the remote participant (or to a device associated with the remote participant) to allow the remote participant to have an experience similar to that of the local participants depicted in FIGS. 2A-2D. For example, data representing the local environment can be obtained (e.g., via device 200A, 200B, and/or 210) and sent to the remote participant (e.g., via device 200A, 200B, and/or 210). Using this data, a remote device can present to the remote participant an XR environment associated with the communication session (e.g., an XR environment analogous to the environment described with reference to FIGS. 2A-2D). For example, the remote device can present an XR environment including virtual representations of the local participants. Data representing the local environment can include, e.g., an image or video of the local environment, the number of local participants, the identities of the local participants, an indication of which (if any) local participant is providing an input (e.g., an audio input (e.g., talking), a motion input (e.g., a body gesture, such as a hand or head gesture), or a manual input (e.g., physically moving device 200A, 200B, or 210, or activating a real or virtual button on device 200A, 200B, or 210)). In some embodiments, similar to the features described with reference to FIG. 2C, media content from device 200A, 200B, or 210 can be selected by a local participant and sent to the remote participant for display in the XR environment presented by the remote device.

It should be recognized that the embodiments discussed above with respect to FIGS. 2A-2D are exemplary and are not intended to be limiting. For example, the techniques described above can be applied to a communication session including only one local participant, more than two local participants, or more than one remote participant. Also, the techniques described above can be incorporated into the embodiments described below with reference to FIGS. 3, 4A-4C, 5, 6A-6G, and 7, and the techniques described below can be incorporated into the embodiments described above with reference to FIGS. 2A-2D.

Figure 3:
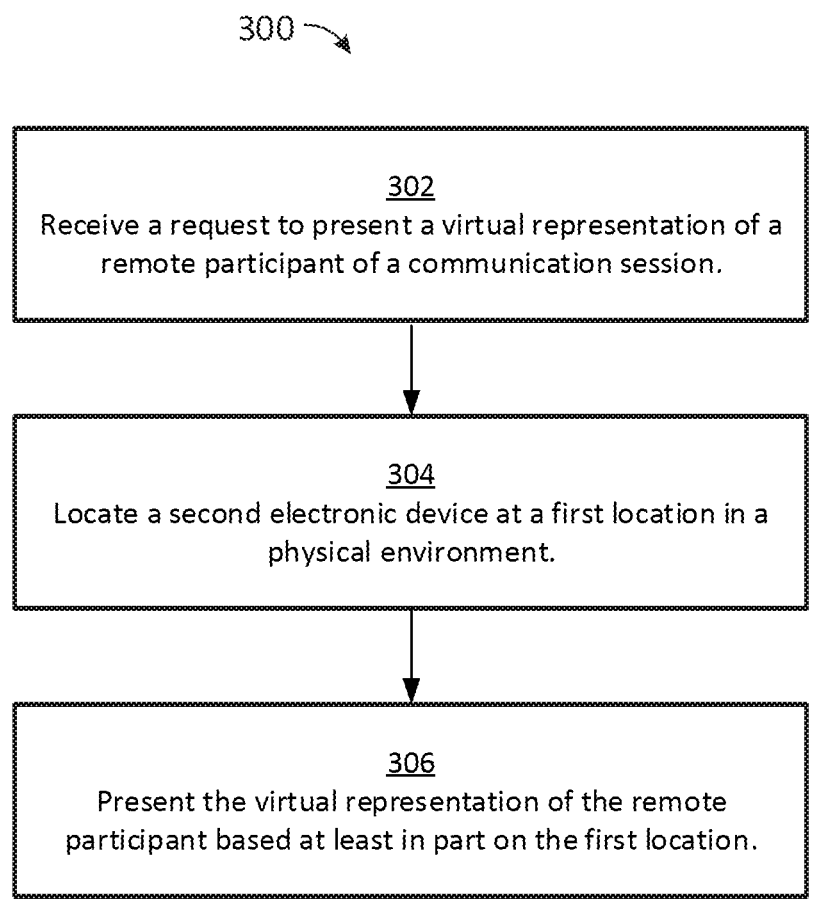
FIG. 3 depicts a flow chart of an exemplary process for presenting an extended reality environment, according to various embodiments.

Turning now to FIG. 3, a flow chart is depicted of exemplary process 300 for providing an XR environment for a communication session (e.g., a phone call, teleconference, video conference), including the features described above with reference to FIGS. 2A-2D. Process 300 can be performed using an electronic device (e.g., 100a, 100c, 200A, or 200B), referred to as "the first electronic device" for the purpose of describing process 300, or a system (e.g., 100) that includes the electronic device. Although the blocks of process 300 are depicted in a particular order in FIG. 3, these blocks can be performed in other orders. Further, one or more blocks of process 300 can be optional (e.g., omitted) and/or additional blocks can be performed.

At block 302, the first electronic device receives a request to present a virtual representation (e.g., 206) of a remote participant of a communication session. The first electronic device is connected to the communication session (e.g., via a direct telecommunication or WiFi link or another device (e.g., 210)). In some embodiments, the first electronic device receives the request to present the virtual representation while presenting an XR environment via a display device (e.g., 202A, 202B) of the first electronic device.

In some embodiments, the virtual representation is based on a user associated with a remote electronic device (e.g., a user uniquely associated with the remote electronic device; the remote electronic device is a phone that is registered to the remote participant; the remote electronic device is a computer, tablet, or smartphone that is logged into a user account of the remote participant).

In some embodiments, receiving the request to present the virtual representation occurs in response to the remote participant joining the communication session (e.g., in response to a device associated with the remote participant accepting an invitation (answering a call) to join the communication session). In some embodiments, receiving the request to present the virtual representation occurs in response to the first electronic device joining the communication session or receiving an invitation to join the communication session. In some embodiments, receiving the request to present the virtual representation occurs in response to initiation of the communication session (e.g., by the first electronic device). In some embodiments, receiving the request to present the virtual representation occurs in response to the remote participant being invited to join the communication session (e.g., the first electronic device is requested to present the virtual representation while waiting for the remote participant to join the communication session).

At block 304, the first electronic device locates a second electronic device (e.g., anchor device 210) at a first location in a physical environment. In some embodiments, the first electronic device locates the second electronic device in response to receiving the request to present the virtual representation of the remote participant. In some embodiments, the second electronic device is located using GPS, computer vision, or an ultra-wideband technique. In some embodiments, the first electronic device locates the second electronic device by obtaining data representing the location of the second electronic device from another source.

In some embodiments, the first electronic device is in communication with the second electronic device (e.g., the first electronic device is connected to the second electronic device via a wired or wireless (e.g., Bluetooth, NFC, or WiFi) connection)). In some embodiments, the first electronic device is connected to the communication session via the second electronic device. In some embodiments, the second electronic device is in communication with the remote electronic device (e.g., a computer, tablet, or phone associated with the remote participant) via the communication session.

At block 306, the first electronic device presents (e.g., via a display device) the virtual representation of the remote participant based at least in part on the first location (e.g., the location of an anchor device). In some embodiments, the first electronic device presents the virtual representation of the remote participant in response to receiving the request to present the virtual representation of the remote participant. In some embodiments, the first electronic device provides audio output of the communication session that creates the perception of the virtual representation as an audio source of the audio output.

In some embodiments, the virtual representation of the remote participant is presented in the XR environment. In some embodiments, the first electronic device presents the virtual representation of the remote participant while the second electronic device is located at the first location in the physical environment. In some embodiments, the first electronic device presents the virtual representation of the remote participant such that the virtual representation appears to be located at a second location in the physical environment (e.g., the second location is different from the first location). In some embodiments, a first coordinate of the second location (e.g., the x coordinate of the virtual representation) is determined using a first coordinate of the first location (e.g., the x coordinate of the anchor device). In some embodiments, a second coordinate of the second location (e.g., z coordinate or height of the virtual representation) is determined independently from the first location (e.g., the location of the anchor device is not a factor in determining at least one component of the location of the virtual representation of the remote participant). In some embodiments, the location of the second electronic device is not a factor in any respect in determining the location of the virtual representation.

In some embodiments, a third coordinate of the second location (e.g., the y coordinate of the virtual representation) is determined using a second coordinate of the first location (e.g., the y coordinate of the anchor device). In some embodiments, the second location is above (e.g., directly above) the first location (e.g., relative to the direction of gravity, relative to a frame of reference of the XR environment, or relative to a frame of reference of the anchor device). In some embodiments, the second location is a predetermined distance from the first location (e.g., the virtual representation is presented at a predetermined offset from the anchor device).

In some embodiments, at least one coordinate of the second location (e.g., the z coordinate or height of the virtual representation) is determined using a location of an electronic device different from the second electronic device (e.g., the location of the virtual representation is based on the location of the first electronic device and/or a location of a device of another user). In some embodiments, the second coordinate of the second location (e.g., the z coordinate or height of the virtual representation) is determined using a location of a third electronic device (e.g., the z coordinate or height of the first electronic device) and a location of a fourth electronic device (e.g., the z coordinate or height of a device different from the first electronic device and the second electronic device; a device of another participant of the communication session; a device sharing the same XR environment that is connected to the communication session or not). In some embodiments, the second coordinate of the second location (e.g., z coordinate or height of the virtual representation) is determined using an average that includes a first coordinate (e.g., z coordinate or height) of the location of the third electronic device and a first coordinate (e.g., z coordinate or height) of the location of the fourth electronic device (e.g., the virtual representation is presented at a height that is the average of the height of the first electronic device and the height of a device of another participant of the communication session in the XR environment). In some embodiments, the second coordinate of the second location is determined using a maximum of a first coordinate (e.g., z coordinate or height) of the location of the third electronic device and a first coordinate (e.g., z coordinate or height) of the location of the fourth electronic device (e.g., the virtual representation is presented at a height that is the highest of all devices associated with the XR environment that are connected to the communication session). In some embodiments, the second coordinate of the second location is determined using a minimum of a first coordinate (e.g., z coordinate or height) of the location of the third electronic device and a first coordinate (e.g., z coordinate or height) of the location of the fourth electronic device (e.g., the virtual representation is presented at a height that is the lowest of all devices associated with the XR environment that are connected to the communication session).

In some embodiments, a fifth electronic device (e.g., the fourth electronic device) associated with a participant of the communication session presents the virtual representation of the remote participant such that the virtual representation appears to be located at the second location in the physical environment (e.g., the virtual representation of the remote participant is presented by another electronic device associated with a local participant of the communication session such that the virtual representation appears to have the same height as presented by the first electronic device). In some embodiments, the fifth electronic device presents the virtual representation of the remote participant such that the virtual representation appears to be located at a location in the physical environment different from the second location (e.g., the virtual representation of the remote participant is presented at a different height by each device based on the height of the respective device, e.g., such that the virtual representation appears at eye level to each user).

In some embodiments, after presenting the virtual representation of the remote participant, the first electronic device receives an indication that the remote participant and the first electronic device are not connected via the communication session (e.g., the first electronic device or the remote participant (or a device associated with the remote participant) is disconnected from the communication session or declines an invitation to join the communication session (e.g., does not answer the call)). In some embodiments, in response to receiving the indication that the remote participant and the first electronic device are not connected via the communication session, the first electronic device ceases to present the virtual representation of the remote participant.

In some embodiments, the first electronic device presents (e.g., via the display device) media content (e.g., 208; a picture, video, game, interactive multi-media) such that the media content appears to be located at a third location in the physical environment (e.g., the second location in the physical environment; a location that is different from the first location). In some embodiments, a first coordinate of the third location (e.g., the x coordinate of the media content) is determined using a coordinate of the first location (e.g., the x coordinate of the anchor device). In some embodiments, the media content is presented above (e.g., directly above) the second electronic device (e.g., relative to the direction of gravity). In some embodiments, the media content is presented concurrently with the virtual representation of the remote participant. In some embodiments, the media content is presented without (e.g., in place of) the virtual representation of the remote participant (e.g., the first electronic device ceases presenting the virtual representation and presents the media content at the prior location of the virtual representation or a different position).

In some embodiments, the virtual representation is moved and/or animated based on a gesture of the remote participant. In some embodiments, data representing a gesture (e.g., eye gesture/gaze or head position) of the remote participant of the communication session is received, and in response to receiving the data representing the gesture of the remote participant of the communication session, the first electronic device presents the virtual representation of the remote participant such that the virtual representation changes from a first state (e.g., position (location and/or orientation), size, color, shape, visual configuration) to a second state different from the first state (e.g., the virtual representation is moved and/or animated). In some embodiments, in response to a remote participant changing focus (e.g., eye gesture/gaze or head position) from one local participant to another local participant (e.g., by moving eye gaze from a representation of one local participant displayed on a device of the remote participant to a representation of another local participant displayed on the remote participant's device), the presentation of the virtual representation is changed (e.g., moved) to focus on the corresponding local participant. In some embodiments, movement of the virtual representation in response to a gesture by the remote participant is not directly proportional to a movement of the gesture by the remote participant. In some embodiments, the gesture of the remote participant has a first magnitude (e.g., change in angular direction of an eye gaze), and a difference between the second state of the virtual representation and the first state of the virtual representation has a second magnitude different from the first magnitude. In some embodiments, non-physical retargeting of a remote participant's gesture/attention cue(s) is performed to match a physical configuration of the local physical environment (e.g., the environment that includes the first electronic device). In some embodiments, the gesture of the remote participant includes movement (e.g., nodding or shaking) of the head of the remote participant.

In some embodiments, the virtual representation is animated when the remote participant speaks. In some embodiments, data representing audio from the remote participant of the communication session is received, and in response to receiving the data representing the audio from the remote participant of the communication session, the first electronic device presents the virtual representation of the remote participant such that the virtual representation is animated (e.g., in accordance with the audio from the remote participant; a characteristic of the audio from the remote participant (e.g., magnitude, frequency) is used to animate the virtual representation).

Executable instructions for performing the features of process 300 described above are, optionally, included in a transitory or non-transitory computer-readable storage medium (e.g., memory(ies) 106) or other computer program product configured for execution by one or more processors (e.g., processor(s) 102). Further, the features of process 300 described above can be incorporated into processes 500, 700, and 1000 described below, and the features of processes 500, 700, and 1000 described below can be incorporated into process 300.

Turning now to FIGS. 4A-4D, techniques are described for presenting a virtual representation of a remote participant of a communication session when there is movement of the anchor device.

Figure 4A:
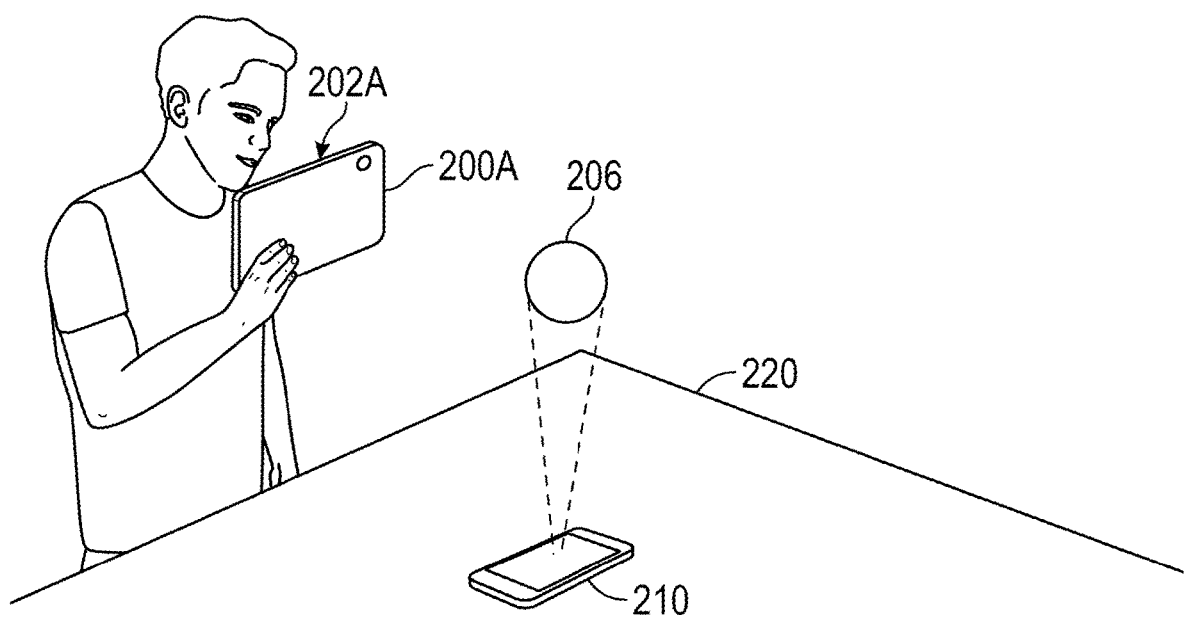
FIGS. 4A-4D illustrate techniques for presenting an extended reality environment, according to various embodiments.
Figure 4B:
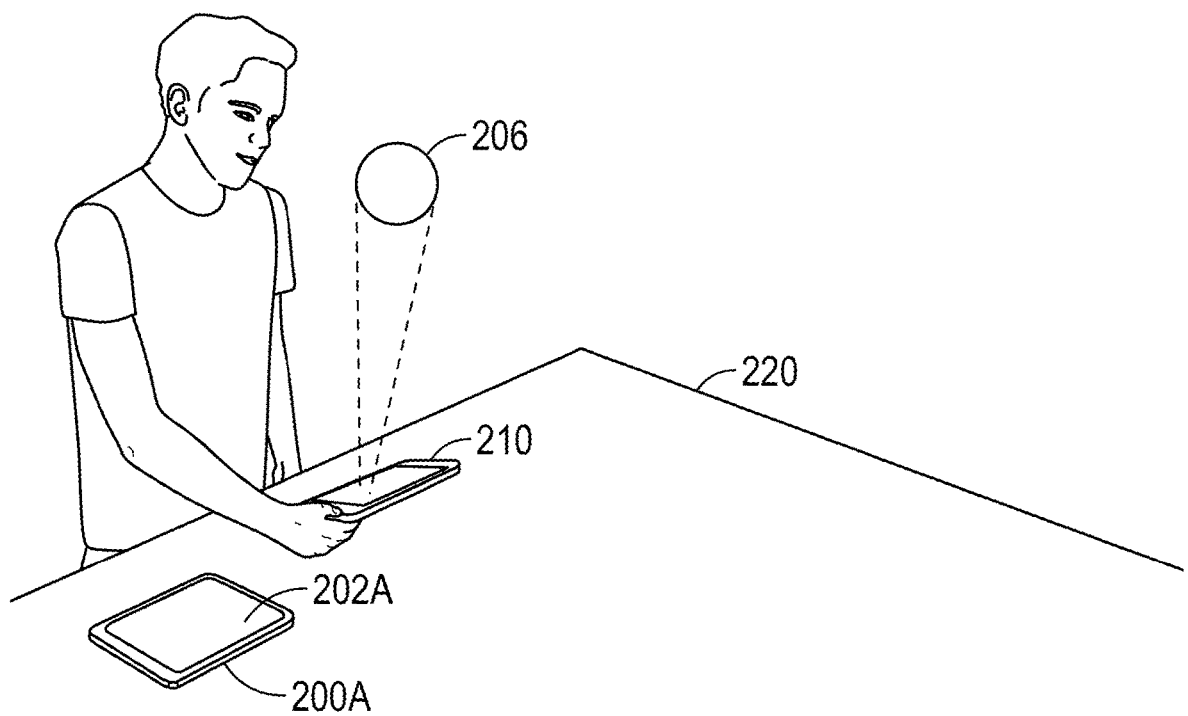
Figure 4C:
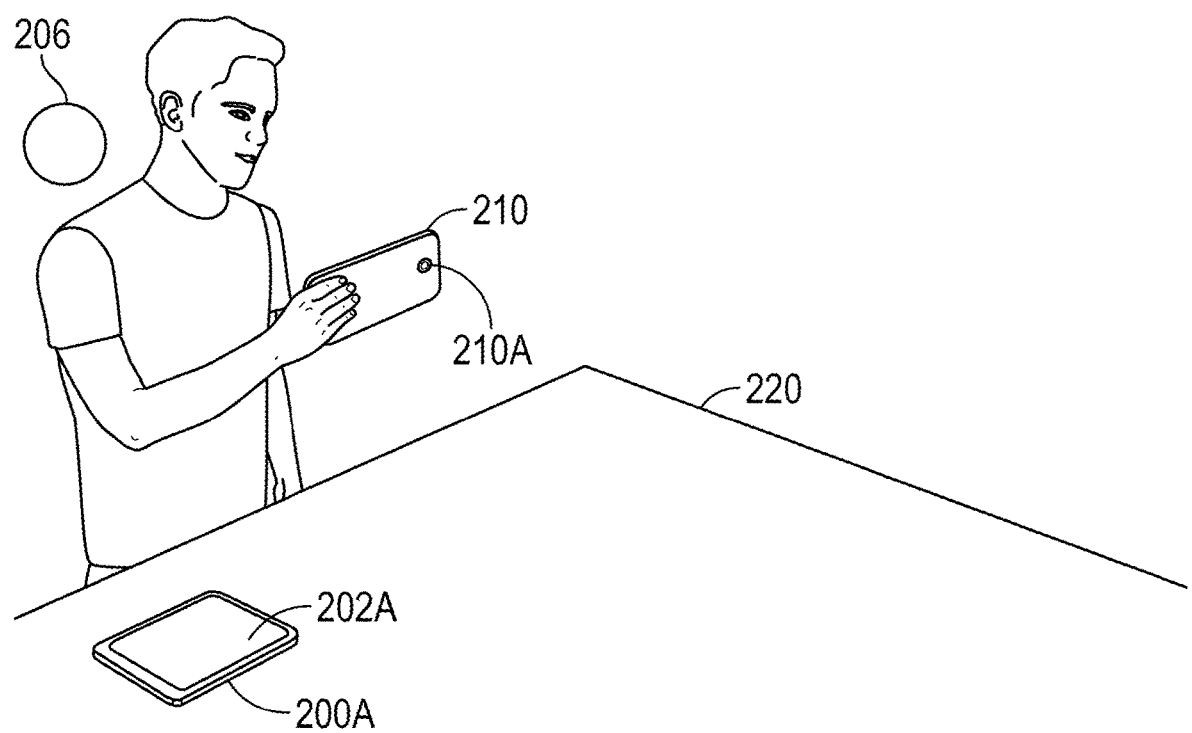

FIG. 4A illustrates an XR environment associated with a communication session. The user illustrated in FIG. 4A is a local participant of the communication session and is holding device 200A, which presents virtual representation 206 of a remote participant of the communication session above anchor device 210. In the embodiment illustrated in FIG. 4A, device 200A, virtual representation 206, and anchor device 210 are as described above with reference to FIGS. 2A-2D and FIG. 3. Although only one local participant is illustrated in FIG. 4A, the features described below with reference to FIGS. 4A-4D can be applied to communication sessions involving two local participants (e.g., as illustrated in FIGS. 2A-2D) or more than two local participants. Also, the features described above with reference to FIGS. 2A-2D and FIG. 3 can be combined with the features described below.

Turning to FIG. 4B, the local participant moves anchor device 210. When anchor device 210 is moved, virtual representation 206 can be moved in the XR environment according to the movement of anchor device 210. In the embodiment illustrated in FIG. 4B, virtual representation 206 is moved so as to remain positioned above anchor device 210. In the embodiment illustrated in FIG. 4B, virtual representation 206 remains at the same height as before anchor device 210 was moved, despite a change in height of anchor device 210. The distance between virtual representation 206 and anchor device 210 is changed (e.g., reduced) in order to maintain virtual representation 206 at the same height. In some embodiments, the distance between virtual representation 206 and anchor device 210 is fixed such that raising or lowering anchor device 210 in the physical environment causes virtual representation 206 to be raised or lowered by a corresponding amount. In some embodiments, if anchor device 210 is raised vertically such that the height of anchor device 210 changes without a change in the transverse position (e.g., x-y position) of anchor device 210, virtual representation 206 remains stationary.

In the embodiment illustrated in FIG. 4B, virtual representation 206 remains above anchor device 210 relative to the physical environment despite a change in the angular orientation of anchor device 210 relative to the physical environment. That is, the direction from anchor device 210 to virtual representation 206, relative to anchor device 210, changes as the angular orientation of anchor device 210 changes relative to the physical environment. In some embodiments, rotation of anchor device 210 in the physical environment causes virtual representation 206 to move (e.g., rotate with anchor device 210, relative to the physical environment). In some instances, rotation of anchor device 210 in the physical environment causes virtual representation 206 to move such that virtual representation 206 is no longer above anchor device 210 with respect to the physical environment (e.g., the direction from anchor device 201 to virtual representation 206 is fixed relative to anchor device 210).

Turning to FIG. 4C, virtual representation 206 can be presented (e.g., in a predetermined position) when anchor device 210 is moved to a predetermined location or used for a particular application. In FIG. 4C, the local participant positions anchor device 210 upright (in a landscape or portrait orientation) such that the display of anchor device 210 is facing the local participant and the local participant can capture an image or video using camera 210A on the back of anchor device 210. In some embodiments, a camera application is activated on anchor device 210. When anchor device 210 is positioned in a predetermined position (e.g., a position indicating that a user intends to capture an image or video) and/or a predetermined application (e.g., a camera application) is activated on anchor device 210, virtual representation 206 is presented in a predetermined position (e.g., moved to the predetermined position). In FIG. 4C, the predetermined position is above the shoulder of the local participant wearing device 200A (e.g., to the side of device 200A). When virtual representation 206 is positioned as illustrated in FIG. 4C, the view of anchor device 210 and the physical environment from the perspective of the local participant is similar to the view from the perspective of virtual representation 206 (e.g., as if virtual representation 206 is "looking" over the local participant's shoulder). In some embodiments, virtual representation 206 is presented in the predetermined position in response to anchor device 210 being positioned in a predetermined position (e.g., regardless of whether a predetermined application is active on anchor device 210). In some embodiments, virtual representation 206 is presented in the predetermined position in response to a predetermined application being active on anchor device 210 (e.g., regardless of whether anchor device 210 is in a predetermined position). In some embodiments, virtual representation 206 is presented in the predetermined position in response to a predetermined application being active on anchor device 210 concurrently with anchor device 210 being in a predetermined position.

In FIGS. 4B-4C, the user has placed device 200A on table 220 while picking up anchor device 210. In the embodiment illustrated in FIGS. 4B-4C, device 200A continues to present the XR environment, but virtual representation 206 is not visible from the perspective of device 200A (since device 200A is "looking" down at table 220). In embodiments in which device 200A is positioned such that virtual representation 206 is visible from the perspective of device 200A, device 200A presents the XR environment (including virtual representation 206) such that virtual representation 206 appears at the locations depicted in FIGS. 4B-4C.

Figure 4D:
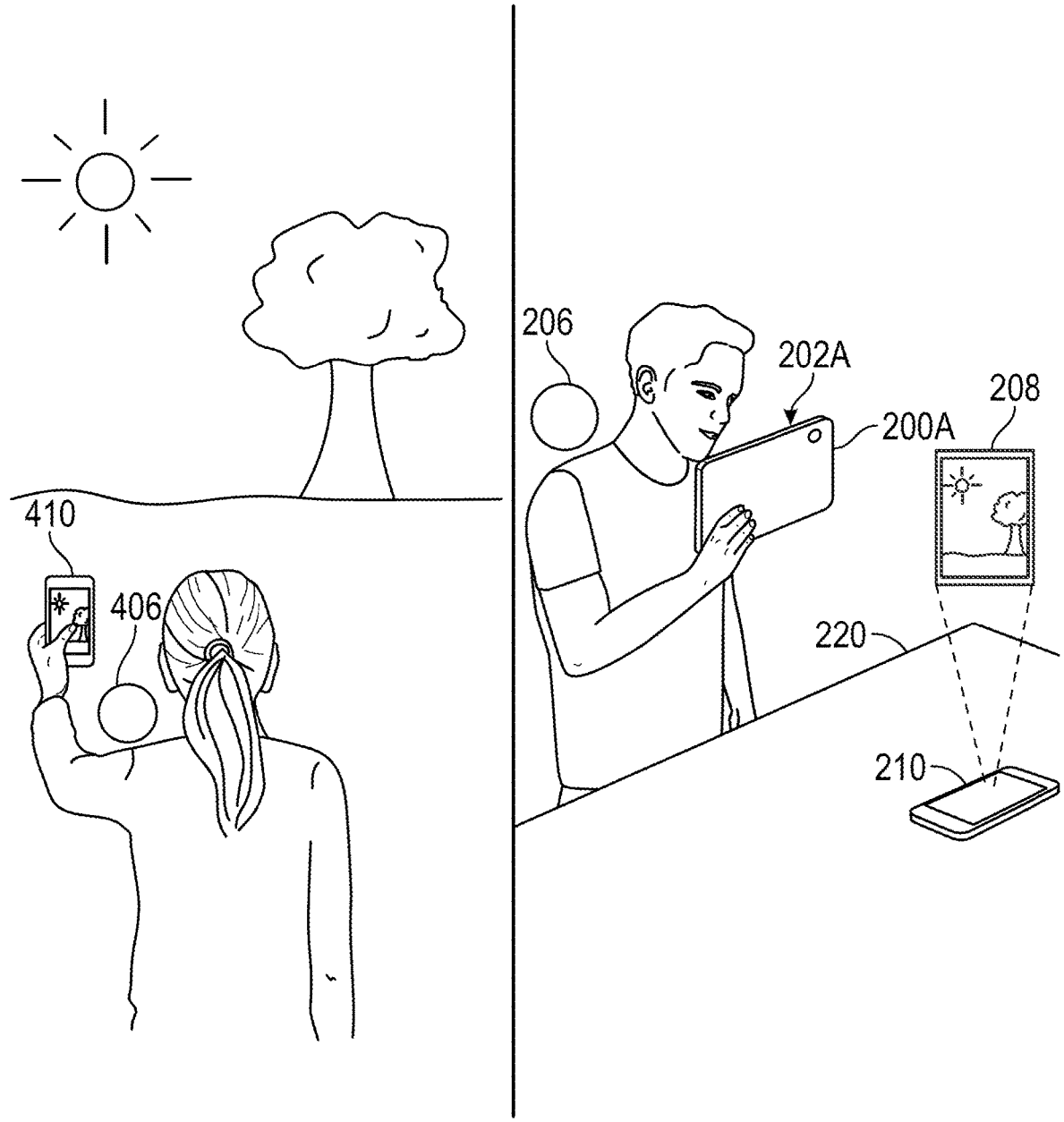

Turning to FIG. 4D, virtual representation 206 is positioned (e.g., in a predetermined position) based on (e.g., in response to) data received from the remote participant of the communication session (e.g., data received from a device associated with the remote participant of the communication session). The data received from the remote participant can represent a predetermined type of content (e.g., an image captured by a camera of the device of the remote participant) or a predetermined configuration of the device of the remote participant. A configuration of the device can include, e.g., a position (e.g., location and/or orientation) of the device relative to a physical environment of the remote participant and/or the state of an application on the device (e.g., a camera application is active).

The left side of FIG. 4D illustrates a remote XR environment of the remote participant of the communication session. The XR environment of the remote participant includes the physical environment surrounding the remote participant, including device 410 being used by the remote participant, and virtual representation 406 of the local participant shown in FIGS. 4A-4C and on the right side of FIG. 4D. In some embodiments, virtual representation 406 is presented by another device of the remote participant (e.g., a mobile phone, tablet, or an HMD device associated with the remote participant). As shown on the left side of FIG. 4D, the remote participant is holding up device 410 and using a camera application to capture an image of the physical environment surrounding the remote participant. Virtual representation 406 is positioned over the shoulder of the remote participant (e.g., as if the local participant is standing next to or looking over the shoulder of the remote participant).

The right side of FIG. 4D illustrates the XR environment of the local participant of the communication session corresponding to the environment of the remote participant on the left side of FIG. 4D described above. In the embodiment illustrated on the right side of FIG. 4D, anchor device 210 is positioned flat on table 220 and representation 208 of content captured by the camera of device 410 of the remote participant is presented (e.g., by device 200A) above anchor device 210 (e.g., similar to FIG. 2C described above). While presenting representation 208, virtual representation 206 of the remote participant is presented (e.g., moved to) a position above the shoulder of the local participant (e.g., as if the remote participant is standing next to the local participant and looking at representation 208). In this way, the XR environments of the local participant and the remote participant simulate the experience of the participants being positioned side-by-side with one another, sharing similar views of the physical environment of the remote participant. In some embodiments, virtual representation 206 is presented at the predetermined position above the local participant's shoulder in response to receiving data indicating that the remote participant has positioned his or her device in a predetermined position (e.g., to capture an image or video), that a predetermined application (e.g., a camera application) is active on the device of the remote participant, or that the remote participant's device is in the predetermined position while concurrently running the predetermined application (e.g., the predetermined application is active on the device of the remote participant).

Turning to FIG. 5, a flow chart is depicted of exemplary process 500 for providing an XR environment for a communication session (e.g., a phone call, teleconference, video conference), including the features described above with reference to FIGS. 4A-4D. Process 500 can be performed using an electronic device (e.g., 100a, 100c, 200A, or 200B), referred to as "the first electronic device" for the purpose of describing process 500, or a system (e.g., 100) that includes the electronic device. Although the blocks of process 500 are depicted in a particular order in FIG. 5, these blocks can be performed in other orders. Further, one or more blocks of process 500 can be optional (e.g., omitted) and/or additional blocks can be performed.

At block 502, the first electronic device presents (e.g., via a display device of the first electronic device), a virtual representation (e.g., 206, an avatar) of a remote participant of a communication session such that the virtual representation appears to be located at a first location in a physical environment (e.g., FIG. 4A). The first location is different from a second location in the physical environment at which a second electronic device (e.g., 210) in the physical environment is located. In some embodiments, the first electronic device presents the virtual representation while presenting an XR environment via a display device of the first electronic device (e.g., 202A) and while the first electronic device is connected to the communication session.

In some embodiments, the first location is determined using the second location (e.g., the location of the virtual representation is determined using the location of the anchor device). In some embodiments, the virtual representation of the remote participant is presented via the display device in the XR environment. The virtual representation can be presented according to any of the techniques described above with reference to FIGS. 2A-2D and FIG. 3. For example, the location of the virtual representation (e.g., 206) can be based on the location of the anchor device (e.g., 210) and/or the location(s) of one or more other electronic devices (e.g., above the second electronic device, a predetermined distance from the second electronic device, at the height of an electronic device (e.g., the first electronic device), at a height that is the average of the heights of multiple electronic devices (e.g., the first electronic device and a third electronic device)). In some embodiments, the second electronic device is in communication, via the communication session, with a remote electronic device (e.g., 410, a computer, tablet, or phone associated with the remote participant). In some embodiments, the virtual representation is based on a user associated with the remote electronic device (e.g., a user uniquely associated with the remote electronic device; the remote electronic device is a phone (or other electronic device) that is registered to the remote participant; the remote electronic device is a computer, tablet, or smartphone that is logged into a user account of the remote participant). In some embodiments, the first electronic device is in communication with the second electronic device (e.g., the first electronic device is connected to the second electronic device via a wired or wireless (e.g., Bluetooth, NFC, WiFi) connection)). In some embodiments, the first electronic device is connected to the communication session via the second electronic device.

In some embodiments, Global Positioning System (GPS) data representing the location of the second electronic device in the physical environment is obtained, and the virtual representation is presented such that the virtual representation appears to be located at the first location in the physical environment using the GPS data (e.g., GPS data is used to determine the location of the second electronic device, and then the virtual representation is presented at a location relative to the determined GPS location of the second electronic device). In some embodiments, the location of the second electronic device is determined or obtained by another technique, such as, e.g., computer vision or an ultra-wide band technique (e.g., using a sensor on the first electronic device or another electronic device).

In some embodiments, the display on second electronic device is static while the virtual representation is dynamic (e.g., animated). For example, a visual appearance (e.g., size, shape, color) of the virtual representation changes over time (e.g., is animated) to indicate that the remote participant is talking. In some embodiments, at a first time, a display of the second electronic device is in a first state (e.g., off, a call interface) and the virtual representation is presented with a first visual appearance (e.g., a first color or size), and at a second time different from the first time, the display of the second electronic device is in the first state and the virtual representation is presented with a second visual appearance (e.g., a second color or size) different from the first visual appearance.

At block 504, the second electronic device is detected (e.g., via the first electronic device or via the second electronic device itself) at a third location in the physical environment different from the second location in the physical environment (e.g., a system (e.g., 100) includes a sensor that detects motion of the second electronic device (e.g., from the second location to the third location). In some embodiments, the second electronic device detects its own location and sends its location information to the first electronic device. In some embodiments, a system (e.g., 100) determines that the second electronic device is at a different location than previously detected.

At block 506, the first electronic device presents (e.g., via the display device of the first electronic device) the virtual representation of the remote participant such that the virtual representation of the remote participant appears to be located at a fourth location in the physical environment different from the first location (e.g., the initial location of the virtual representation) and the third location (e.g., the new/current location of the anchor device). In some embodiments, the first electronic device presents the virtual representation of the remote participant such that the virtual representation of the remote participant appears to be located at a fourth location in the physical environment different from the first location and the third location in response to the second electronic device being detected at the third location different from the second location (e.g., in response to a determination that the second electronic device has moved; in response to receiving an indication that the second electronic device has been detected at the third location different from the second location; in response to receiving an indication that the second electronic device has moved).

In some embodiments, the fourth location is determined using the third location (e.g., the new location of the virtual representation is determined using the new location of an anchor device). In some embodiments, the fourth location is determined based on the detected movement of the second electronic device. In some embodiments, the fourth location in the physical environment is a predetermined location relative to a reference location (e.g., the location of a local participant of the communication session, a portion (e.g., head) of a local participant of the communication session, or a local device (e.g., an HMD device of a local participant)) in the physical environment. In some embodiments, the predetermined location is above the shoulder of a local participant of the communication session using the first electronic device. In some embodiments, the predetermined location is determined using the location of the participant and/or the first electronic device (e.g., such that the virtual representation is side-by-side with the local participant). In some embodiments, the virtual representation is moved in accordance with a determination that the second electronic device is moved to a predetermined location (e.g., in front of the user of the first electronic device, as if the user is taking a picture or video). In some embodiments, the first location in the physical environment is a first distance (e.g., a first offset distance) from the second electronic device, and the fourth location in the physical environment is a second distance (e.g., a second offset distance) from the second electronic device different from the first distance from the second electronic device. In some embodiments, the fourth location is determined to be the second distance from the second electronic device in accordance with a determination that the second electronic device is moved to a predetermined location. In some embodiments, the offset of the virtual representation from the second electronic device is determined using the location of the second electronic device.

In some embodiments, in response to detecting the second electronic device at the third location different from the second location, the first electronic device presents the virtual representation of the remote participant such that the virtual representation of the remote participant appears to be oriented toward (e.g., facing) the second electronic device. In some embodiments, the virtual representation is moved (e.g., translated and/or re-oriented) to face the second electronic device in accordance with a determination that the second electronic device is moved to a predetermined location. For example, when a first participant picks up the second electronic device to share content displayed on the second electronic device (e.g., a previously captured photo or live image captured by a camera of the anchor device), the virtual representation is moved to face the second electronic device (e.g., as if the remote participant is looking at the anchor device).

In some embodiments, the virtual representation is moved and/or animated based on a gesture of the remote participant. In some embodiments, data representing a gesture (e.g., eye gesture/gaze or head position) of the remote participant of the communication session is received, and in response to receiving the data representing the gesture of the remote participant of the communication session, the first electronic device presents the virtual representation of the remote participant such that the virtual representation changes from a first state (e.g., position (location and/or orientation), size, color, shape, visual configuration) to a second state different from the first state (e.g., the virtual representation is moved and/or animated). In some embodiments, in response to a remote participant changing focus (e.g., eye gesture/gaze or head position) from one local participant to another local participant (e.g., by moving eye gaze from a representation of one local participant displayed on a device of the remote participant to a representation of another local participant displayed on the remote participant's device), the presentation of the virtual representation is changed (e.g., moved) to focus on the corresponding local participant. In some embodiments, movement of the virtual representation in response to a gesture by the remote participant is not directly proportional to a movement of the gesture by the remote participant. In some embodiments, the gesture of the remote participant has a first magnitude (e.g., change in angular direction of an eye gaze), and a difference between the second state of the virtual representation and the first state of the virtual representation has a second magnitude different from the first magnitude. In some embodiments, non-physical retargeting of a remote participant's gesture/attention cue(s) is performed to match a physical configuration of the local physical environment (e.g., the environment that includes the first electronic device). In some embodiments, the gesture of the remote participant includes movement (e.g., nodding or shaking) of the head of the remote participant.

In some embodiments, the virtual representation is animated when the remote participant speaks. In some embodiments, data representing audio from the remote participant of the communication session is received, and in response to receiving the data representing the audio from the remote participant of the communication session, the first electronic device presents the virtual representation of the remote participant such that the virtual representation is animated (e.g., in accordance with the audio from the remote participant; a characteristic of the audio from the remote participant (e.g., magnitude, frequency) is used to animate the virtual representation).

In some embodiments, the second electronic device captures one or more images of the physical environment to determine the location(s) of local participant(s). In some embodiments, the second electronic device includes a sensor (e.g., image sensor or camera), the second electronic device captures an image of the physical environment using the sensor, and a location of a local participant (e.g., a user of the first electronic device or a person visible in the image(s) captured by the second electronic device) of the communication session is determined using the image of the physical environment. In some embodiments, the second electronic device determines the location of the local participant. In some embodiments, the first electronic device determines the location of the local participant (e.g., the second electronic device sends the captured image to the first electronic device). In some embodiments, the second electronic device sends images of local participants to the remote participant. In some embodiments, the location(s) of the local participant(s) are augmented by one or more sensor on electronic devices (e.g., HMD devices) of local participants. In some embodiments, the location of the local participant of the communication session is determined using an image of the physical environment captured by a third electronic device (e.g., the first electronic device or an electronic device (e.g., an HMD device, 200B) associated with another local participant of the communication session). In some embodiments, the third electronic device sends the image of the physical environment captured by the third electronic device to the second electronic device.

In some embodiments, after presenting the virtual representation of the remote participant, an indication is received that the remote participant and the first electronic device are not connected via the communication session (e.g., the remote participant or the first electronic device disconnects from the communication session or declines an invitation to join the communication session (e.g., the remote participant does not answer the call)); and in response to receiving the indication that the remote participant and the first electronic device are not connected via the communication session, the first electronic device ceases to present the virtual representation of the remote participant.

Executable instructions for performing the features of process 500 described above are, optionally, included in a transitory or non-transitory computer-readable storage medium (e.g., memory(ies) 106) or other computer program product configured for execution by one or more processors (e.g., processor(s) 102). Further, the features of process 500 described above can be incorporated into process 300 described above and process 700 and 1000 described below, and the features of processes 300 described above and process 700 and 1000 described below can be incorporated into process 500.

Turning to FIGS. 6A-6G, techniques for using a virtual representation of a remote participant of a communication session in an XR environment to gesture toward a local participant of the communication session are described.

FIG. 6A illustrates a configuration of a communication session with remote participant A using device 600A and local participants B and C using device 600B and device 600C, respectively. The top of FIG. 6A illustrates a remote XR environment in which remote participant A is located. The remote XR environment includes virtual representation 606B of participant B and virtual representation 606C of participant C. The bottom of FIG. 6A illustrates a local XR environment in which participant A and participant B are located. The local XR environment includes virtual representation 606A of participant C. Device 600A (e.g., a mobile phone, tablet, or HMD device) presents the remote XR environment, and device 600B (e.g., a mobile phone, tablet, or HMD device) and/or device 600C (e.g., a mobile phone, tablet, or HMD device) present the local XR environment. Virtual representations 606A, 606B, and 606C can be presented according to any of the techniques described above regarding virtual representation 206. For example, virtual representation 606A can be presented based on the position of anchor device 610, which can have any of the features of anchor device 210 described above. The distinction between which environment is "remote" and which environment is "local" in the embodiment illustrated in FIG. 6A is for the purposes of explanation. In some embodiments, the environment depicted in the top of FIG. 6A is the local environment and the environment depicted in the bottom of FIG. 6A is the remote environment.

Participant A is looking in the direction of virtual representation 606B of participant B. In accordance with a determination that participant A is focused on virtual representation 606B of participant B, virtual representation 606A of participant A gestures toward participant B (or a device associated with participant B (e.g., 600B) in the local XR environment, as indicated by dashed arrow 608A. The determination of whether a participant is focused on a virtual representation can be based on the position of a device associated with the participant (e.g., whether device 600A is directed toward the virtual representation), the position of the participant's body (e.g., whether participant A's head is turned toward the virtual representation), and/or an eye gaze of the participant (e.g., whether participant A's gaze is directed toward a virtual representation presented by device 600A).

In some embodiments, virtual representation 606A gestures in response to a request. For example, in some embodiments, one or more sensors in the remote environment determine the focus of participant A, and based on the determined focus, a request is provided for virtual representation 606A to gesture according to the determined focus. For example, the request can be sent from a remote system (e.g., device 600A) and received by a local system (e.g., anchor device 610, device 600B, or device 600C). In some embodiments, focus data is provided by a remote system (e.g., device 600A or a remote server connecting device 600A with anchor device 610, device 600B, and/or device 600C) and the gesture request is generated by the local system based on the focus data. In some embodiments, the virtual representation gestures in the direction of the actual corresponding participant (e.g., participant B) in response to a request. In some embodiments, the virtual representation gestures in the direction of a device associated with the corresponding participant (e.g., device 600B) in response to a request. In the examples provided herein, a gesture directed toward a participant can also, or alternatively, be directed to a device associated with that participant.

The focus of a participant can be based on, e.g., eye gaze, body orientation (e.g., head orientation, shoulder orientation, finger direction), or a combination thereof. A participant's focus can be determined based on information captured by, e.g., a camera directed toward the participant, an image sensor on an anchor device, a sensor on an HMD device that determines the gaze of the participant (e.g., based on pupil position), position sensor(s) (e.g., GPS or accelerometers) on a device (e.g., an HMD device) of the participant, orientation sensor(s) (e.g., accelerometers or gyroscopes) on a device (e.g., an HMD device) of the participant, or a combination thereof. The position of a participant can be determined (e.g., for the purpose of generating a gesture in a proper direction) based on information captured by, e.g., a camera directed toward the participant, an image sensor on an anchor device, position sensor(s) (e.g., GPS or accelerometers) on a device (e.g., an HMD device) of the participant, orientation sensor(s) (e.g., accelerometers or gyroscopes) on a device (e.g., an HMD device) of the participant, or a combination thereof.

In some embodiments, a virtual representation (e.g., 606A) gestures by being oriented (or re-orienting or rotating) in the direction of the participant. For example, a virtual representation can include a direction indicator (e.g., a focus indicator, 608A, 608B, 608C) that points in a direction corresponding to the focus of a participant. In some embodiments, a virtual representation includes a front portion (e.g., a face) that points in the direction corresponding to the focus of a participant. In some embodiments, the front portion of a virtual representation is apparent based on the shape, color, pattern, or content of the virtual representation.

Also, FIG. 6A illustrates that participant B and participant C are both focused on virtual representation 606A of participant A. In accordance with a determination that participant B is focused on virtual representation 606A of participant A, virtual representation 606B of participant B gestures toward participant A in the remote XR environment, as indicated by dashed arrow 608B. Similarly, in accordance with a determination that participant C is focused on virtual representation 606A of participant A, virtual representation 606C of participant C gestures toward participant A in the remote XR environment, as indicated by dashed arrow 608C.

Turning to FIG. 6B, participant A has changed focus from virtual representation B to virtual representation C; participant B has changed focus from virtual representation 606A to participant C; and participant C has changed focus from virtual representation 606A to participant B. In accordance with participant A having focus on virtual representation C, virtual representation A gestures toward participant C in the local XR environment; in accordance with participant B having focus on participant C in the local XR environment, virtual representation B gestures toward virtual representation C in the remote XR environment; and in accordance with participant C having focus on participant B in the local XR environment, virtual representation C gestures towards virtual representation B in the remote XR environment.

In FIG. 6B, device 600C of participant C is in a first orientation with anchor device 610. The first orientation includes device 600C being located in a first direction from anchor device 610. As described above, in this orientation, virtual representation 606A gestures in the first direction, toward device 600C. In FIG. 6C, participant C has moved around the table (compared to FIG. 6B) and is positioned closer to participant B such that device 600C held by participant C is in a second orientation with anchor device 610, with device 600C located in a second direction from anchor device 610. In this orientation, virtual representation 606A gestures in the second direction (e.g., in order to remain directed toward device 600C and participant C).

In accordance with participant C (and thus device 600C) being positioned as illustrated in FIG. 6C, virtual representation C is positioned (moved) in the remote XR environment to correspond to the new position of device 600C and participant C. As illustrated in FIG. 6C, participant A maintains focus on virtual representation C as virtual representation C is moved. In some embodiments, the representations of participants B and C are static in the remote environment (e.g., the virtual representations of participants B and C are presented in respective defined areas on a display of a device being used by participant A, as shown, e.g., in FIG. 6E-6G, discussed below). In some embodiments, virtual representation 606A gestures (e.g., moves, rotates) to remain directed toward device 600C as participant C moves, independently from whether there is a representation of participant C in the remote environment that moves with participant C or whether the focus of participant A changes to maintain focus on the representation of participant C.

Figure 6D:
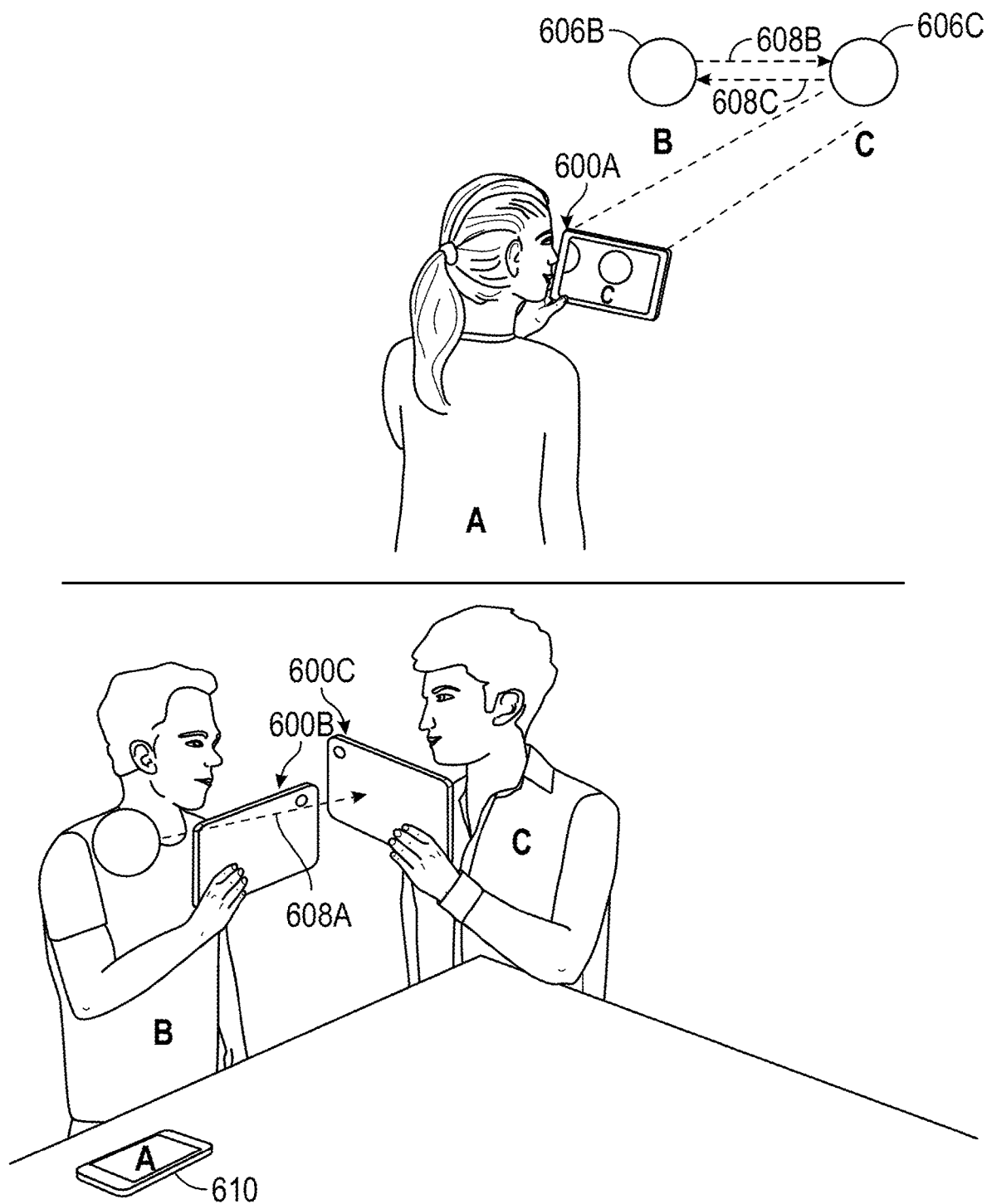

Turning to FIG. 6D, anchor device 610 has moved (compared to FIG. 6C) relative to device 600C and participant C and is positioned to the left of participant B (from the perspective of the local environment in FIG. 6D) such that device 600C held by participant C is in a third orientation with anchor device 610, with device 600C located in a third direction from anchor device 610. In this orientation, virtual representation 606A gestures in the third direction (e.g., in order to remain directed toward device 600C and participant C).

In accordance with anchor device 610 being positioned as illustrated in FIG. 6D, virtual representations B and C are positioned (moved) in the remote XR environment to correspond to the new position of anchor device 610. As illustrated in FIG. 6D, participant A maintains focus on virtual representation C as virtual representation C is moved. In some embodiments, the representations of participants B and C are static in the remote environment. In some embodiments, virtual representation 606A gestures (e.g., moves, rotates) to remain directed toward device 600C as anchor device 610 moves, independently from whether there is a representation of participant C in the remote environment that moves with anchor device 610 or whether the focus of participant A changes to maintain focus on the representation of participant C.

Figure 6E:
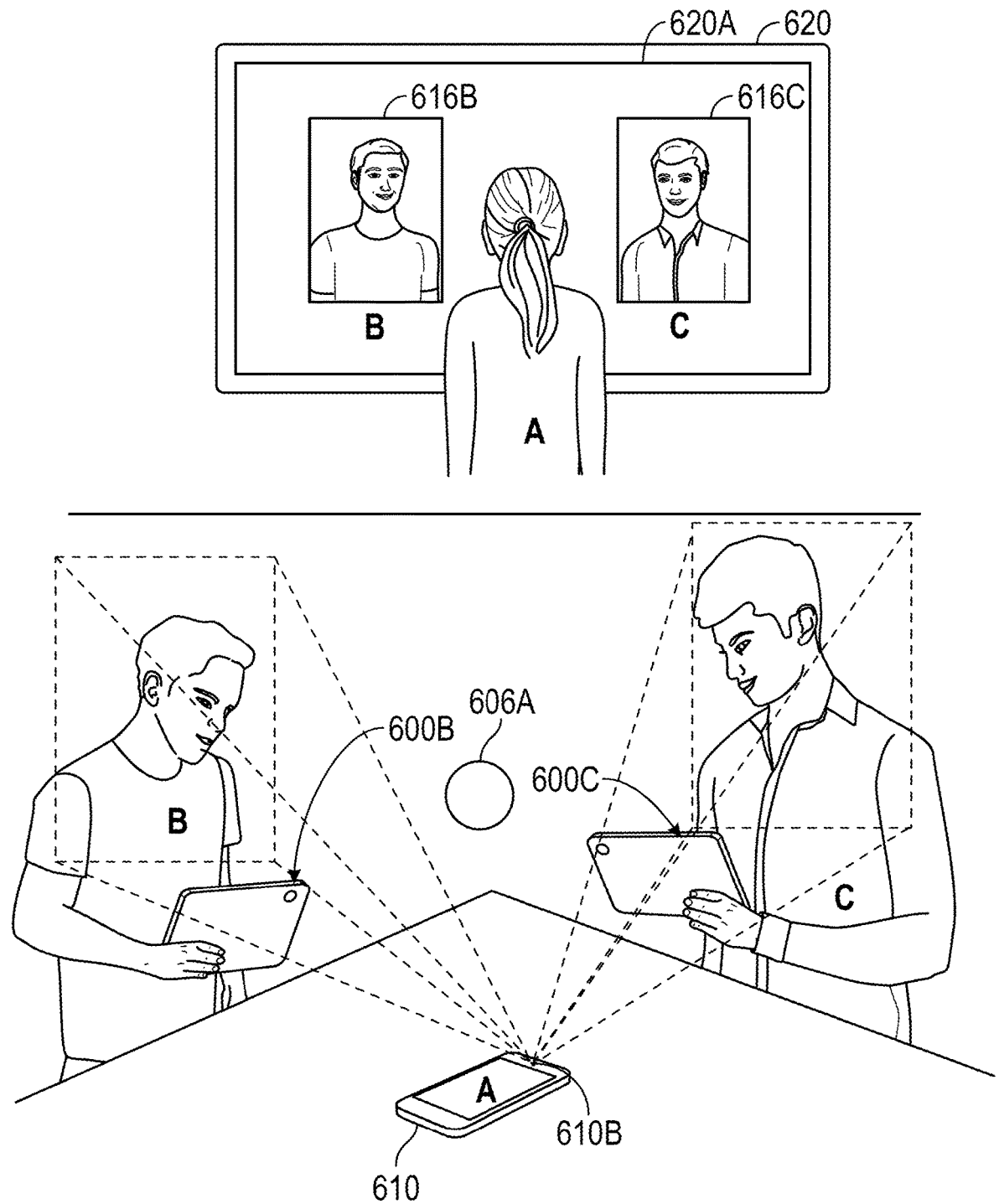
Figure 6F:
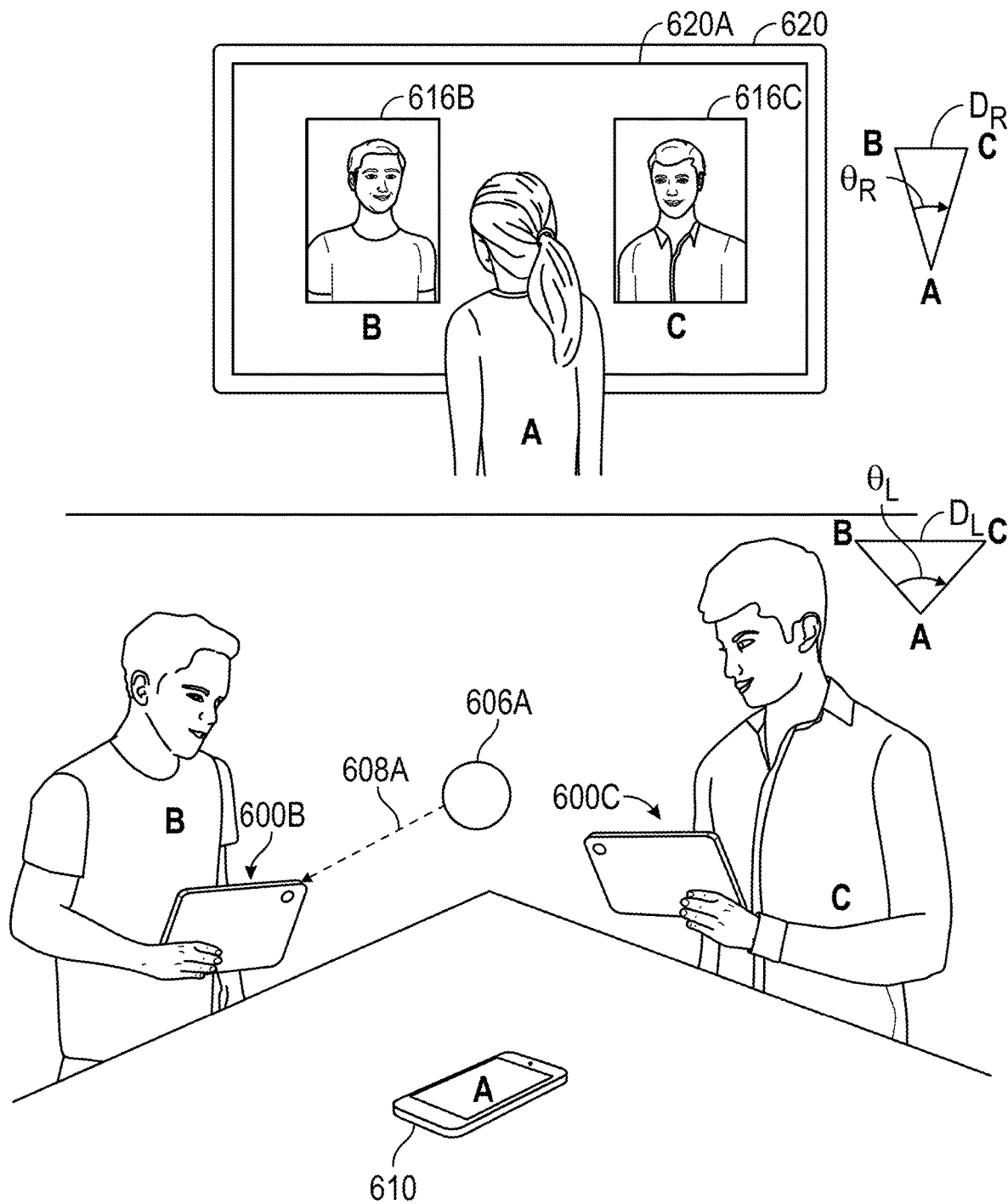
Figure 6G:
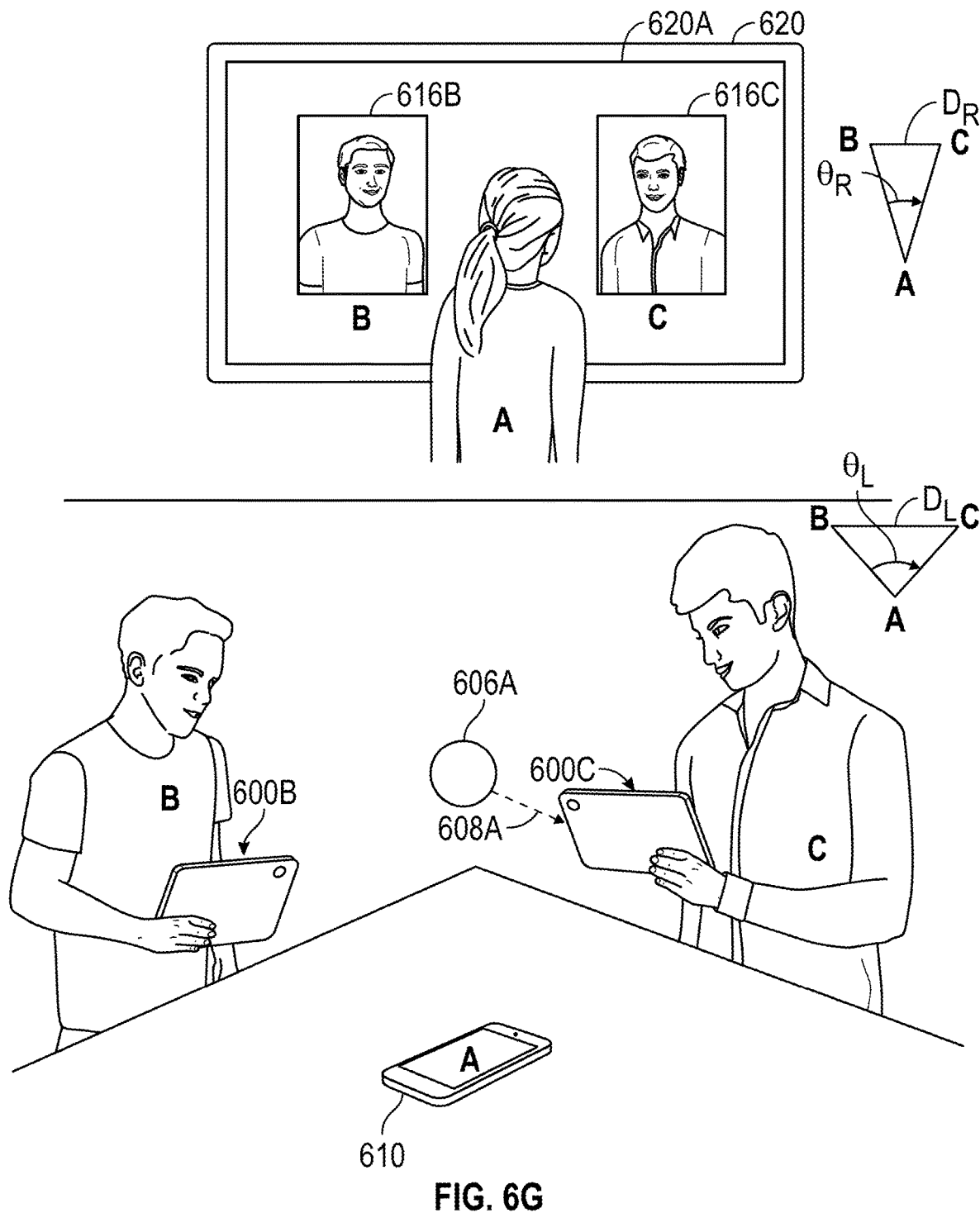

FIGS. 6E-6G illustrate an exemplary configuration of a communication session including participant A, participant B, and participant C. As shown in FIG. 6E, anchor device 610 includes front-facing camera 610B (e.g., a wide-angle camera) that captures images and/or video of the local physical environment, including participant B and participant C. Anchor device 610 provides captured image and/or video data of participant B and participant C to remote device 620 (e.g., a TV, desktop computer, laptop computer, tablet computer, smartphone, a media device that provides video to an external display or TV for display). In the embodiment illustrated in FIG. 6E, device 620 includes display 620A. Remote device 620 presents (e.g., causes to be displayed) representation 616B of participant B and representation 616C of participant C. In the embodiment illustrated in FIG. 6E, representation 616B includes an image or video of participant B based on the image or video data provided by anchor device 610.

In FIG. 6F, participant A has focus on representation 616B of participant B presented by device 620. In the embodiment illustrated in FIG. 6F, device 620 includes sensor 620B and is configured to capture image and/or video data that can be used to determine the focus of participant A. In accordance with participant A having focus on representation 616B, virtual representation A gestures toward participant B in the local XR environment.

In FIG. 6F, representation 616B and representation 616C are presented by device 620 such that the representations are closer together physically than participant B and participant C are to each other in the local physical environment. The physical spatial relationship between participant A, representation 616B, and representation 616C is represented by the triangle diagram depicted to the right of device 620 in FIG. 6F. Similarly, the physical spatial relationship between virtual representation 606A, participant B, and participant C is represented by the triangle diagram depicted to the right of participant C in FIG. 6F. The diagrams are depicted merely for the purpose of explanation and are not part of the physical or XR environments illustrated in FIG. 6F. As depicted, the distance $D_R$ between representation 616B and representation 616C is less than the distance $D_L$ between participant B and participant C. Also, the angular separation $\theta_R$ between representation 616B and representation 616C relative to participant A is less than the angular separation $\theta_L$ between participant B and participant C relative to virtual representation 606A.

Turning to FIG. 6G, participant A has moved focus from representation 616B to representation 616C, which corresponds to an angular rotation of $\theta_R$. In accordance with participant A having focus on virtual representation C, virtual representation 606A gestures toward participant C in the local XR environment by rotating or moving direction indicator 608A by the angle $\theta_L$. Since the spatial relationship between participant A, representation 616B, and representation 616C differs from the spatial relationship between virtual representation 606A, participant B, and participant C, causing virtual representation 606A to gesture toward participant C in response to the change in focus by participant A includes performing a transform that maps the physical change in focus of participant A in the remote environment into a corresponding gesture in the local XR environment. Since the configurations are different in the two environments, there is not a one-to-one mapping between the angular change in focus of participant A and the angular change in the direction of the gesture by virtual representation 606A.

Figure 7:
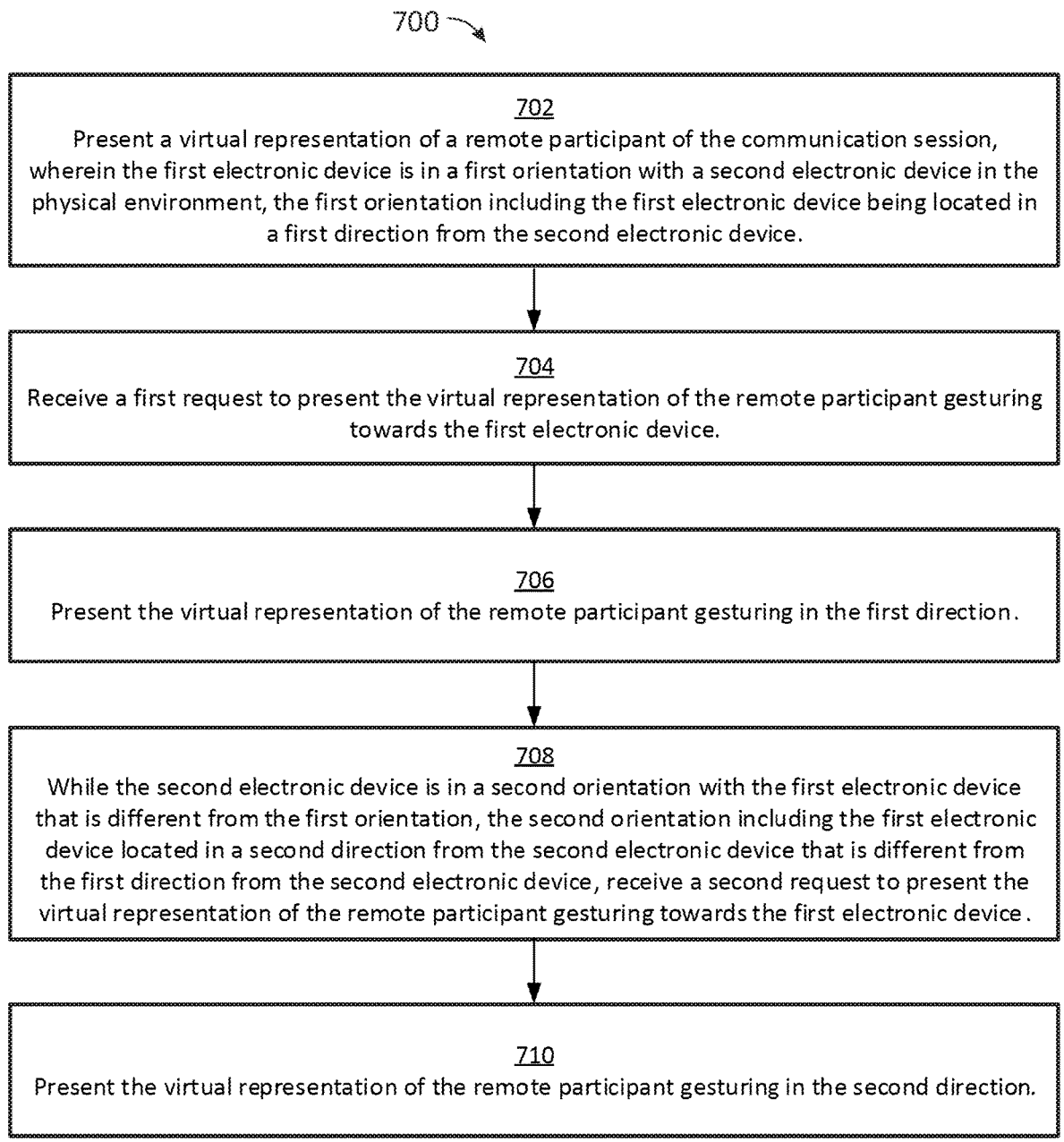
FIG. 7 depicts a flow chart of an exemplary process for presenting an extended reality environment, according to various embodiments.

Turning now to FIG. 7, a flow chart is depicted of exemplary process 700 for providing an XR environment for a communication session (e.g., a phone call, teleconference, video conference), including the features described above with reference to FIGS. 6A-6G. Process 700 can be performed using an electronic device (e.g., 100a, 100c, 200A, 200B, 410, 600A, 600B, or 600C), referred to as "the first electronic device" for the purpose of describing process 700, or a system (e.g., 100) that includes the electronic device. Although the blocks of process 700 are depicted in a particular order in FIG. 7, these blocks can be performed in other orders. Further, one or more blocks of process 700 can be optional (e.g., omitted) and/or additional blocks can be performed.

At block 702, the first electronic device presents (e.g., via a display device of the first electronic device), a virtual representation (e.g., 606A, an avatar) of a remote participant of a communication session. The first electronic device (e.g., 606C) is in a first orientation with a second electronic device (e.g., 610, an anchor device) in a physical environment while presenting the virtual representation. The first orientation includes the first electronic device being located in a first direction from the second electronic device. In some embodiments, the first electronic device presents the virtual representation while presenting an XR environment and while connected to the communication session.

In some embodiments, the virtual representation of the remote participant is presented via the display device in the XR environment. The virtual representation can be presented according to any of the techniques described above with reference to FIGS. 2A-2D, 3, 4A-4D, 5, and 6A-6E. For example, the location of the virtual representation can be based on the location of the second electronic device and/or the location(s) of one or more other electronic devices (e.g., above the second electronic device, a predetermined distance from the second electronic device, at the height of an electronic device (e.g., the first electronic device), at a height that is the average of the heights of multiple electronic devices (e.g., the first electronic device and a third electronic device)). In some embodiments, the second electronic device is in communication, via the communication session, with a remote electronic device (e.g., a computer, tablet, or phone associated with the remote participant). In some embodiments, the virtual representation is based on a user associated with the remote electronic device (e.g., a user uniquely associated with the remote electronic device; the remote electronic device is a phone that is registered to the remote participant; the remote electronic device is a computer, tablet, or smartphone that is logged into a user account of the remote participant). In some embodiments, the first electronic device is in communication with the second electronic device (e.g., the first electronic device is connected to the second electronic device via a wired or wireless (e.g., Bluetooth, NFC, WiFi) connection)). In some embodiments, the first electronic device is connected to the communication session via the second electronic device.

At block 704, a first request to present the virtual representation of the remote participant gesturing towards the first electronic device is received. In some embodiments, the first request to present the virtual representation of the remote participant gesturing towards the first electronic device is received while the second electronic device is in the first orientation with the first electronic device (e.g., while anchor device 610 is in the orientation depicted in FIG. 6B with device 600C).

At block 706, the first electronic device presents the virtual representation of the remote participant gesturing in the first direction. A gesture can include, e.g., an orientation, movement (translation and/or rotation), animation, color, or change in color. In some embodiments, the virtual representation is oriented to face the first electronic device. In some embodiments, the first electronic device presents the virtual representation of the remote participant gesturing in the first direction in response to receiving the first request to present the virtual representation of the remote participant gesturing towards the first electronic device.

At block 708, after presenting the virtual representation of the remote participant gesturing in the first direction and while the second electronic device is in a second orientation with the first electronic device that is different from the first orientation (e.g., the first electronic device has moved relative to the second electronic device; the second orientation can be the orientation of device 610 and device 600C in FIG. 6C), a second request to present the virtual representation of the remote participant gesturing towards the first electronic device is received. The second orientation includes the first electronic device located in a second direction from the second electronic device that is different from the first direction from the second electronic device.

At block 710, the first electronic device presents the virtual representation of the remote participant gesturing in the second direction (e.g., the virtual representation is re-oriented to face the new position of the first electronic device). In some embodiments, the first electronic device presents the virtual representation of the remote participant gesturing in the second direction in response to receiving the second request to present the virtual representation of the remote participant gesturing towards the first electronic device. In some embodiments, the first electronic device presents the virtual representation of the remote participant gesturing in the second direction in accordance with (or in response to) a determination that the orientation of the first device and the second electronic device has changed from the first orientation to the second orientation.

In some embodiments, the virtual representation remains directed toward a particular user (e.g., the user of the first electronic device) as the particular user moves within the physical environment. In some embodiments, the first electronic device, in the first orientation, is in a first location in the physical environment, the first electronic device, in the second orientation, is in a second location in the physical environment different from the first location in the physical environment (e.g., the first electronic device moves in the physical environment while the second electronic device remains stationary or at the same location in the physical environment), and presenting the virtual representation of the remote participant gesturing in the second direction includes presenting the virtual representation such that the virtual representation is directed toward the first electronic device (e.g., a front portion or directional indicator of the virtual representation is facing the first electronic device). In some embodiments, presenting the virtual representation such that the virtual representation is directed toward the first electronic device includes rotating the presentation of the virtual representation.

In some embodiments, the virtual representation remain directed toward a particular user (e.g., the user of the first electronic device) as the second electronic device moves within the physical environment (e.g., the movement of anchor device 610 as shown in FIG. 6C and FIG. 6D). In some embodiments, the second electronic device, in the first orientation, is in a first location in the physical environment, the second electronic device, in the second orientation, is in a second location in the physical environment different from the first location in the physical environment (e.g., the second electronic device moves in the physical environment while the first electronic device remains stationary or at the same location in the physical environment), and presenting the virtual representation of the remote participant gesturing in the second direction includes presenting the virtual representation such that the virtual representation is directed toward the first electronic device (e.g., a front portion or directional indicator of the virtual representation is facing the first electronic device). In some embodiments, presenting the virtual representation such that the virtual representation is directed toward the first electronic device includes translating and/or rotating the presentation of the virtual representation.

In some embodiments, the virtual representation remains directed toward a particular user in the second orientation while the second orientation includes a third electronic device (e.g., 600B) located in a third direction from the second electronic device that is different from the second direction. In some embodiments, the second orientation includes a reference point associated with a local participant of the communication session (e.g., a third electronic device connected to the communication session) being located in a third direction from the second electronic device different from the second direction (e.g., the direction at which the first electronic device is located, relative to the second electronic device) from the second electronic device (e.g., the virtual representation maintains focus on the first electronic device despite the presence of other local participants).

In some embodiments, GPS data representing the location of the second electronic device in the physical environment is obtained, and the first electronic device presents the virtual representation of the remote participant of the communication session using the GPS data (e.g., GPS data is used to determine the location of the second electronic device, and then the virtual representation is presented at a location relative to the determined GPS location of the second electronic device). In some embodiments, the location of the second electronic device is determined or obtained by another technique, such as, e.g., computer vision or an ultra-wide band technique (e.g., using a sensor on the first electronic device or another electronic device).

In some embodiments, an offset of the virtual representation changes from the first orientation to the second orientation. In some embodiments, while the first electronic device and the second electronic device are in the first orientation, the virtual representation is presented at a first distance (e.g., a first offset distance) from the second electronic device, and while the first electronic device and the second electronic device are in the second orientation, the virtual representation is presented at a second distance (e.g., a second offset distance) from the second electronic device different from the first distance from the second electronic device. In some embodiments, the second distance is determined in accordance with a determination that the anchor device is moved to a predetermined location. In some embodiments, the offset of the virtual representation from the anchor device is determined using the location of the anchor device.

In some embodiments, a display on the second electronic device is static while the virtual representation in the virtual environment is dynamic. In some embodiments, at a first time, a display of the second electronic device is in a first state and the virtual representation is presented with a first visual appearance, and at a second time different from the first time, the display of the second electronic device is in the first state and the virtual representation is presented with a second visual appearance different from the first visual appearance.

In some embodiments, the virtual representation is moved and/or animated based on a gesture of the remote participant. In some embodiments, data representing a gesture (e.g., eye gesture/gaze or head position) of the remote participant of the communication session is received, and in response to receiving the data representing the gesture of the remote participant of the communication session, the first electronic device presents the virtual representation of the remote participant such that the virtual representation changes from a first state (e.g., position (location and/or orientation), size, color, shape, visual configuration) to a second state different from the first state (e.g., the virtual representation is moved and/or animated). In some embodiments, in response to a remote participant changing focus (e.g., eye gesture/gaze or head position) from one local participant to another local participant (e.g., by moving eye gaze from a representation of one local participant displayed on the remote participant's device to a representation of another local participant displayed on the remote participant's device), the virtual representation is moved to focus on the corresponding local participant. In some embodiments, the movement of the virtual representation in response to a gesture by the remote participant is not directly proportional to the movement of the remote participant. In some embodiments, the gesture of the remote participant has a first magnitude (e.g., change in angular direction of an eye gaze), and a difference between the second state of the virtual representation and the first state of the virtual representation has a second magnitude different from the first magnitude. In some embodiments, the system performs non-physical retargeting of a remote participant's gesture/attention cue(s) to match a physical configuration of the physical environment. In some embodiments, the gesture of the remote participant includes movement (e.g., nodding or shaking) of the head of the remote participant.

In some embodiments, the virtual representation is animated when the remote participant speaks. In some embodiments, data representing audio from the remote participant of the communication session is received, and in response to receiving the data representing the audio from the remote participant of the communication session, the first electronic device presents the virtual representation of the remote participant such that the virtual representation is animated (e.g., in accordance with the audio from the remote participant; a characteristic of the audio from the remote participant (e.g., magnitude, frequency) is used to animate the virtual representation).

In some embodiments, the second electronic device captures one or more images of the physical environment to determine the location(s) of local participant(s). In some embodiments, the second electronic device includes a sensor (e.g., 610B, image sensor or camera), the second electronic device captures an image of the physical environment using the sensor, and a location of a local participant (e.g., a user of the first electronic device or a person visible in the image(s) captured by the second electronic device) of the communication session is determined using the image of the physical environment. In some embodiments, the second electronic device determines the location of the local participant. In some embodiments, the first electronic device determines the location of the local participant (e.g., the second electronic device sends the captured image to the first electronic device). In some embodiments, the second electronic device sends images of local participants to the remote participant. In some embodiments, the location(s) of the local participant(s) are augmented by one or more sensor on electronic devices (e.g., 600B, 600C) of local participants. In some embodiments, the location of the local participant of the communication session is determined using an image of the physical environment captured by a third electronic device (e.g., the first electronic device or an electronic device (e.g., an HMD device) associated with another local participant of the communication session). In some embodiments, the third electronic device sends the image of the physical environment captured by the third electronic device to the second electronic device.

In some embodiments, after presenting the virtual representation of the remote participant, an indication is received that the remote participant and the first electronic device are not connected via the communication session (e.g., the remote participant or the first electronic device disconnects from the communication session or declines an invitation to join the communication session (e.g., does not answer the call)). In response to receiving the indication that the remote participant and the first electronic device are not connected via the communication session, the first electronic device ceases to present the virtual representation of the remote participant.

Executable instructions for performing the features of process 700 described above are, optionally, included in a transitory or non-transitory computer-readable storage medium (e.g., memory(ies) 106) or other computer program product configured for execution by one or more processors (e.g., processor(s) 102). Further, the features of process 700 described above can be incorporated into processes 300 and 500 described above and process 1000 described below, and the features of processes 300 and 500 described above and process 1000 described below can be incorporated into process 700.

Turning to FIGS. 8A-8D, techniques are described for presenting a virtual representation of a remote participant of a communication session in an XR environment, where the virtual representation is presented with a visual characteristic that is based on a capability of the remote participant.

Figure 8A:
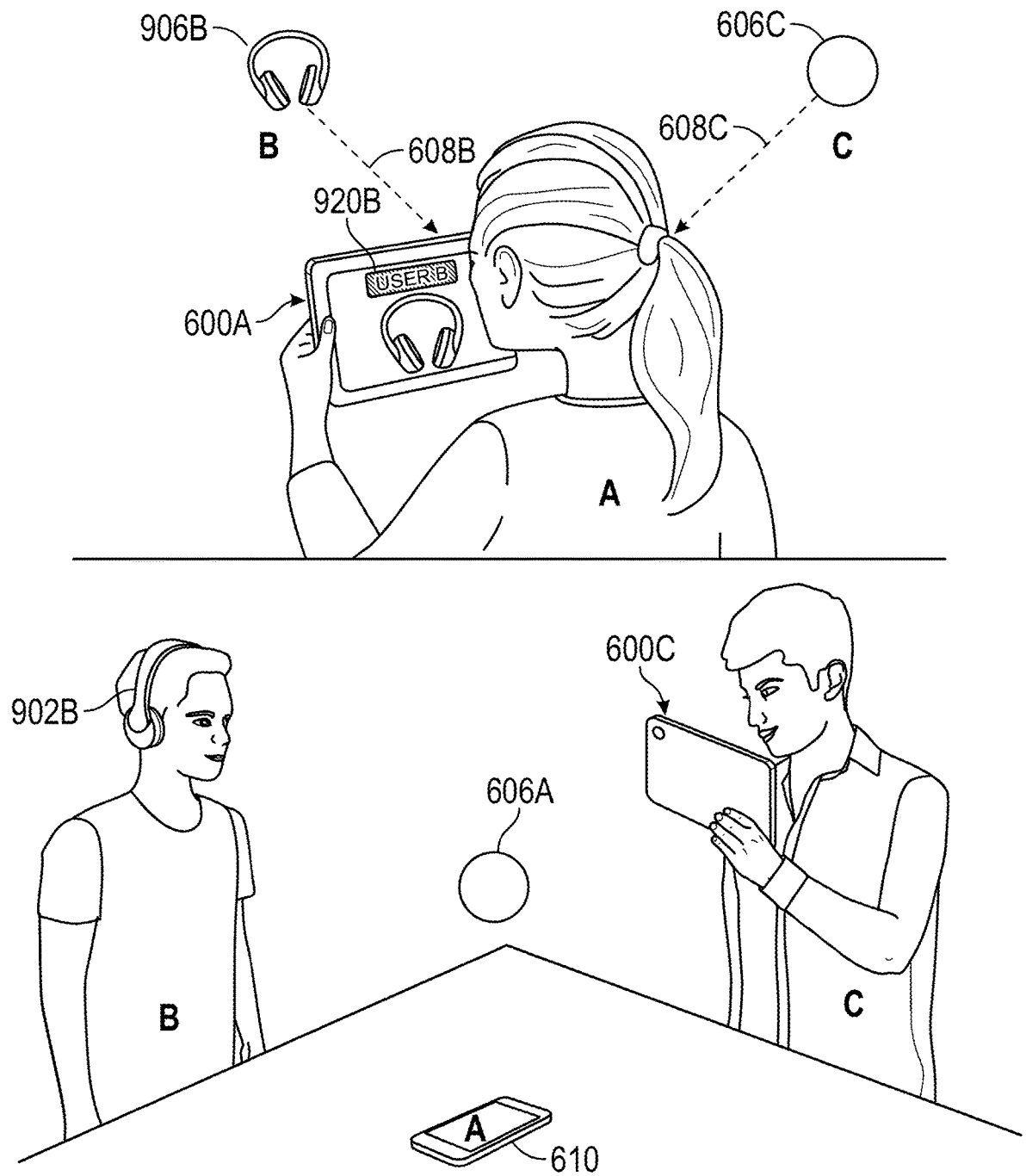

FIG. 8A illustrates a configuration of a communication session with participant A, participant B, and participant C. Participant A is using device 600A, participant B is using device 902B, and participant C is using device 600C. The top of FIG. 8A illustrates a local XR environment in which participant A is located. The local XR environment includes virtual representations 906B of participant B and virtual representation 606C of participant C. The bottom of FIG. 8A illustrates a remote XR environment in which participant B and participant C are located. The remote XR environment includes virtual representation 606A of participant A. Device 600A (e.g., a mobile phone, tablet, headset, or HMD device) presents the local XR environment, and device 600C (e.g., a mobile phone, tablet, or HMD device) and device 902B present the remote environment. In some embodiments, device 902B is a device (e.g., a mobile phone, tablet, headphones, HMD device) that can present the remote XR environment via one or more output devices, such as speakers and/or display devices. Virtual representations 606A, 906B, and 606C can be presented according to any of the techniques described above regarding virtual representation 206. For example, virtual representation 606A of participant A can be presented in the remote environment based on the position of anchor device 610, which can have any of the features of anchor device 210 described above. The distinction between which environment is "remote" and which environment is "local" in the embodiment illustrated in FIG. 8A is for the purposes of explanation. In some embodiments, the environment depicted in the top of FIG. 8A is the remote environment, and the environment depicted in the bottom of FIG. 8A is the local environment.

As illustrated in FIG. 8A, device 600A presents virtual representation 906B with a visual characteristic that indicates a capability of participant B with respect to the communication session. In FIG. 8A, the visual characteristic includes a graphical representation of a device of participant B (e.g., a device that participant B is using to connect to the communication session). Here, the graphical representation is a set of headphones that is representative of device 902B. In some embodiments, the graphical representation can include or be replaced with one or more other symbols and/or text that are representative of device 902B and/or a capability of participant B (e.g., the ability of the device used by participant B to detect and/or track body position and/or motion, such as head, hand, and/or eye position and/or motion). In some embodiments, virtual representation 906B is displayed with the visual characteristic illustrated in FIG. 8A (e.g., as a graphical representation of headphones) in response to a determination that the device being used by participant B is a set of headphones. In some embodiments, this determination is made when participant B starts using device 902B during the communication session and/or when participant B joins the communication session with participant A (e.g., while participant B is using device 902B).

Also, FIG. 8A illustrates an embodiment in which virtual representation 906B does not include a representation of participant B, such as an avatar or a representation of the face of participant B, other than the representation of device 902B. For example, at FIG. 8A, device 600A presents virtual representation 906B with the graphical representation of device 902B without concurrently presenting any other representation(s) of participant B. In some embodiments, virtual representation 906B can be presented concurrently with another representation of participant B (e.g., as shown in FIG. 8D).

In FIG. 8A, virtual representation 906B, including the graphical representation of device 902B, is presented with user-selectable attributes, such as color, text, texture, and/or style attributes. In some embodiments, participant B (or participant A) can customize attributes of virtual representation 906B as it is presented in the XR environment. In some embodiments, participant B can provide one or more inputs to change the attributes of virtual representation 906B as it is displayed on device 600A. In some embodiments, the one or more inputs can be provided and one or more attributes of virtual representation 906B can be updated while the communication session is ongoing.

As illustrated in FIG. 8A, name tag 920B is concurrently displayed with virtual representation 906B on device 600A. Name tag 920B includes text (e.g., "USER B") that denotes an identifier that is associated with participant B. In some embodiments, name tag 920B can include one or more other symbols, letters, numbers that are associated with participant B. In some embodiments, name tag 920B can be displayed with one or more attributes of virtual representation 906B, such that the color, style, texture, etc. of name tag 920B matches the color, style, texture, etc. of virtual representation 906B.

In some embodiments, name tag 920B can be associated with participant B via user input on device 600A (e.g., to set the name of a contact that is a participant in the communication) and/or device 902B (e.g., to set the name of a user account). In some embodiments, name tag 920B can be positioned on other areas of device 600A. In some embodiments, name tag 920B is only displayed when a determination is made that participant B is talking and/or when a selection of virtual representation 906B that is displayed on device 600A has occurred.

While name tag 920B is positioned (e.g., floating) above virtual representation 906B that is displayed on device 600A in FIG. 8A, name tag 920B can be positioned in other areas of the display on device 600A with respect to virtual representation 906B. For example, name tag 920B can be displayed being positioned on a surface below and/or at a position to the left or right of virtual representation 906B. In some embodiments, name tag 920B is displayed temporarily on device 600A. For example, name tag 920B can only be displayed on device 600A when a determination is made that participant B is talking and/or when participant A has selected virtual representation 906B.

Figure 8B:
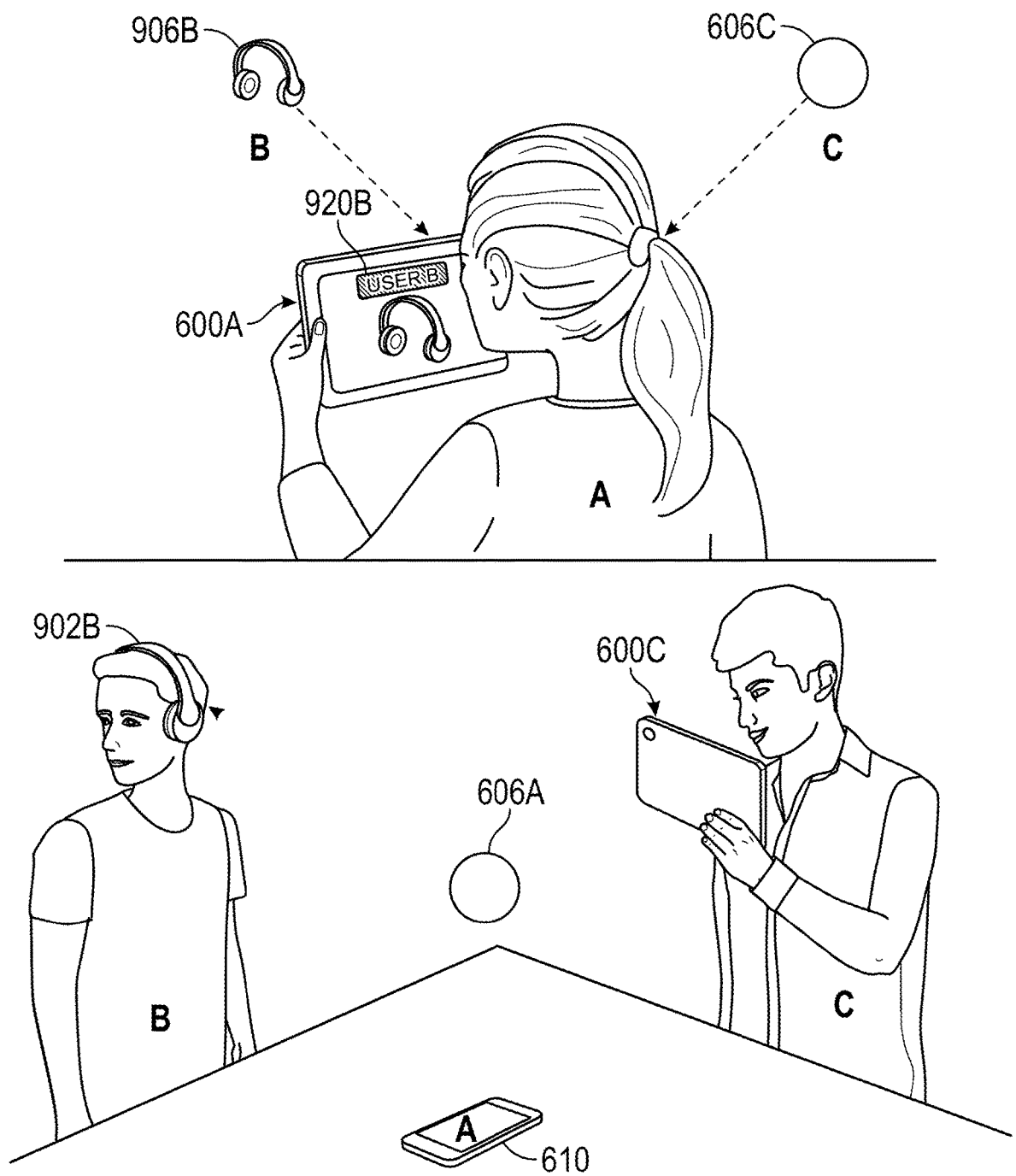

Turning to FIG. 8B, participant B moves device 902B in the remote environment (e.g., by turning his head to his right). In response to device 902B moving in the remote environment, virtual representation 906B is moved (e.g., rotated) in the local environment in accordance with (e.g., in the same direction as) the movement of device 902B to represent the movement of device 902B in the remote environment. Virtual representation 906B is moved because device 902B has the ability to track motion using one or more motion tracking and/or eye tracking sensors. Device 902B has the ability to track movements of participant's head via sensors, such as cameras and/or an inertial measurement unit. In some embodiments, device 902B uses the sensors to track, for example, three-degrees or six-degrees of freedom in relation to participant's movement of device 902B. In some embodiments, device 902B can be an HMD device. In some embodiments, when device 902B does not have one or more of the tracking sensors mentioned above, virtual representation 906B is not moved (e.g., virtual representation 906B is maintained in the position in which virtual representation 906B was previously displayed on device 600A in FIG. 8A).

Figure 8C:
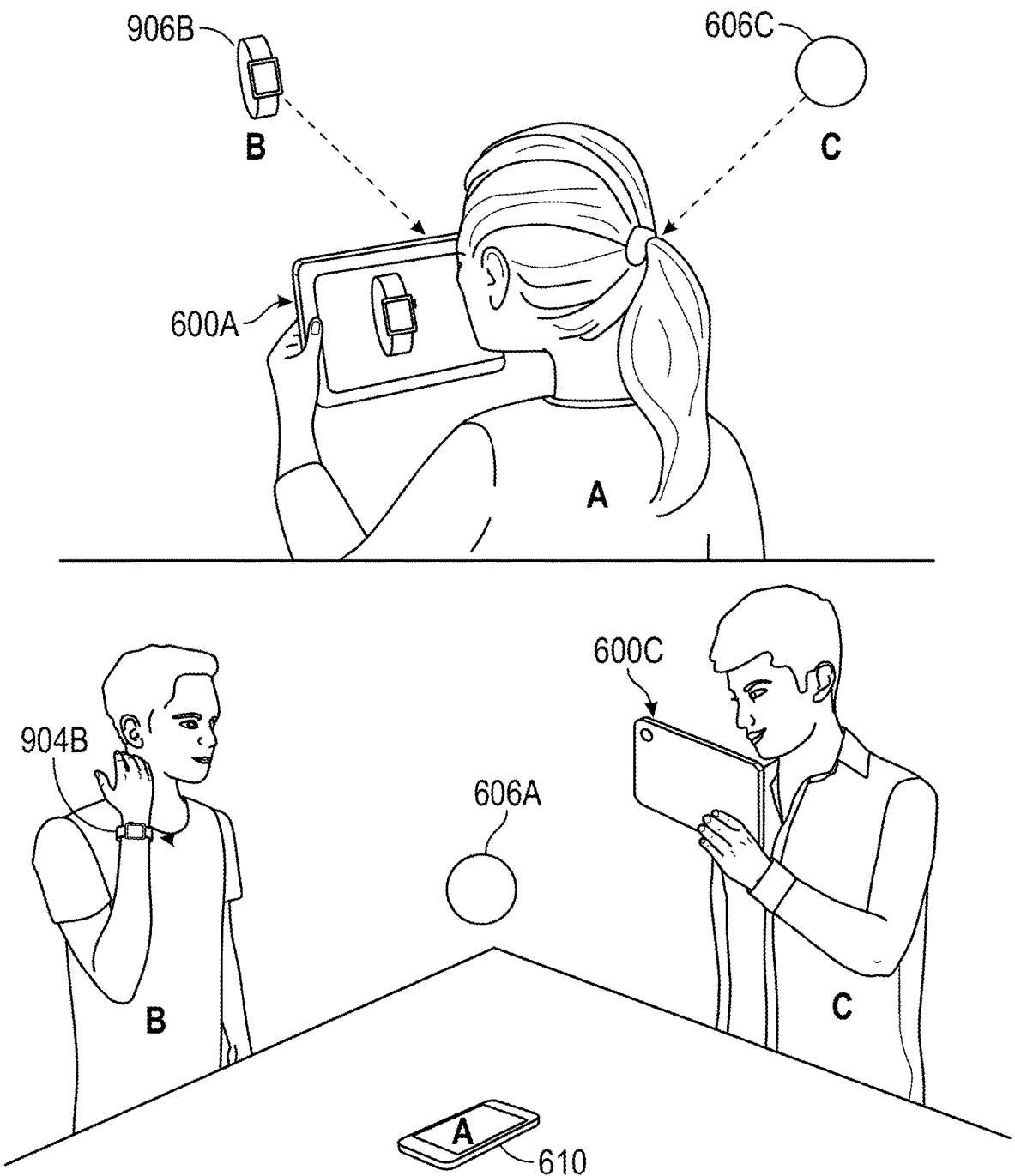

Turning to FIG. 8C, participant B is using device 904B (e.g., participant B has stopped using device 902B and has started using device 904B in the remote environment). In response to determining that participant B is using device 904B, virtual representation 906B is displayed on device 600A with a visual characteristic that includes a different graphical representation (e.g., a watch) in FIG. 8C from the graphical representation (e.g., a set of headphones) that was displayed on device 600A in FIG. 8C when participant B was using device 902B. The graphical representation in FIG. 8C is a representation of device 904B that is positioned on the wrist of participant B in the remote environment of FIG. 8C. For example, in response to detecting that participant B has stopped use of device 902B, virtual representation 906B has ceased to be displayed with the graphical representation of FIG. 8B. Thus, as shown in FIGS. 8A-8C, virtual representation 906B is displayed with different virtual characteristics (e.g., graphical representations of different devices) when participant B is using different types of devices.

In some embodiments, virtual representation 906B, when displayed with the graphical representation of FIG. 8C, can be displayed with one or more attributes that are different from the attributes that in which the graphical representation in FIG. 8B was displayed. In some embodiments, the virtual representation 906B in FIG. 8C includes one or more components and/or can be displayed in ways that are similar to those described above in relation to the virtual representation 906B of FIG. 8B.

Turning to FIG. 8D, participant B is using device 902B and device 904B in the remote environment. Since participant B is using device 902B and device 904B in the remote environment, virtual representation 906B is presented in a manner (e.g., with a visual characteristic) that represents both device 902B and device 904B (and/or the capabilities provided by device 902B and device 904B). For example, virtual representation 906B is displayed with graphical representations of both device 902B and 904B in the local environment. The two graphical representations include the graphical representation of device 902B shown in FIG. 8B (e.g., a set of headphones) and the graphical representation of device 904B shown in FIG. 8C (e.g., a watch). In other words, virtual representation 906B can be presented in a manner that concurrently indicates multiple capabilities (e.g., devices) of a participant, for example, when a remote participant is using multiple devices.

Also, as illustrated in FIG. 8D, the graphical representations of device 902B and 904B are displayed on a representation (e.g., an avatar) that includes a representation of the face of participant B. Notably, the representation of the face of participant B is not a representation of an object or a device like the graphical representation of device 902B and the graphical representation of device 904B in FIG. 8D. In some embodiments, the representation of the face of participant B is not displayed in FIG. 8D.

Figure 9:
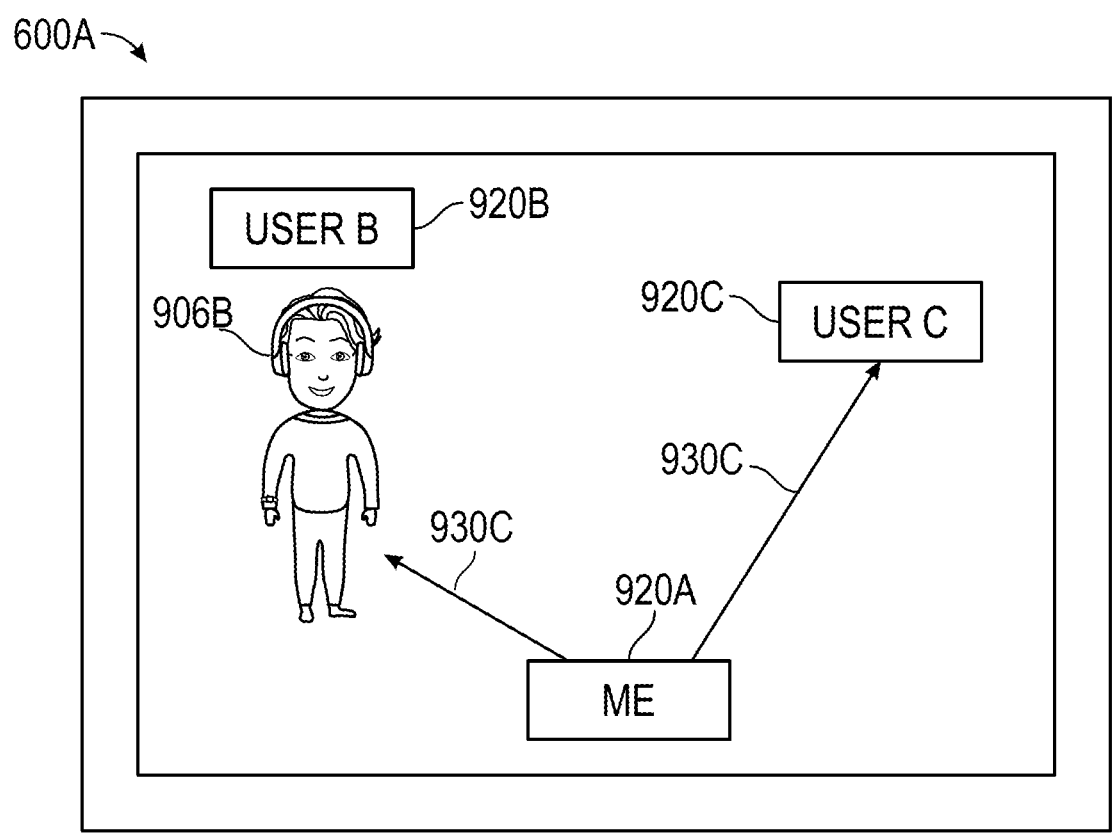
FIG. 9 illustrates techniques for presenting an extended reality environment, according to various embodiments.

Turning to FIG. 9, techniques for displaying a diagram associated with the communication session in an XR environment is described.

FIG. 9, illustrates a diagram of participants that are in a communication session. The diagram in FIG. 9 is an exemplary diagram that is displayed on device 600A in a local environment and is based on the XR environments that are shown in FIG. 8D. In some embodiments, a different diagram (or a similar diagram) from the diagram of FIG. 9 can be displayed on one or more devices in the remote environment.

Looking at FIG. 8D and FIG. 9, name tags 920A-920C are positioned in an arrangement that is consistent with the arrangement of participant A, participant B, and participant C in the local environment of FIG. 8D. Name tags 920A-920C respectively correspond to identifiers that are associated with participants A, B, and C.

In the embodiment illustrated in FIG. 9, directional indicators 930B and 930C point from name tag 902A to name tags 902B and 902C, respectively, to show participant A's position with respect to the positions of participants B and C in the communication session.

In FIG. 9, name tag 920B is adjacent to virtual representation 906B, which includes graphical representations of devices 902B and 904C that the user is wearing (and/or using) in FIG. 8D. On the other hand, name tag 920C is not concurrently adjacent to any virtual representations of participant C. Here, name tag 920B is adjacent to virtual representation 902B because participant B is active in the communication session (as shown in FIG. 8D), and name tag 920C is not concurrently adjacent to any virtual representations for participant C because participant C was not active in the communication session (as shown in FIG. 8D). For example, in FIG. 8D, participant C has not actively participated (e.g., spoken) for a predetermined amount of time or has temporarily left the communication session and device 600C is in an inactive state. Thus, in some embodiments, only name tags are shown for inactive users when the diagram is presented on a device.

Figure 10:
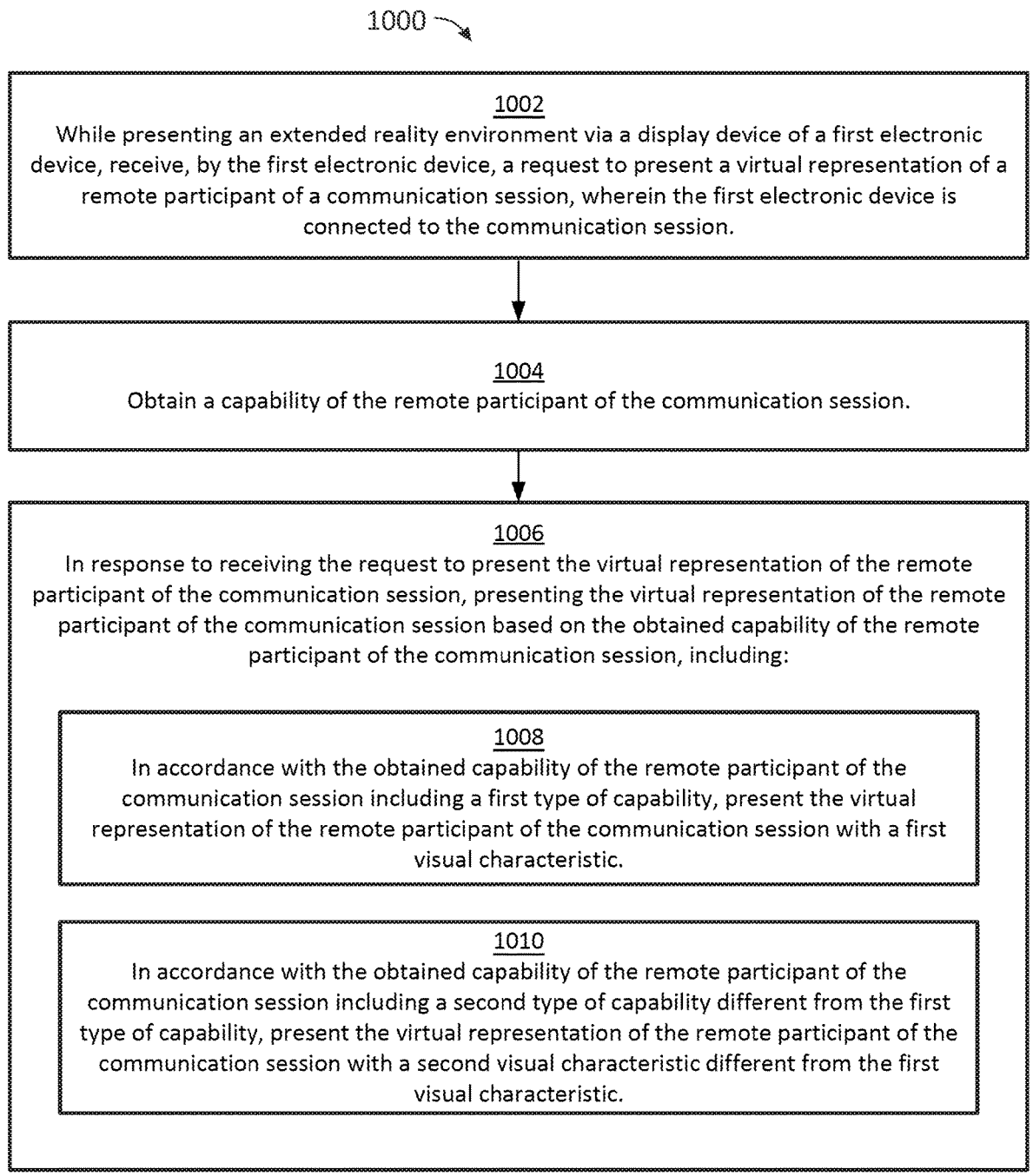
FIG. 10 depicts a flow chart of an exemplary process for presenting an extended reality environment, according to various embodiments.

Turning now to FIG. 10, a flow chart is depicted of exemplary process 1000 for providing an XR environment for a communication session (e.g., a phone call, teleconference, video conference), including the features described above with reference to FIGS. 8A-8D. Process 1000 can be performed using an electronic device (e.g., 100a, 100c, 200A, 200B, 410, 600A, 600B, or 600C), referred to as "the first electronic device" for the purpose of describing process 1000, or a system (e.g., 100) that includes the electronic device. Although the blocks of process 1000 are depicted in a particular order in FIG. 10, these blocks can be performed in other orders. Further, one or more blocks of process 1000 can be optional (e.g., omitted) and/or additional blocks can be performed.

At block 1002, while presenting an extended reality (XR) environment via a display device of a first electronic device (e.g., 600A) (e.g., a headset, a phone, tablet, HMD device, watch, a pair of headphone (e.g., earbuds)), a request to present a virtual representation (e.g., 906B) of a remote participant (e.g., participant B in FIGS. 8A-8D) of a communication session is received. In some embodiments, the first electronic device is connected to the communication session.

In some embodiments, the virtual representation of the remote participant is presented via the display device in the XR environment. The virtual representation can be presented according to any of the techniques described above with reference to FIGS. 2A-2D, 3, 4A-4D, 5, 6A-6E, 8A-8D, and 9. For example, the location of the virtual representation can be based on the location of a second electronic device and/or the location(s) of one or more other electronic devices (e.g., above the second electronic device, a predetermined distance from the second electronic device, at the height of an electronic device (e.g., the first electronic device), at a height that is the average of the heights of multiple electronic devices (e.g., the first electronic device and a third electronic device)). In some embodiments, the second electronic device is in communication, via the communication session, with a remote electronic device (e.g., a computer, tablet, or phone associated with the remote participant). In some embodiments, the virtual representation is based on a user associated with the remote electronic device (e.g., a user uniquely associated with the remote electronic device; the remote electronic device is a phone that is registered to the remote participant; the remote electronic device is a computer, tablet, or smartphone that is logged into a user account of the remote participant). In some embodiments, the first electronic device is in communication with the second electronic device (e.g., the first electronic device is connected to the second electronic device via a wired or wireless (e.g., Bluetooth, NFC, WiFi) connection)). In some embodiments, the first electronic device is connected to the communication session via the second electronic device.

At block 1004, a capability (e.g., 902B, 904B, a device, a sensor, a function of a device) of the remote participant of the communication session is obtained. For example, a capability can be a device, such as a headset (e.g., an HMD), a pair of smart glasses, a pair of headphones, a phone, a tablet, a smartphone, a smartwatch, etc., or a function of a device.

At block 1006, in response to receiving the request to present the virtual representation (e.g., 906B) of the remote participant of the communication session, the virtual representation (e.g., 906B) of the remote participant of the communication session is presented based on the obtained capability of the remote participant of the communication session. In some embodiments, the capability is obtained when an electronic device joins or becomes active in a communication session. In some embodiments, the capability obtained a device is being used in the communication session.

At block 1008, the virtual representation (e.g., 906B) is presented with a first visual characteristic (e.g., a graphical representation of headphones) in accordance with the obtained capability (e.g., 902B, 904B) of the remote participant of the communication session including (e.g., being) a first type of capability (e.g., 902B, 904B) (e.g., a headset (e.g., an HMD), a pair of smart glasses, a pair of headphones, earbuds, a phone, a tablet, a smartphone, a smartwatch). In some embodiments, a type of capability is a type of device. In some embodiments, the virtual representation is presented with a first visual characteristic in accordance with a determination that the obtained capability of the remote participant of the communication session includes (e.g., is) a first type of capability At block 1010, the virtual representation (e.g., 906B) of the remote participant of the communication session is presented with a second visual characteristic (e.g., a graphical representation of earbuds) different from the first visual characteristic in accordance with the obtained capability of the remote participant of the communication session including (e.g., being) a second type of capability (e.g., 902B, 904B) (e.g., a headset (e.g., an HMD), a pair of smart glasses, a pair of headphones, earbuds, a phone, a tablet, a smartphone, a smartwatch) different from the first type of capability. In some embodiments, the virtual representation of the remote participant of the communication session is presented with a second visual characteristic different from the first visual characteristic in accordance with a determination that the obtained capability of the remote participant of the communication session includes (e.g., is) a second type of capability different from the first type of capability.

In some embodiments, the capability (e.g., 902B, 904B) includes an electronic device (e.g., 902B, 904B). In some embodiments, the capability is associated with the remote participant. In some embodiments, the visual characteristic includes a representation of an electronic device (e.g., 902B, 904B). For example, a representation of the electronic device can be a graphical representation.

In some embodiments, the virtual representation of the remote participant of the communication session includes only a representation of an electronic device (e.g., 902B, 904B). For example, the virtual representation (e.g., 906B) does not include any other representation of the remote participant other than the representation of the electronic device, such as a character representation. In some embodiments, the capability includes a function of an electronic device (e.g., 902B, 904B). For example, a function of the electronic device can include an eye tracking, motion sensing/tracking function of an electronic device.

In some embodiments, the determined capability (e.g., 902B, 904B) includes the first type of capability and the second type of capability. In some embodiments, as a part of presenting the virtual representation (e.g., 906B) of the remote participant of the communication session, the virtual representation of the remote participant of the communication session is presented concurrently with the first visual characteristic and the second visual characteristic.

In some embodiments, in response to receiving the request to present the virtual of the remote participant of the communication session, the virtual representation (e.g., 906B) of the remote participant of the communication session is presented based on a setting that is configured to be selectable by a user associated with the first electronic device (e.g., 600A). In some embodiments, the visual characteristic is displayed with a first attribute. For example, an attribute can be a particular color, style, texture of a device.

In some embodiments, while presenting the virtual representation (e.g., 906B) of the remote participant of the communication session with the first visual characteristic that is displayed with the first attribute, the first electronic device receives one or more inputs for changing the first attribute to a second attribute. In some embodiments, in response to receiving the one or more inputs for changing the first attribute to the second attribute, the first electronic device presents the virtual representation (e.g., 906B) of the remote participant of the communication session with the first characteristic that has the second attribute, wherein the second attribute is different from the first attribute.

In some embodiments, as a part of presenting the virtual representation of the remote participant of the communication session with the first visual characteristic includes movement of the virtual representation (e.g., 906B in FIGS. 8A-8B). For example, movement of the virtual representation can include animating the virtual representation. In some embodiments, the movement of the virtual representation is based on the obtained capability (e.g., 902B, 904B) of the remote participant of the communication session. In some embodiments, the movement of the virtual representation is based on use of the obtained capability. For example, when a virtual representation of glasses displayed on the electronic device can move as a participant with a head-tracking headset nods. As another example, a virtual representation of a phone remains stationary when a determination is made that a remote participant is using a phone that does not track head motion. In some embodiments, the virtual representation does not change eye gaze when participant just has only one earbud in his/her ear.

In some embodiments, in accordance with the capability including a third type of capability, the movement includes a first movement. In some embodiments, in accordance with the capability including a fourth type of capability, the movement includes a second movement that is different from the first movement. In some embodiments, the first movement is a first type of movement, such as rotational movement. In some embodiments, the second movement is a second type of movement that is different from the first type of movement, such as lateral movement.

In some embodiments, one or more name tags are displayed on the device. For example, name tag 920B (the name tag that represents participant B) is displayed on device 600A (device of participant A) in FIG. 8A.

In some embodiments, name tag can be displayed relative to the virtual representation. For example, the name tag can float above the virtual representation like in FIG. 8A. In some embodiments, the name tag can be adjacent to the virtual representation. In some embodiments, the name tag can be displayed on a surface that is positioned relative to the virtual representation such that the name tag is displayed above, below, to the left, to right of the representation.

In some embodiments, the name tag can be displayed at particular points in time. In some embodiments, the name tag is only displayed when a determination is made that the participant associated with the name tag is talking and/or when a user selects the virtual representation that corresponds to the name tag.

As discussed in relation to FIG. 9, in some embodiments, a list of participants can be displayed. In some embodiments, the list of participants can include directional indicators, such as 930B and 930C in FIG. 9.

The list of participants can be displayed in different ways. In some embodiments, the list of participants is displayed as an ordered list. In some embodiments, the ordered list can correspond to the spatial placement and/or order of the virtual representations.

In some embodiments, a virtual representation is shown adjacent to an associated name tag when a determination is made that the participant that corresponds to the name tag (or virtual representation) is active. In some embodiments, only the name tag is displayed when a determination is made that the participant is inactive.

Executable instructions for performing the features of process 1000 described above are, optionally, included in a transitory or non-transitory computer-readable storage medium (e.g., memory(ies) 106) or other computer program product configured for execution by one or more processors (e.g., processor(s) 102). Further, the features of process 1000 described above can be incorporated into processes 300, 500, and 700 described above, and the features of processes 300, 500, and 700 described above can be incorporated into process 1000.

Aspects of the techniques described above contemplate the possibility of gathering and using personal information to provide an XR experience. Such information should be collected with the user's informed consent.

Entities handling such personal information will comply with well-established privacy practices and/or privacy policies (e.g., that are certified by a third-party) that are (1) generally recognized as meeting or exceeding industry or governmental requirements, (2) user-accessible, (3) updated as needed, and (4) compliant with applicable laws. Entities handling such personal information will use the information for reasonable and legitimate uses, without sharing or selling outside of those legitimate uses.

However, users may selectively restrict access/use of personal information. For example, users can opt into or out of collection of their personal information. In addition, although aspects of the techniques described above contemplate use of personal information, aspects of the techniques can be implemented without requiring or using personal information. For example, if location information, usernames, and/or addresses are gathered, they can be generalized and/or masked so that they do not uniquely identify an individual.

The foregoing descriptions of specific embodiments have been presented for purposes of illustration and description. They are not intended to be exhaustive or to limit the scope of the claims to the precise forms disclosed, and it should be understood that many modifications and variations are possible in light of the above teaching.

What is claimed is:

1. An electronic device, comprising:
a display device;
one or more processors; and
memory storing one or more programs configured to be executed by the one or more processors, the one or more programs including instructions for:
while presenting an extended reality environment via the display device of the electronic device, receiving, by the electronic device, a request to present a virtual representation of a remote participant of a communication session, wherein the electronic device is connected to the communication session;
in response to receiving the request to present the virtual representation of the remote participant:
locating a second electronic device at a first location in a physical environment; and
while the second electronic device is located at the first location in the physical environment, presenting, via the display device, the virtual representation of the remote participant such that the virtual representation appears to be located at a second location in the physical environment, wherein the second location is different from the first location, and wherein a first coordinate of the second location is determined using a first coordinate of the first location;
receiving data representing audio from the remote participant of the communication session; and
in response to receiving the data representing the audio from the remote participant of the communication session, presenting, via the display device of the electronic device, the virtual representation of the remote participant such that the virtual representation is animated.

2. The electronic device of claim 1, wherein the virtual representation of the remote participant is presented via the display device in the extended reality environment.

3. The electronic device of claim 1, wherein a third coordinate of the second location is determined using a second coordinate of the first location.

4. The electronic device of claim 1, wherein the second location is above the first location.

5. The electronic device of claim 1, wherein the second location is a predetermined distance from the first location.

6. The electronic device of claim 1, wherein a second coordinate of the second location is determined using a location of a third electronic device different from the second electronic device.

7. The electronic device of claim 1, wherein:
a second coordinate of the second location is determined using an average that includes a first coordinate of a location of a third electronic device and a first coordinate of a location of a fourth electronic device;
the second coordinate of the second location is determined using a maximum of the first coordinate of the location of the third electronic device and the first coordinate of the location of the fourth electronic device; or
the second coordinate of the second location is determined using a minimum of the first coordinate of the location of the third electronic device and the first coordinate of the location of the fourth electronic device.

8. The electronic device of claim 1, wherein a second coordinate of the second location is determined independently from the first location.

9. The electronic device of claim 1, wherein a fifth electronic device associated with a participant of the communication session presents the virtual representation of the remote participant such that the virtual representation appears to be located at the second location in the physical environment.

10. The electronic device of claim 1, wherein receiving the request to present the virtual representation occurs in response to the remote participant joining the communication session.

11. The electronic device of claim 1, wherein the one or more programs further include instructions for:
    after presenting the virtual representation of the remote participant, receiving an indication that the remote participant and the electronic device are not connected via the communication session; and
    in response to receiving the indication that the remote participant and the electronic device are not connected via the communication session, ceasing to present the virtual representation of the remote participant.

12. The electronic device of claim 1, wherein the one or more programs further include instructions for:
    presenting, via the display device, media content such that the media content appears to be located at a third location in the physical environment, wherein the third location is different from the first location, and wherein a first coordinate of the third location is determined using a second coordinate of the first location.

13. The electronic device of claim 12, wherein the media content is presented concurrently with the virtual representation of the remote participant.

14. The electronic device of claim 1, wherein the second electronic device is in communication, via the communication session, with a remote electronic device.

15. The electronic device of claim 14, wherein the virtual representation is based on a user associated with the remote electronic device.

16. The electronic device of claim 1, wherein the electronic device is in communication with the second electronic device.

17. The electronic device of claim 1, wherein the electronic device provides audio output of the communication session that creates a perception of the virtual representation as an audio source of the audio output.

18. The electronic device of claim 1, wherein the one or more programs further include instructions for:
    obtaining Global Positioning System (GPS) data representing the location of the second electronic device in the physical environment,
    wherein presenting the virtual representation such that the virtual representation appears to be located at the second location in the physical environment is performed using the GPS data.

19. The electronic device of claim 1, wherein the one or more programs further include instructions for:
    receiving data representing a gesture of the remote participant of the communication session; and
    in response to receiving the data representing the gesture of the remote participant of the communication session, presenting, via the display device of the electronic device, the virtual representation of the remote participant such that the virtual representation changes from a first state to a second state different from the first state.

20. A non-transitory computer-readable storage medium storing one or more programs configured to be executed by one or more processors of a first electronic device with a display device, the one or more programs including instructions for:
    while presenting an extended reality environment via the display device of the first electronic device, receiving, by the first electronic device, a request to present a virtual representation of a remote participant of a communication session, wherein the first electronic device is connected to the communication session;
    in response to receiving the request to present the virtual representation of the remote participant:
        locating a second electronic device at a first location in a physical environment; and
        while the second electronic device is located at the first location in the physical environment, presenting, via the display device, the virtual representation of the remote participant such that the virtual representation appears to be located at a second location in the physical environment, wherein the second location is different from the first location, and wherein a first coordinate of the second location is determined using a first coordinate of the first location;
    receiving data representing audio from the remote participant of the communication session; and
    in response to receiving the data representing the audio from the remote participant of the communication session, presenting, via the display device of the first electronic device, the virtual representation of the remote participant such that the virtual representation is animated.

21. The non-transitory computer-readable storage medium of claim 20, wherein the second location is above the first location.

22. The non-transitory computer-readable storage medium of claim 20, wherein the second location is a predetermined distance from the first location.

23. The non-transitory computer-readable storage medium of claim 20, wherein a third electronic device associated with a participant of the communication session presents the virtual representation of the remote participant such that the virtual representation appears to be located at the second location in the physical environment.

24. The non-transitory computer-readable storage medium of claim 20, wherein the first electronic device provides audio output of the communication session that creates a perception of the virtual representation as an audio source of the audio output.

25. The non-transitory computer-readable storage medium of claim 20, wherein the one or more programs further include instructions for:
    receiving data representing a gesture of the remote participant of the communication session; and
    in response to receiving the data representing the gesture of the remote participant of the communication session, presenting, via the display device of the first electronic device, the virtual representation of the remote participant such that the virtual representation changes from a first state to a second state different from the first state.

26. A method, comprising:
    while presenting an extended reality environment via a display device of a first electronic device, receiving, by the first electronic device, a request to present a virtual representation of a remote participant of a communication session, wherein the first electronic device is connected to the communication session;
    in response to receiving the request to present the virtual representation of the remote participant:
        locating a second electronic device at a first location in a physical environment; and
        while the second electronic device is located at the first location in the physical environment, presenting, via the display device, the virtual representation of the remote participant such that the virtual representation appears to be located at a second location in the physical environment, wherein the second location is different from the first location, and wherein a first coordinate of the second location is determined using a first coordinate of the first location;

receiving data representing audio from the remote participant of the communication session; and in response to receiving the data representing the audio from the remote participant of the communication session, presenting, via the display device of the first electronic device, the virtual representation of the remote participant such that the virtual representation is animated.

27. The method of claim 26, wherein the second location is above the first location.

28. The method of claim 26, wherein the first electronic device provides audio output of the communication session that creates a perception of the virtual representation as an audio source of the audio output.

29. The method of claim 26, further comprising:

receiving data representing a gesture of the remote participant of the communication session; and in response to receiving the data representing the gesture of the remote participant of the communication session, presenting, via the display device of the first electronic device, the virtual representation of the remote participant such that the virtual representation changes from a first state to a second state different from the first state.

30. The method of claim 26, wherein the second location is a predetermined distance from the first location.

31. The method of claim 26, wherein a third electronic device associated with a participant of the communication session presents the virtual representation of the remote participant such that the virtual representation appears to be located at the second location in the physical environment.

* * * * *